(12) United States Patent
Fujimoto et al.

(10) Patent No.: US 7,129,618 B2
(45) Date of Patent: Oct. 31, 2006

(54) CONTROL APPARATUS CAPABLE OF LOW-SPEED DRIVING OF VIBRATION TYPE DRIVING APPARATUS, ACTUATING APPARATUS USING THE CONTROL APPARATUS, CONTROL METHOD CAPABLE OF LOW-SPEED DRIVING OF VIBRATION TYPE DRIVING APPARATUS, AND STORAGE MEDIUM STORING PROGRAM INCLUDING PROGRAM CODES CAPABLE OF REALIZING THE CONTROL METHOD

(75) Inventors: Kosuke Fujimoto, Kanagawa (JP); Kenichi Kataoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 10/809,540

(22) Filed: Mar. 26, 2004

(65) Prior Publication Data

US 2004/0256951 A1    Dec. 23, 2004

(30) Foreign Application Priority Data

Mar. 31, 2003  (JP) ............................. 2003-096491
Mar. 19, 2004  (JP) ............................. 2004-081135

(51) Int. Cl.
*H01L 41/08* (2006.01)
(52) U.S. Cl. .............................. 310/316.01; 310/316.02
(58) Field of Classification Search ........... 310/316.02, 310/317, 319
See application file for complete search history.

(56) References Cited

U.S. PATENT DOCUMENTS

| 5,001,404 A | 3/1991 | Kataoka ...................... 318/116 |
|---|---|---|
| 5,004,964 A | 4/1991 | Kataoka et al. ............. 318/128 |
| 5,134,348 A | 7/1992 | Izukawa et al. |
| 5,157,300 A | 10/1992 | Kataoka et al. ............. 310/323 |
| 5,285,134 A | 2/1994 | Kataoka ...................... 318/116 |
| 5,436,521 A | 7/1995 | Kataoka ...................... 310/317 |
| 5,459,370 A | 10/1995 | Kataoka ...................... 310/317 |
| 5,539,268 A | 7/1996 | Kataoka ...................... 310/316 |
| 5,631,516 A | 5/1997 | Kataoka ...................... 310/316 |
| 5,684,353 A | 11/1997 | Fujimoto et al. ........... 310/323 |
| 5,739,623 A | 4/1998 | Kanazawa et al. .......... 310/323 |
| 5,760,529 A | 6/1998 | Tamai et al. ................. 310/323 |
| 5,777,424 A | 7/1998 | Okazaki et al. ............. 310/323 |
| 5,798,598 A | 8/1998 | Fujimoto ..................... 310/323 |
| 5,939,851 A | 8/1999 | Kataoka et al. ............. 318/611 |
| 5,945,769 A | 8/1999 | Mitarai et al. |

(Continued)

FOREIGN PATENT DOCUMENTS

EP        1 073 127        1/2001

(Continued)

*Primary Examiner*—Mark Budd
(74) *Attorney, Agent, or Firm*—Fitzpatrick, Cella, Harper & Scinto

(57) ABSTRACT

A control apparatus and a control method for a vibration type driving apparatus are disclosed which can maintain output performance even when low-speed driving is continued for a long time. The vibration type driving apparatus comprises a vibrating body and an electro-mechanical energy conversion element, and a contact body in contact with the vibrating body. By applying a plurality of driving signals to the electro-mechanical energy conversion element to excite a traveling vibration on the vibrating body, the vibrating body and the contact body are relatively moved. The control apparatus and the control method controls the driving signals such that the largest displacement of the traveling vibration fluctuates and a position where the largest displacement reaches the peak is changed in a direction of the relative movement of the vibrating body and the contact body.

37 Claims, 41 Drawing Sheets

U.S. PATENT DOCUMENTS

| | | | |
|---|---|---|---|
| 5,949,178 A | 9/1999 | Tamai et al. | 310/323 |
| 6,031,316 A | 2/2000 | Kataoka | 310/316 |
| 6,049,156 A | 4/2000 | Yamamoto et al. | 310/316.01 |
| 6,054,795 A | 4/2000 | Yamamoto et al. | 310/316.01 |
| 6,084,334 A | 7/2000 | Yamamoto et al. | 310/316.01 |
| 6,100,622 A | 8/2000 | Yamamoto et al. | 310/316.01 |
| 6,107,723 A | 8/2000 | Fujimoto | 310/323.09 |
| 6,107,724 A | 8/2000 | Tamai et al. | 310/323.11 |
| 6,225,730 B1 | 5/2001 | Fujimoto | 310/348 |
| 6,229,245 B1 * | 5/2001 | Kitani | 310/316.02 |
| 6,313,564 B1 | 11/2001 | Kataoka et al. | 310/316.01 |
| 6,376,965 B1 | 4/2002 | Kataoka et al. | 310/317 |
| 6,437,481 B1 * | 8/2002 | Senda et al. | 310/317 |
| 6,608,426 B1 | 8/2003 | Hayashi et al. | 310/317 |
| 6,635,977 B1 * | 10/2003 | Kataoka et al. | 310/116 |
| 6,674,217 B1 | 1/2004 | Fujimoto | 310/323.06 |
| 6,744,227 B1 * | 6/2004 | Kataoka | 318/114 |
| 6,952,073 B1 * | 10/2005 | Yamamoto | 310/323.06 |
| 6,954,022 B1 * | 10/2005 | Kataoka | 310/317 |
| 2002/0053858 A1 | 5/2002 | Hayashi et al. | 310/316.01 |
| 2002/0180387 A1 | 12/2002 | Kataoka | 318/114 |
| 2003/0107299 A1 | 6/2003 | Fujimoto et al. | 310/323.03 |
| 2003/0184190 A1 | 10/2003 | Kataoka | 310/317 |

FOREIGN PATENT DOCUMENTS

| | | |
|---|---|---|
| JP | 8-80073 | 3/1996 |
| JP | 2001-157473 | 6/2001 |
| JP | 2002-176788 | 6/2002 |

* cited by examiner

A=(V+a)cos α cos ωt−V sin α sin ωt
B=(V+a)sin α cos ωt+V cos α sin ωt
 A:A PHASE DRIVING VOLTAGE, B:B PHASE DRIVING VOLTAGE,
 V:DRIVING VOLTAGE(FUNDAMENTAL VOLTAGE), a:STANDING WAVE AMPLITUDE,
  α:TURNING ANGLE, ω:DRIVING ANGULAR VELOCITY

FIG.6
$A = (V + a\cos\phi)\cos\omega t$
$B = (V - a\cos\phi)\sin\omega t$
 A : A PHASE DRIVING VOLTAGE, B : B PHASE DRIVING VOLTAGE,
 a : MODULATION AMPLITUDE, $\phi$ : MODULATION PHASE,
 $\omega$ : DRIVING ANGULAR VELOCITY,
 V : DRIVING VOLTAGE (FUNDAMENTAL VOLTAGE)
FIG.7
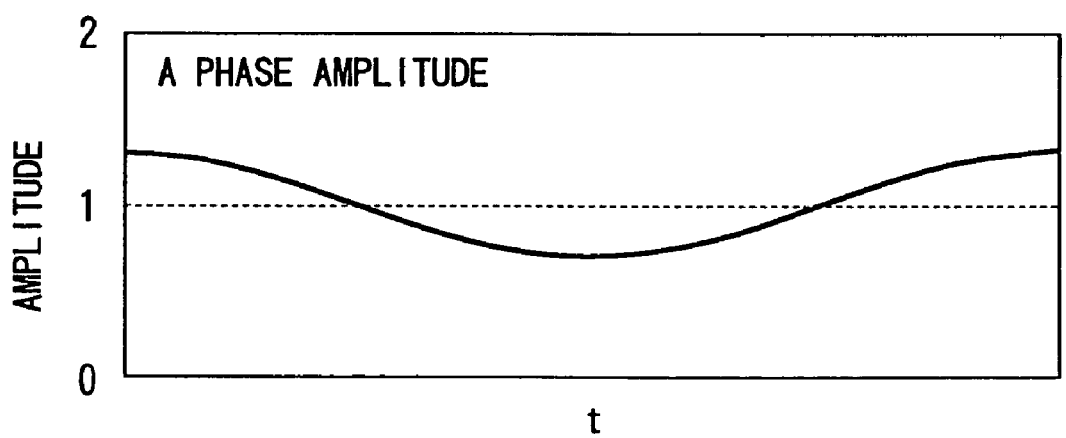
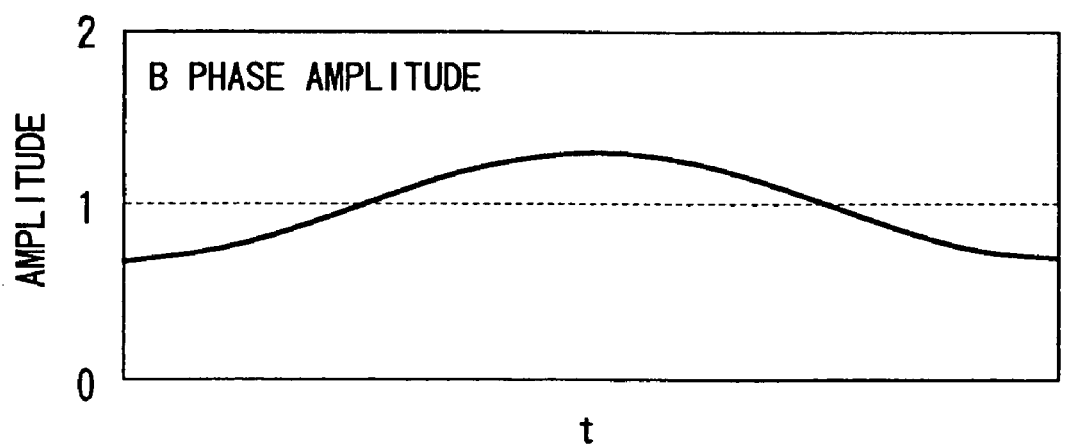

FIG.9
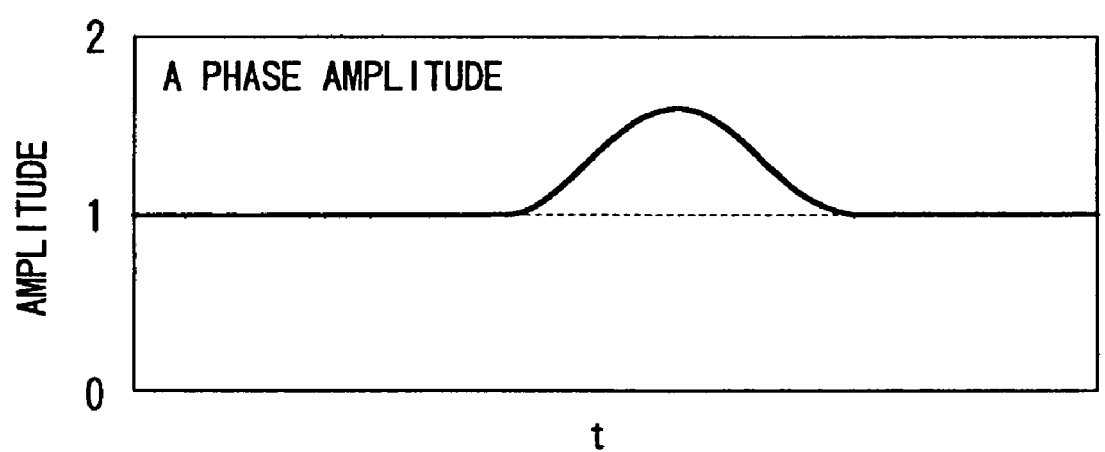
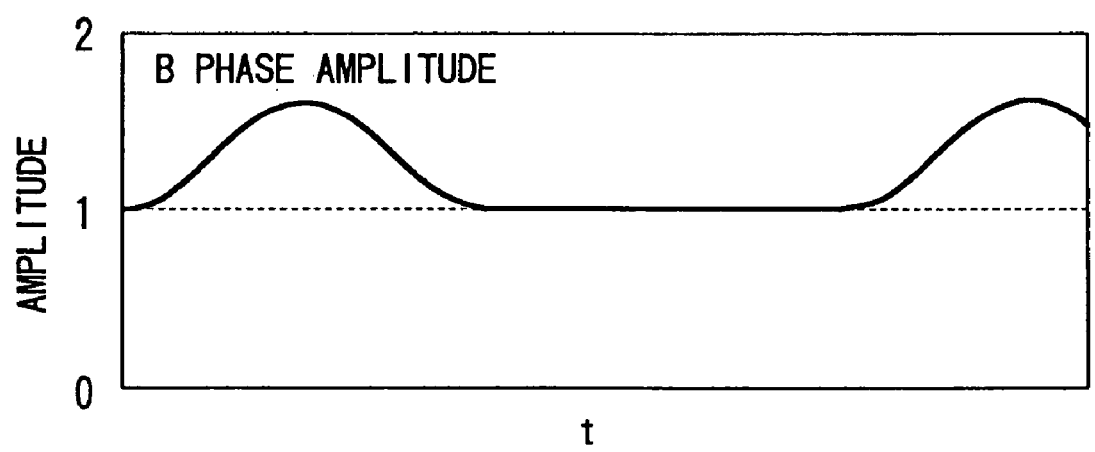

FIG.10
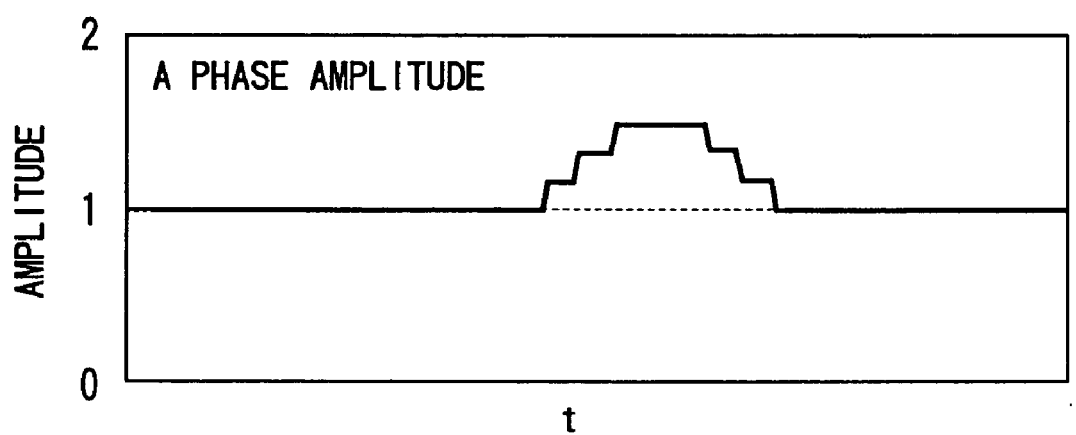
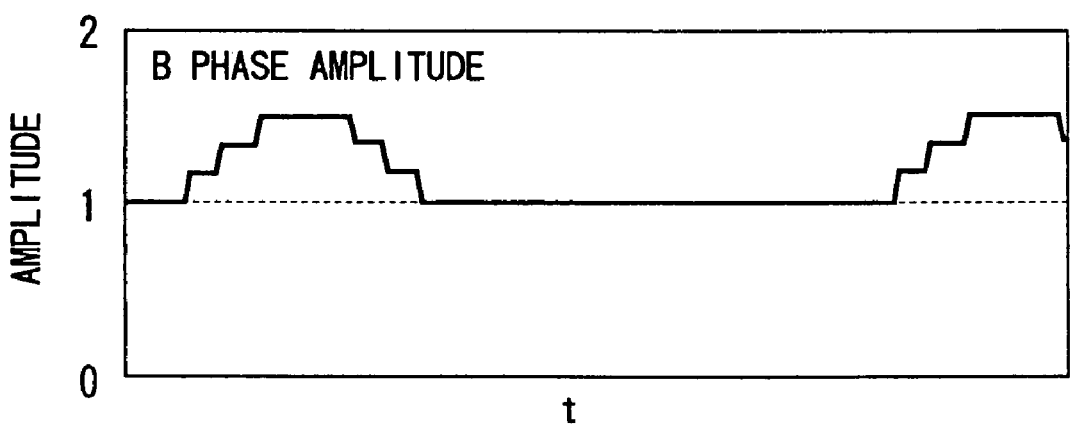

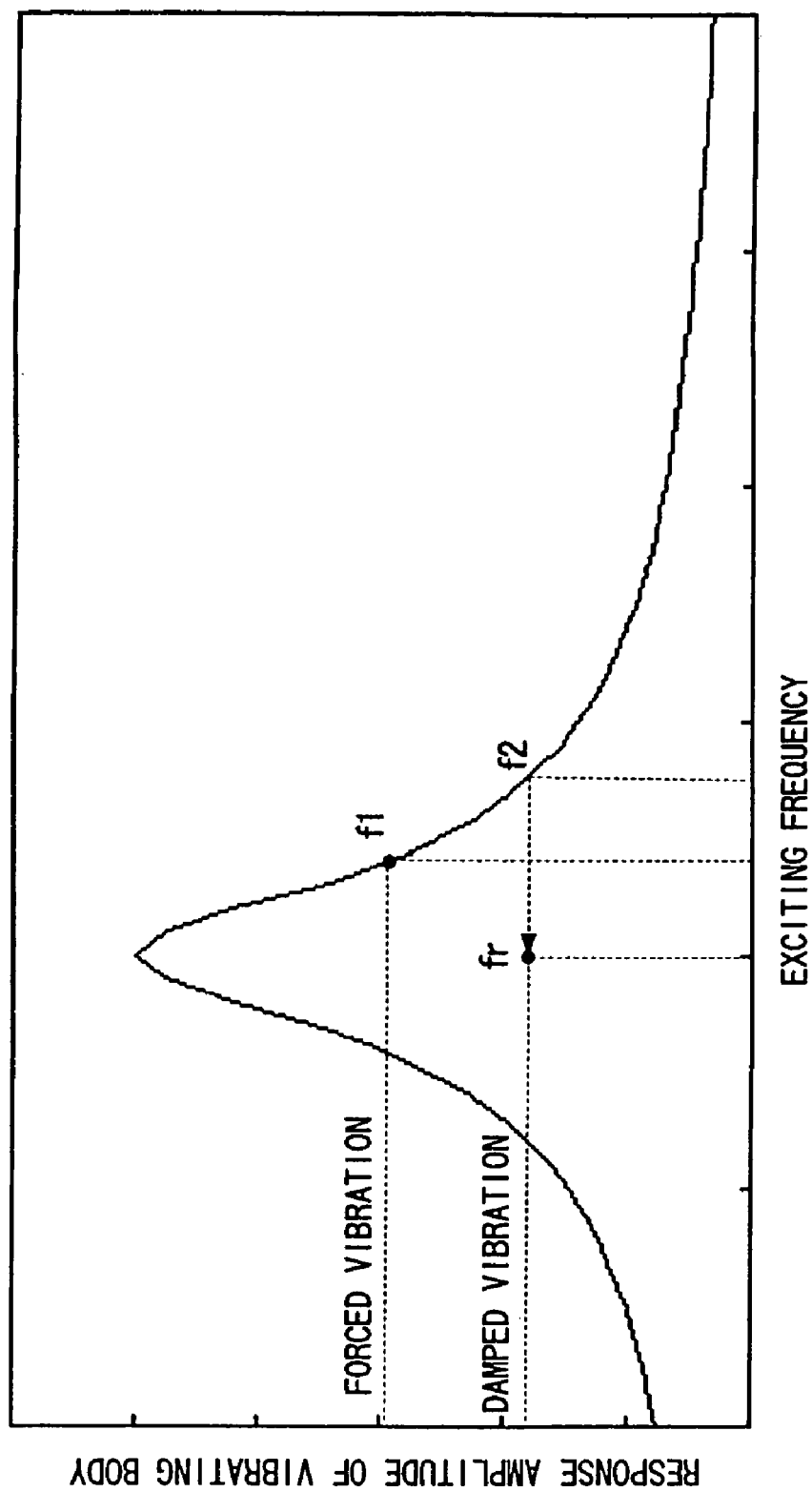

CONTROL APPARATUS CAPABLE OF LOW-SPEED DRIVING OF VIBRATION TYPE DRIVING APPARATUS, ACTUATING APPARATUS USING THE CONTROL APPARATUS, CONTROL METHOD CAPABLE OF LOW-SPEED DRIVING OF VIBRATION TYPE DRIVING APPARATUS, AND STORAGE MEDIUM STORING PROGRAM INCLUDING PROGRAM CODES CAPABLE OF REALIZING THE CONTROL METHOD

BACKGROUND OF THE INVENTION

1. Field of the Invention

The present invention relates to control of a so-called vibration type driving apparatus which uses an electromechanical energy conversion element to form traveling vibrations on an elastic body to relatively move the elastic body (a vibrating body) and a contact body.

2. Description of Related Art

A vibration type driving apparatus which uses an electromechanical energy conversion element to form traveling vibrations on an elastic body to drive a moving body (a contact body) is used as an actuator from which a large driving force at a low speed can be provided.

Particularly, Japanese Patent Application Laid-Open No. 2001-157473 has proposed a vibration type driving apparatus using traveling waves which excites a traveling vibration wave on an elastic body and continuously drives a moving body in press contact with the elastic body to allow more smooth driving.

In the vibration type driving apparatus described in Japanese Patent Application Laid-Open No. 2001-157473, a vibrating body is formed of an annular elastic body in which a group of protrusions in a comb shape is formed on one side of the elastic body in an axis direction. A friction material is bonded to the top surface of the group of protrusions. An annular piezoelectric element is bonded as an electromechanical energy conversion element on the other side of the elastic body in the axis direction, and a pattern electrode is formed on the piezoelectric element.

The pattern electrode is equally divided into electrode elements, the number of which is four times larger than the order of vibration modes excited in the annular portion of the vibrating body. The respective electrode elements are supplied with alternating voltages in a generally sine wave shape having time phases sequentially shifted 90 degrees. When an alternating voltage is supplied at a frequency near the natural frequency of an excited vibration mode, the piezoelectric element expands and contracts to provide bending moment for the elastic body to cause resonance of the elastic body. Vibrations (modes) excited by the alternating voltages having time phases shifted 90 degrees have the same shape and different phases. The vibrations are combined into a traveling vibration wave (a traveling wave).

FIG. 44 shows a driving circuit for driving a vibration type driving apparatus. The driving circuit is described in Japanese Patent Application Laid-Open No. 2002-176788, in which a switching circuit formed of MOSFETs 22 to 29 is controlled to turn on/off with a pulse generated by a pulse generating circuit, not shown, to produce an alternating voltage across transformers 30 and 31 with a center tap, thereby sequentially supplying alternating voltages with phases shifted 90 degrees to terminals 32 to 35 connected to secondary sides of the transformers corresponding to A(+), B(+), A(−), and B(−).

On the other hand, some of so-called standing wave driving type motors in which different vibrations (modes) are superimposed combine longitudinal vibrations with torsional vibrations as proposed in U.S. Pat. No. 5,777,424. In this example, the longitudinal vibrations and torsional vibrations are excited to have a phase difference of 90 degrees to use the longitudinal vibrations as vibrations for causing a vibrating body to separate from or come into contact with a moving body and the torsional vibrations as vibrations for carrying the moving body.

In such a vibration type driving apparatus driven by the superimposed different vibration modes, it is necessary to generally match the resonance frequencies in modes of different vibration directions in order to drive the modes of different vibration directions at the same frequency. However, the matching of the resonance frequencies is difficult because of anisotropy of the materials of the vibrating body and the like even when the vibrating body is formed in a uniform shape, and thus a frequency adjusting step is required.

In contrast, in the aforementioned so-called traveling wave vibration type driving apparatus driven by the superimposed vibrations (modes) of the same shape, the vibration modes have the same deformation distribution, so that the resonance frequency is unlikely to vary depending on the vibrating direction. Thus, almost no adjustment is necessary for matching the resonance frequencies in two modes.

The traveling wave vibration type driving apparatus, however, have the following problems since the vibrations (modes) of the same shape are superimposed.

FIGS. 45A and 45B schematically show a contact and driving state in a vibrating body (an elastic body) and a moving body.

FIGS. 45A and 45B show vibration displacement of a vibrating body 101 and response displacement of a moving body 106, and protrusions on the vibrating body and a friction material are omitted. Shown by solid line arrows in FIGS. 45A and 45B is driving vibration of the vibrating body 101 to drive the moving body 106 in a direction shown by outline arrows. FIG. 45A shows driving at a high speed with a large vibration amplitude, while FIG. 45B shows vibration in driving at a low speed with a smaller vibration amplitude than that in FIG. 45A. The smaller vibration amplitude as shown in FIG. 45B reduces the feed speed at each position to provide a lower speed (the speed is represented by the lengths of the outline arrows).

The moving body 106 is provided with bending rigidity and responsiveness such that a portion thereof is in contact with a portion of the vibrating body 101 where the feed speed is high, that is, where large displacement is produced. However, as the speed is reduced, the area of the vibrating body 101 in contact with the moving body 106 becomes larger, and finally, the vibrating body 101 is driven at a low speed with substantially the entire surface thereof in contact with the moving body 106 as shown in FIG. 45B.

When they are brought into contact in this manner, the efficiency is reduced since sliding friction acts on substantially the entire contact surface due to a partial difference in speed between the vibrating body and the moving body. In addition, wear powder produced on the contact surface is unlikely to be discharged to the outside and serves as grains to increase the wear amount of the moving body and the vibrating body.

Techniques for reducing the speed while the vibration amplitude is maintained to a certain degree include, for example as proposed in Japanese Patent Application Laid-Open No. 8 (1996)-80073, a method of switching to a standing wave at the time of stop, a method of changing to a standing wave by reducing a phase difference between an A phase and a B phase from 90 degrees, and a method of using a smaller vibration amplitude in one of the A phase and the B phase, although as a means, mainly for enhancing vibration responsiveness.

Such methods, however, have adverse effects on the contact surface between the vibrating body and the moving body.

For example, in the annular vibration type driving apparatus, a plurality of vibration modes which cause bending deformation of the vibrating body are superimposed with their positional phases shifted 90 degrees.

FIG. 46 is a developed view schematically showing vibrations of the vibrating body, and specifically, shows the vibrations when A(+), B(+), A(−), and B(−) of a piezoelectric element 102 are supplied with driving voltages having time phases shifted 90 degrees. Ellipses "a" to "g" shown in portions of the vibrating body 101 represent elliptical motions produced at positions of the vibrating body 101. Arrows shown in each ellipse show vibration components of the A and B phases constituting the elliptical motions (solid line arrows show the A phase and dotted line arrows show the B phase).

The vibration components of the A and B phases constituting the elliptical motions have varying directions depending on the positions. If the vibration amplitude of the A phase is reduced to produce a standing wave component, the longitudinal amplitude is reduced at some positions and the transverse amplitude is reduced at other positions to produce an uneven friction state. The unevenness leads to variations in wear speed of the friction surface to reduce flatness of the friction surface, causing degraded performance.

In addition, the maximum traveling wave vibration, that is, a large driving force, is always present at the same position. Thus, variations in surface pressure of the moving body and the vibrating body occur, or vibrations in rotation occur in synchronization with rotation of the moving body due to an uneven plane of the portion of the moving body in contact with the vibrating body, so that rotation accuracy may be reduced.

SUMMARY OF THE INVENTION

It is an object of the present invention to provide a control apparatus and a control method of a vibration type driving apparatus which can maintain output performance even when low-speed driving is continued for a long time.

According to an aspect, the present invention provides a control apparatus for a vibration type driving apparatus which comprises a vibrating body including an elastic body and an electromechanical energy conversion element, and a contact body in contact with the vibrating body, in which a plurality of driving signals are applied to the electromechanical energy conversion element to excite a traveling vibration on the vibrating body to relatively move the vibrating body and the contact body. The control apparatus controls the driving signals such that the largest displacement of the traveling vibration fluctuates and a position where the largest displacement reaches the peak is changed in a direction of the relative movement of the vibrating body and the contact body.

According to another aspect, the present invention provides a control apparatus for a vibration type driving apparatus which comprises a vibrating body including an elastic body and an electro-mechanical energy conversion element, and a contact body in contact with the vibrating body, in which a plurality of driving signals are applied to the electro-mechanical energy conversion element to excite a traveling vibration on the vibrating body to relatively move the vibrating body and the contact body. The control apparatus periodically controls the plurality of driving signals with different time phases such that the largest displacement of the traveling vibration fluctuates and a position where the largest displacement reaches the peak is changed in a direction of the relative movement of the vibrating body and the contact body.

According to still another aspect, the present invention provides a control apparatus for a vibration type driving apparatus which comprises a vibrating body including an elastic body and an electro-mechanical energy conversion element, and a contact body in contact with the vibrating body, in which a plurality of driving signals are applied to the electro-mechanical energy conversion element to excite a plurality of vibrations with the same shape and different positional phases on the vibrating body and the plurality of vibrations are combined into a traveling vibration to relatively move the vibrating body and the contact body. The control apparatus controls the driving signals such that the traveling vibration includes a traveling wave component whose amplitude is constant and a standing wave component whose positional phase changes.

According to yet another aspect, the present invention provides a control apparatus for a vibration type driving apparatus which comprises a vibrating body including an elastic body and an electro-mechanical energy conversion element, and a contact body in contact with the vibrating body, in which a plurality of driving signals are applied to the electromechanical energy conversion element to excite a traveling vibration on the vibrating body to relatively move the vibrating body and the contact body. The control apparatus simultaneously excites a plurality of traveling vibrations with different frequencies.

According to another aspect, the present invention provides a control apparatus for a vibration type driving apparatus which comprises a vibrating body including an elastic body and an electromechanical energy conversion element, and a contact body in contact with the vibrating body, in which a plurality of driving signals are applied to the electro-mechanical energy conversion element to excite a traveling vibration on the vibrating body to relatively move the vibrating body and the contact body. The control apparatus generates a first driving signal exciting a first traveling vibration and a second driving signal exciting a second traveling vibration whose frequency differs from that of the first traveling vibration, each of the first and second driving signal forming a group of intermittent driving signals, and which alternately applies the first driving signal and the second driving signal to the electro-mechanical energy conversion element, furthermore, while an attenuated vibration of one of the first and second traveling vibration occurs, superposes the other traveling vibration thereon.

According to another aspect, the present invention provides a method of controlling a vibration type driving apparatus which comprises a vibrating body including an elastic body and an electro-mechanical energy conversion element, and a contact body in contact with the vibrating body, in which a plurality of driving signals are applied to the electro-mechanical energy conversion element to excite a plurality of vibrations with the same shape and different positional phases on the vibrating body and the plurality of vibrations are combined into a traveling vibration to relatively move the vibrating body and the contact body. The control method controls the driving signals such that the largest displacement of the traveling vibration fluctuates and a position where the largest displacement reaches the peak is changed in a direction of the relative movement of the vibrating body and the contact body.

According to still another aspect, the present invention provides a method of controlling a vibration type driving apparatus which comprises a vibrating body including an elastic body and an electro-mechanical energy conversion element, and a contact body in contact with the vibrating body, in which a plurality of driving signals are applied to the electro-mechanical energy conversion element to excite a plurality of vibrations with the same shape and different positional phases on the vibrating body and the plurality of vibrations are combined into a traveling vibration to relatively move the vibrating body and the contact body. The control method controls the driving signals such that the traveling vibration includes a traveling wave component whose amplitude is constant and a standing wave component whose positional phase changes.

According to yet aspect, the present invention provides a method of controlling a vibration type driving apparatus which comprises a vibrating body including an elastic body and an electro-mechanical energy conversion element, and a contact body in contact with the vibrating body, in which a plurality of driving signals are applied to the electromechanical energy conversion element to excite a traveling vibration on the vibrating body to relatively move the vibrating body and the contact body. The control method simultaneously excites a plurality of traveling vibrations with different frequencies.

According to another aspect, the present invention provides a method of controlling a vibration type driving apparatus which comprises a vibrating body including an elastic body and an electromechanical energy conversion element, and a contact body in contact with the vibrating body, in which a plurality of driving signals are applied to the electromechanical energy conversion element to excite a traveling vibration on the vibrating body to relatively move the vibrating body and the contact body. The control method generates a first driving signal exciting a first traveling vibration and a second driving signal exciting a second traveling vibration whose frequency differs from that of the first traveling vibration, each of the first and second driving signal forming a group of intermittent driving signals, alternately applies the first driving signal and the second driving signal to the electromechanical energy conversion element, furthermore, while an attenuated vibration of one of the first and second traveling vibration occurs, superposes the other traveling vibration thereon.

BRIEF DESCRIPTION OF THE DRAWINGS

FIG. 6 shows the expressions of driving signal waveforms in Embodiment 2;

FIG. 7 includes charts showing driving amplitudes in Embodiment 2;

FIG. 9 includes charts showing driving amplitudes in Embodiment 3;

FIG. 10 includes charts showing driving amplitudes in Embodiment 3;

FIG. 34B shows response amplitudes only in the state 2 in Embodiment 10;

FIG. 36 shows a response amplitude of forced vibration and attenuated vibration in the state 1 in Embodiment 10;

DETAILED DESCRIPTION OF THE PREFERRED EMBODIMENTS

Preferred embodiments of the present invention will be described in detail in accordance with the accompanying drawings.

Embodiment 1

Figure 12:
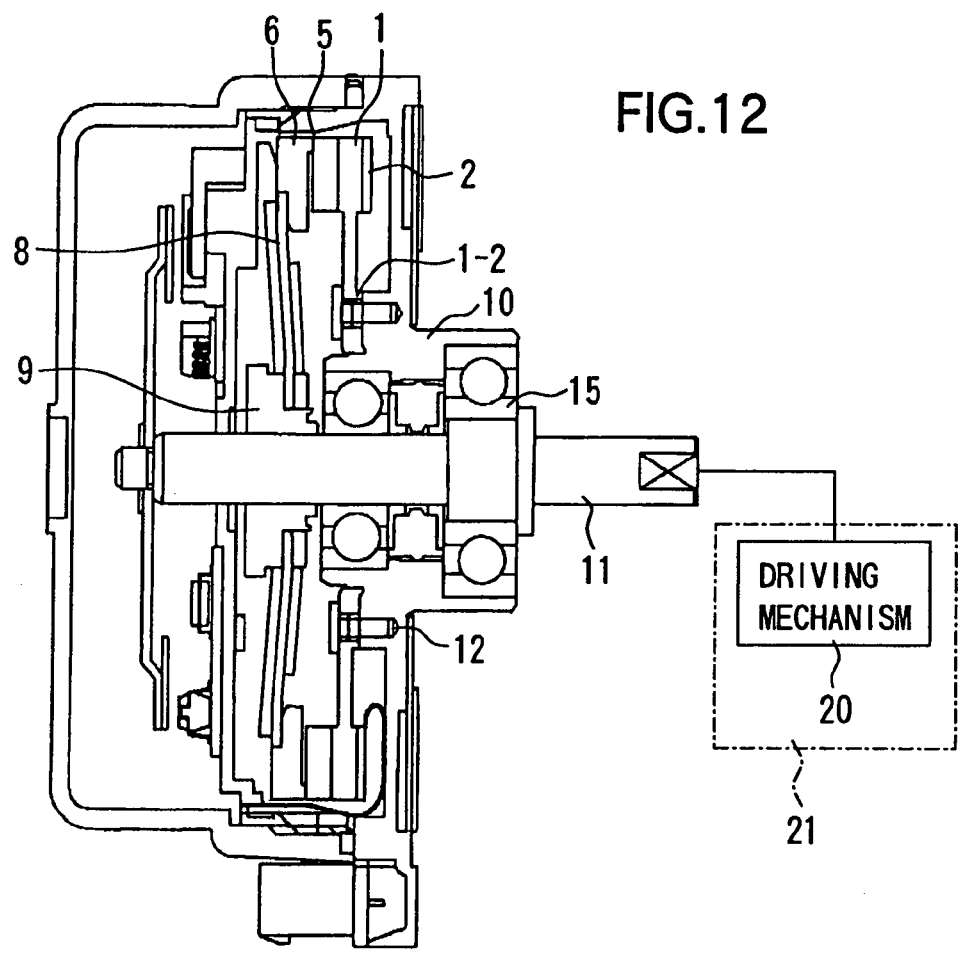
FIG. 12 is a section view showing the structure of the vibration type driving apparatus using traveling waves in each embodiment.

FIG. 12 shows the structure of a vibration type driving apparatus using traveling waves, which is Embodiment 1 of the present invention. The vibration type driving apparatus includes a vibrating body 1 fixed to a housing 10 by screws or the like, a moving body 6 in friction contact with the vibrating body 1 via a friction material 5, an output shaft 11 rotatably supported on the housing 10 by a ball bearing 15, and a pressure spring 8 which produces a spring force for pressing and bringing the moving body 6 into contact with the vibrating body 1 and transmits rotation of the moving body 6 to the output shaft 11. Connected to the output shaft 11 via a gear or the like, not shown, is a driving mechanism 20 of an actuated apparatus 21 such as various types of apparatuses and devices which use the vibration type driving apparatus as a driving source. The driving mechanism 20 is actuated in response to output from the output shaft 11.

Figure 13:
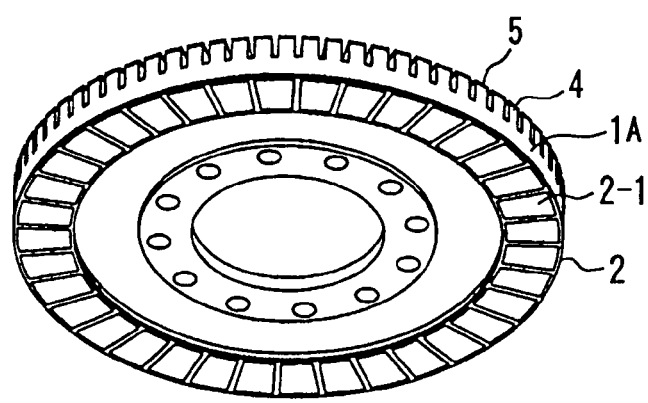
FIG. 13 is a perspective view of the vibrating body used in the aforementioned vibration type driving apparatus.

FIG. 13 is a perspective view of the vibrating body 1 used in the vibration type driving apparatus described above, viewed from the back. The vibrating body 1 is formed of an elastic body 1A made in a ring shape by cutting of a metal material or molding such as powder sintering, and a piezoelectric element 2 in a ring shape serving as an electromechanical energy conversion element bonded to the back of the elastic body 1A. The electromechanical energy conversion element can be realized by an electrostriction element, a magnetostriction element, or the like, other than the piezoelectric element.

A plurality of radial grooves are formed to extend in an axis direction on one side of the elastic body 1A in the axis direction (on the front surface) to provide a plurality of protrusions 4 in a comb shape. The friction material 5 is bonded to the top surface of the protrusions 4. As the friction material, a composite resin material mainly made of PTFE, a metal material subjected to surface treatment in accordance with intended uses, or alumina ceramic is used.

The piezoelectric element 2 is bonded to the surface of the elastic body 1A on the other side in the axis direction (on the side on which the comb-shaped protrusions are not formed). A pattern electrode 2-1 is formed on the piezoelectric element 2 with vapor deposition or printing.

The pattern electrode 2-1 is equally divided into electrode elements, the number of which is four times larger than the order of vibrations (hereinafter also referred to as vibration modes) excited in the elastic body 1A of the vibrating body 1. The respective electrode elements are supplied with alternating voltages in a generally sine wave shape having time phases sequentially shifted 90 degrees. When an alternating voltage is supplied at a frequency near the natural frequency of an excited vibration mode, the piezoelectric element 2 expands and contracts to provide bending moment for the elastic body 1A to cause resonance vibration of the elastic body 1A. Vibrations excited by the alternating voltages having time phases shifted 90 degrees are combined into a traveling wave (a traveling vibration wave).

Figure 1:
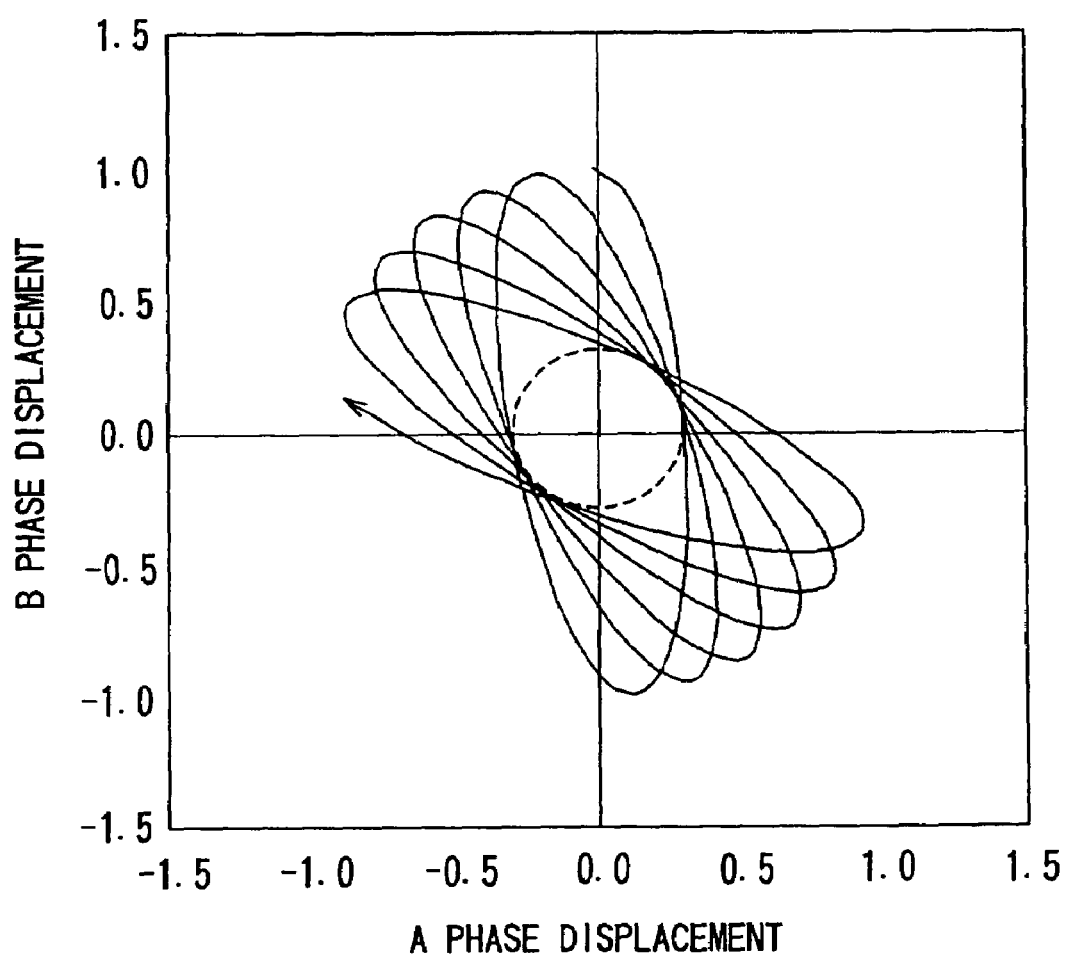
FIG. 1 shows vibration trajectories of a vibrating body in a vibration type driving apparatus controlled by a control apparatus which is Embodiment 1 of the present invention.
Figures 2, 3:
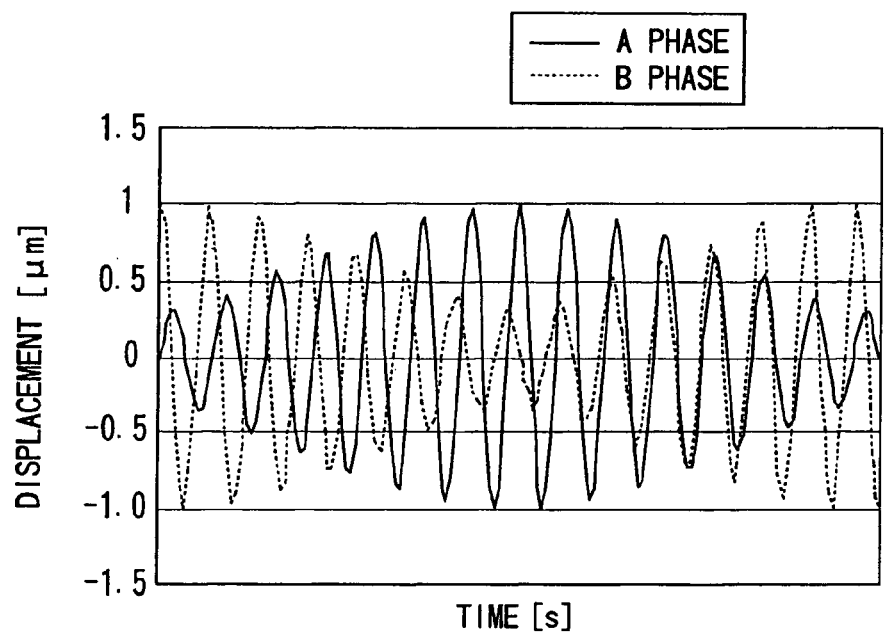
FIG. 2 shows driving signal waveforms in Embodiment 1.
FIG. 3 shows the expressions of the driving signal waveforms in Embodiment 1.

Next, a driving method (a control method) of the aforementioned vibration type driving apparatus is described. FIG. 1 shows vibration trajectories of the vibrating body in an A phase and a B phase. FIG. 2 shows the patterns of driving signals (input signals) supplied to the piezoelectric element 2 via the pattern electrode 2-1. FIG. 3 shows description of the driving signal waveforms.

The vibration trajectories shown in FIG. 1 represent vibration displacement in the A phase and the B phase on the horizontal axis and vertical axis, respectively. Vibrations as shown in FIG. 1 are excited on the vibrating body 1 by the driving signals shown in FIG. 2.

For four-phase driving in which the driving signals are supplied to A(+), B(+), A(−), and B(−) of the piezoelectric element 2, A(+), A(−) and B(+), B(−) are in opposite phase, so that they are collectively shown as the A phase and the B phase (the same applies to the other embodiments).

The driving signals shown in FIG. 2 (A phase driving voltage and B phase driving voltage) are provided by using a driving signal with a driving angular velocity ω shown in FIG. 3 as a fundamental (driving voltage V having a constant amplitude), and simultaneously performing amplitude modulation (with a standing wave amplitude a) and phase modulation (with a turning angle α) thereon. As a result, a standing wave component is produced in a traveling wave as shown in FIG. 1, and in addition, the standing wave component is rotated in the traveling wave on an A-B plane.

Figure 46:
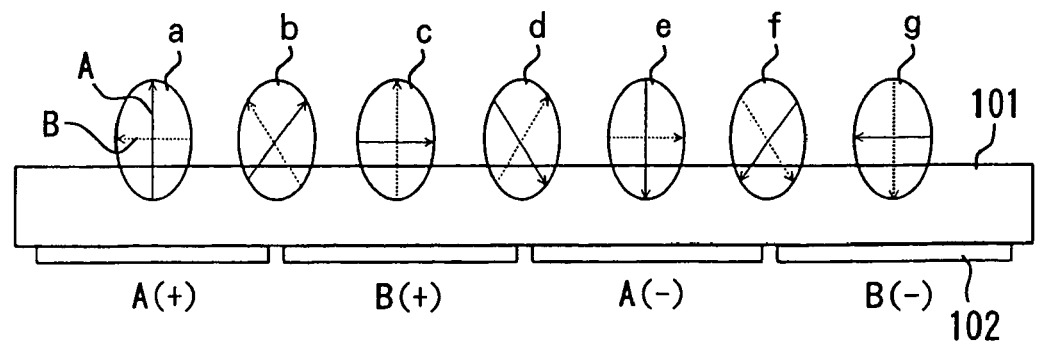
FIG. 46 is a schematic diagram showing vibrations of the vibrating body in the conventional vibration type driving apparatus.

Next, the effects of the driving method are described. In a typical driving method of the vibration type driving apparatus, A phase vibrations and B phase vibrations arranged to have a positional phase difference of π/2 follow a circle trajectory on the A-B plane as shown by a dotted line in FIG. 1 by exciting the vibrations with the equal amplitudes and the time phase difference of π/2. The vibrations of the A and B phases include different vibration directions in the respective portions of the vibrating body as shown in FIG. 46.

FIGS. 4A to 4D are schematic diagrams showing the vibrations of Embodiment 1 shown in FIG. 1 in which vibrations in each portion of the vibrating body 1 are represented in separate components of the A phase and the B phase. The vibrations are changed over time from FIG. 4A to 4B, 4C, and then 4D. Solid line arrows represent vibration components of the A phase, while dotted line arrows represent vibration components of the B phase.

Figure 4A:
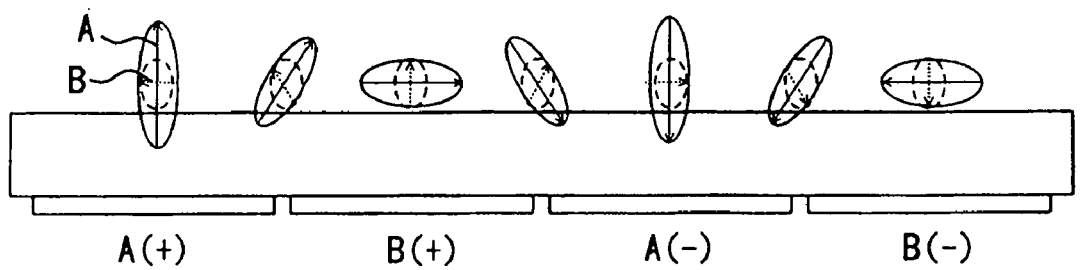
FIGS. 4A to 4D are schematic diagrams showing vibrations of the vibrating body in Embodiment 1.
Figure 4B:
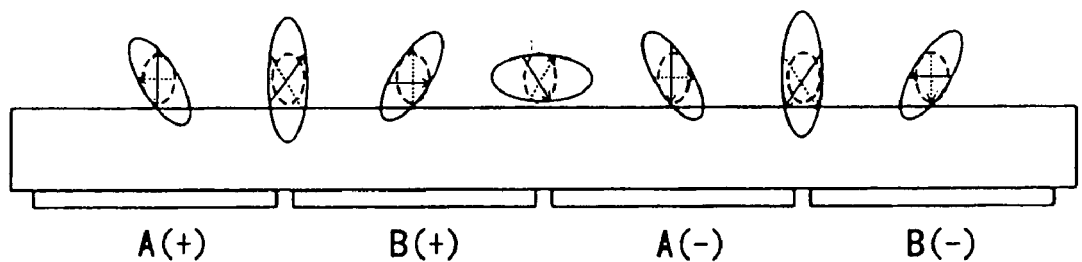

In the state of FIG. 4A, the amplitude of the A phase is greater than the amplitude of the B phase, so that the amplitude is at the maximum at the anti-node of the A phase. Elliptical motions are gradually rotated, and in the state of FIG. 4B, the vibration amplitude is at the maximum between the anti-nodes of the A phase and the B phase. Then, in the state of FIG. 4C, the vibration amplitude is at the maximum at the anti-node of the B phase. After the state of FIG. 4D, the vibration state returns to that in FIG. 4A. In this manner, the standing wave component formed of the A phase and B phase vibrations is rotated as shown in FIG. 1 by performing the amplitude modulation and phase modulation.

As a result, the largest displacement fluctuates in the traveling wave formed by combining the A phase vibrations with the B phase vibrations. In addition, the position at which the largest displacement reaches the peak is moved on the vibrating body 1 in a direction of relative driving of the moving body 1 to the moving body 6.

Figure 15:
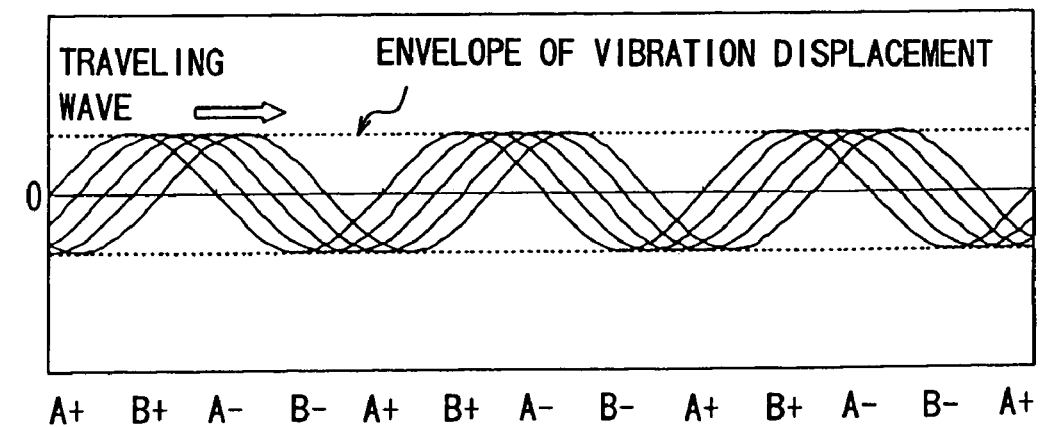
FIG. 15 shows changes in vibration displacement of a traveling wave excited by a conventional control method.

FIG. 15 shows typical (conventional) movement of vibration displacement in a traveling wave when the vibration type driving apparatus is driven at a constant speed and when the A and B phases have the equal vibration amplitudes and the time phase difference of 90 degrees. In FIG. 15, dotted lines represent envelopes which connect the largest values of the vibration displacement of the traveling wave at respective positions. The envelopes are linear since the largest values of the vibration displacement are equal. In other words, the largest displacement of the traveling wave does not fluctuate, and no peak value is present.

Figure 16:
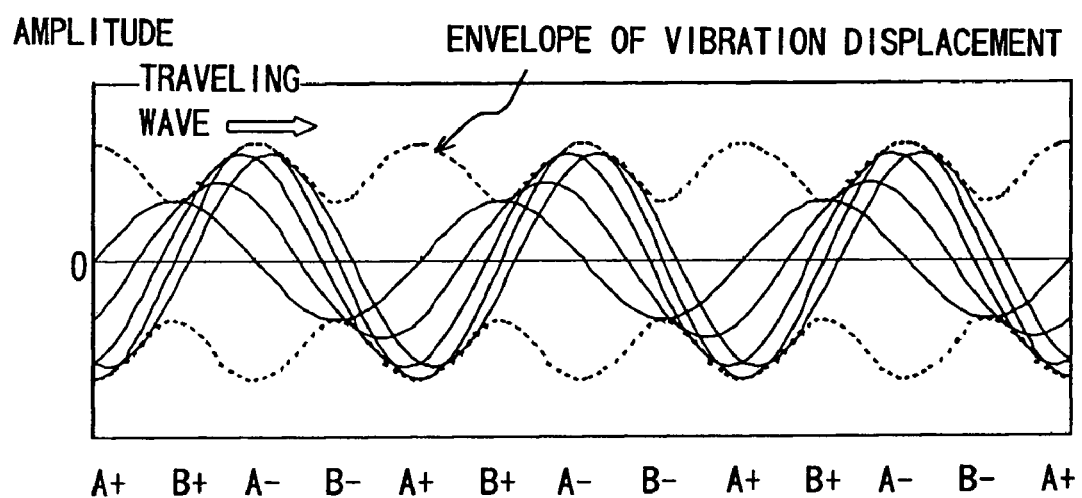
FIG. 16 shows changes in vibration displacement of a traveling wave excited by a conventional control method.

FIG. 16 shows movement of vibration displacement in a traveling wave when the vibration type driving apparatus is driven at a constant speed and when the vibration amplitude of the B phase is reduced as in the conventional low-speed driving method described in the section of "DESCRIPTION OF RELATED ART" with reference to FIG. 46. Since the amplitude is reduced at positions corresponding to the B phase, envelopes connecting the largest displacement of the traveling wave have a generally sine wave shape having the maximums (peaks) at positions of the A phase and a pitch which is half the wavelength of the traveling wave as shown by dotted lines in FIG. 16. When the vibration amplitude of the B phase is reduced to zero, the amplitude at positions corresponding to the B phase is zero to leave a standing wave having the anti-nodes at positions of the A phase. Similarly, when the vibration amplitude of the A phase is reduced, the amplitude is reduced at positions corresponding to positions of the A phase to form envelopes in a generally sine wave shape with the maximums (peaks) at positions of the B phase.

In this manner, in the conventional driving method, the largest value of the vibration displacement of the traveling wave fluctuates, but the largest value reaches the peak at a fixed position in the traveling wave, that is, a position of the A phase or a position of the B phase. When the vibration amplitude of one phase is reduced to produce a standing wave component in this manner, the longitudinal amplitude is reduced at some positions and the transverse amplitude is reduced at other positions. Thus, when the moving body is brought into press contact with the vibrating body, an uneven friction state occurs depending on a contact position. The unevenness leads to variations in wear speed of the friction surface to reduce flatness of the friction surface, causing reduced performance such as increased variations in rotation and unusual sounds produced by the inability to maintain an appropriate contact state.

In addition, since a large vibration amplitude is always present at the same position, variations in surface pressure distribution in the moving body and the vibrating body and an uneven plane of the contact portion of the moving body in contact with the vibrating body constantly cause rotation variations in synchronization with rotation of the moving body, which significantly reduces rotation accuracy.

Similarly, when the time phase difference of the A and B phases is changed from 90 degrees, the amplitude is increased at an intermediate position between the A and B phases to degrade performance.

Figure 14:
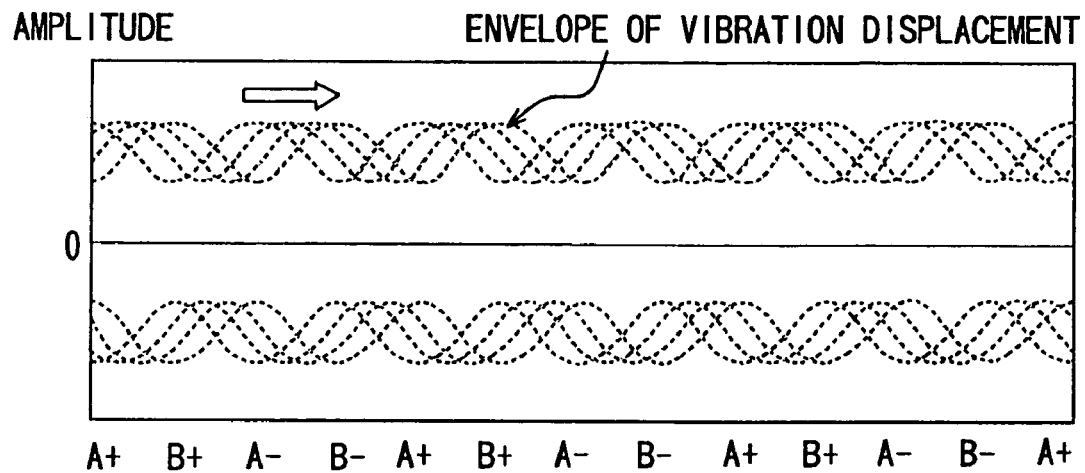
FIG. 14 shows changes in envelopes of vibration displacement of a traveling wave, excited by the control apparatus in Embodiment 1.

In contrast, FIG. 14 shows only envelopes in vibrations excited on the vibrating body 1 with the driving method of Embodiment 1 when the vibration type driving apparatus is driven at a constant speed. FIG. 14 shows changes in the envelopes connecting the largest values of the vibration amplitude at respective positions of the traveling wave. In the conventional driving method, as shown in FIG. 16, the peaks in the envelopes connecting the maximum values of the amplitude are at the fixed positions. In Embodiment 1, however, the peaks in the envelopes of the vibration displacement are moved at a speed determined by a modulation period. In other words, in Embodiment 1, the maximum value (the largest displacement) of the vibration displacement of the traveling wave fluctuates, and the position at which the largest displacement reaches the peak is sequentially or continuously moved.

To allow the vibrating body 1 to respond to the driving signal subjected to the amplitude modulation and phase modulation, it is essential only that sidebands of the driving signal generated in accordance with the modulation frequency fall within a band in which the vibrating body 1 can be driven.

The standing wave component produced by the modulation does not have a driving force large enough to drive the moving body 6. A driving vibration component for driving the moving body 6 is provided by a quadrature component included in the A and B phases. Thus, the driving vibration component corresponds only to elliptical components shown by the dotted lines in FIGS. 4A to 4D, and the driving speed is determined by the sizes of the ellipses shown by the dotted lines.

According to Embodiment 1, driving at a lower speed can be performed while larger vibrations are produced than the driving vibration component. In addition, since the position at which the largest displacement of the traveling wave reaches the peak is continuously moved on the vibrating body 1 in accordance with the modulation period, the vibrating body 1 can be prevented from coming into contact the moving body 6 over the entire surface, thereby avoiding wear progressing in a particular portion thereof.

In addition, in the conventional driving method, variations in surface pressure occur in the moving body, or variations in rotation and torque occur due to the relationship between the plane shape of the contact portion and the peak position of the traveling wave on the vibrating body. However, according to Embodiment 1, the peak position of the traveling wave is moved on the vibrating body to allow variations in rotation and torque to be averaged in the period of the amplitude and phase modulation to significantly reduce variations in rotation and torque at the modulation frequency or lower.

In this manner, in Embodiment 1, the amplitude modulation and the phase modulation are independently performed on the A phase vibrations and B phase vibrations to include the standing wave component in the traveling wave which is formed by combining the A phase and B phase waves. In addition, the vibration shape on the A-B plane can be rotated to sequentially (continuously) move the peak position of the largest displacement of the traveling wave formed on the vibrating body 1. Therefore, stable driving can be achieved for a long time at a large amplitude even under the condition of extremely low-speed driving with small driving vibrations.

Embodiment 2

Figure 5:
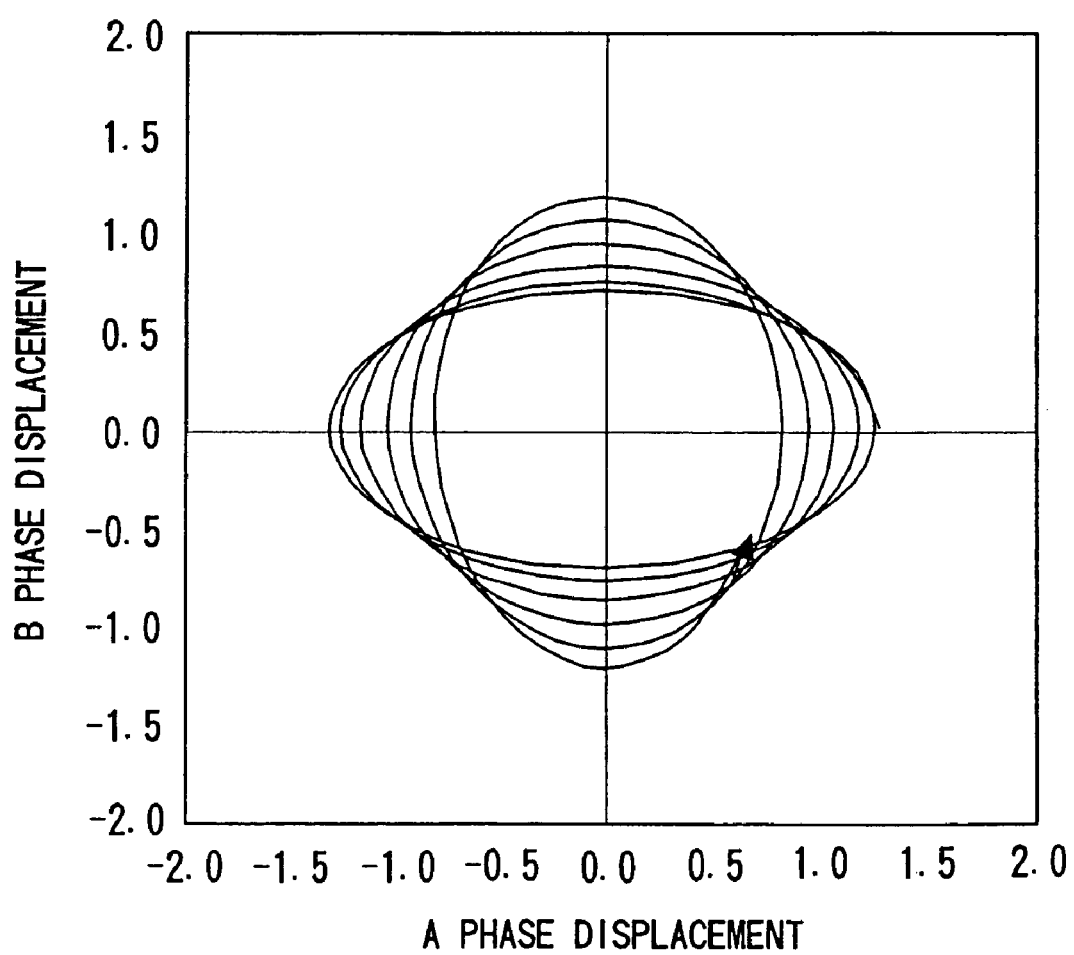
FIG. 5 shows vibration trajectories of a vibrating body in a vibration type driving apparatus controlled by a control apparatus which is Embodiment 2 of the present invention.

FIG. 5 shows vibration trajectories of the vibrating body 1 driven with a driving method (a control method) of the vibration type driving apparatus which is Embodiment 2 of the present invention. The driving method of Embodiment 2 is applied to the vibration type driving apparatus described in Embodiment 1. In Embodiment 2, the peak position of the largest displacement of a traveling wave formed on the vibrating body 1 can be sequentially moved, similarly to Embodiment 1.

FIG. 6 shows a driving signal (an input signal) of Embodiment 2. FIG. 7 shows driving amplitudes of Embodiment 2 on a time axis.

In Embodiment 2, only amplitude modulation is performed on the A phase and the B phase independently.

As shown in FIG. 6, a fundamental amplitude V is amplitude-modulated with a modulation amplitude "a" such that the reverse-modulation is performed on the A and B phases. The amplitude is equally increased in both of the A and B phases when viewed in a longer time period than a driving period.

Figure 4C:
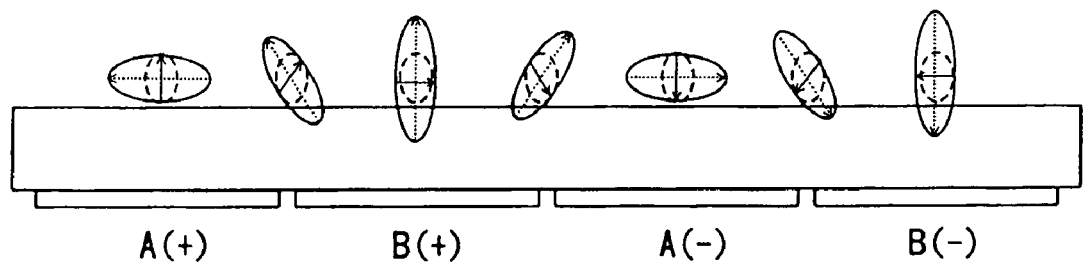
Figure 4D:
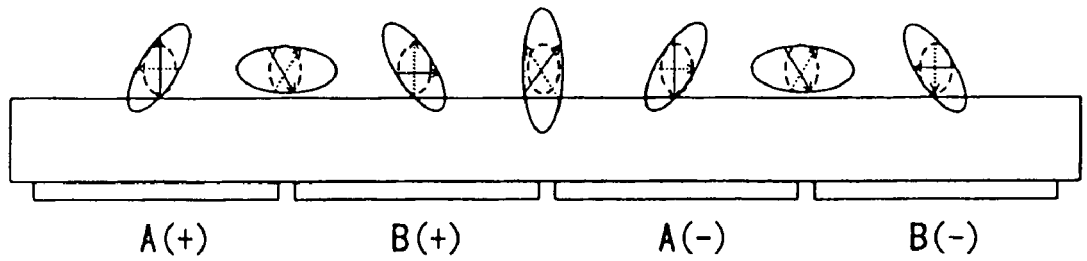

In Embodiment 2, the vibrations shown in FIG. 4A and 4C can be provided. Thus, the amplitude is large at positions corresponding to the anti-nodes of the A phase and the anti-nodes of the B phase, and the amplitude is small in an area between the anti-nodes of the A and B phases, so that it is impossible to provide an uniform contact state over the entire contact portion of the vibrating body 1 and the moving body 6. The resulting uneven wear may increase rotation variations and the like, but such uneven wear equally occurs in both of the A phase and the B phase to cause no imbalance in driving. Thus, Embodiment 2 is effective as a simplified driving method which does not use phase modulation as in Embodiment 1.

Embodiment 3

Figure 8:
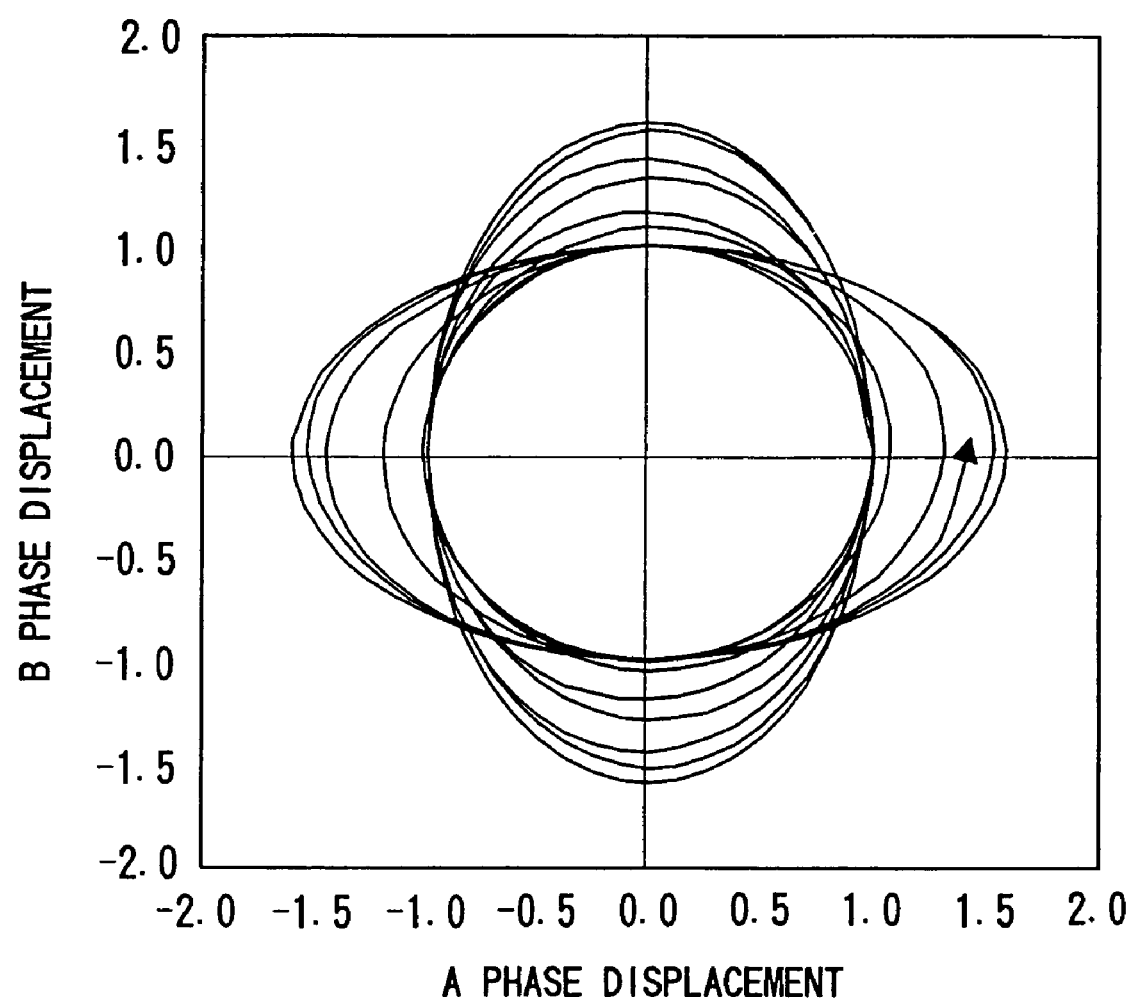
FIG. 8 shows vibration trajectories of a vibrating body in a vibration type driving apparatus controlled by a control apparatus which is Embodiment 3 of the present invention.

FIG. 8 shows vibration trajectories of the vibrating body 1 driven with a driving method (a control method) of the vibration type driving apparatus which is Embodiment 3 of the present invention. The driving method of Embodiment 3 is applied to the vibration type driving apparatus described in Embodiment 1. In Embodiment 3, the peak position of the largest displacement of a traveling wave formed on the vibrating body 1 can be sequentially moved, similarly to Embodiment 1.

FIG. 9 shows amplitude changes in both of the A phase and the B phase in Embodiment 3.

In Embodiment 3, only amplitude modulation is independently performed on driving signals of both of the A and B phases similarly to Embodiment 2. However, Embodiment 3 differs from Embodiment 2 in that the amplitude modulation of the A and B phases is not performed with a single frequency. In Embodiment 3, the modulation may vary the feed speed to increase rotation variations, but Embodiment 3 is effective as a more simplified driving method as compared with Embodiment 2.

In addition, as shown in FIG. 10, the amplitude modulation can be performed with stepped or rectangular waves.

Embodiment 4

Figure 11:
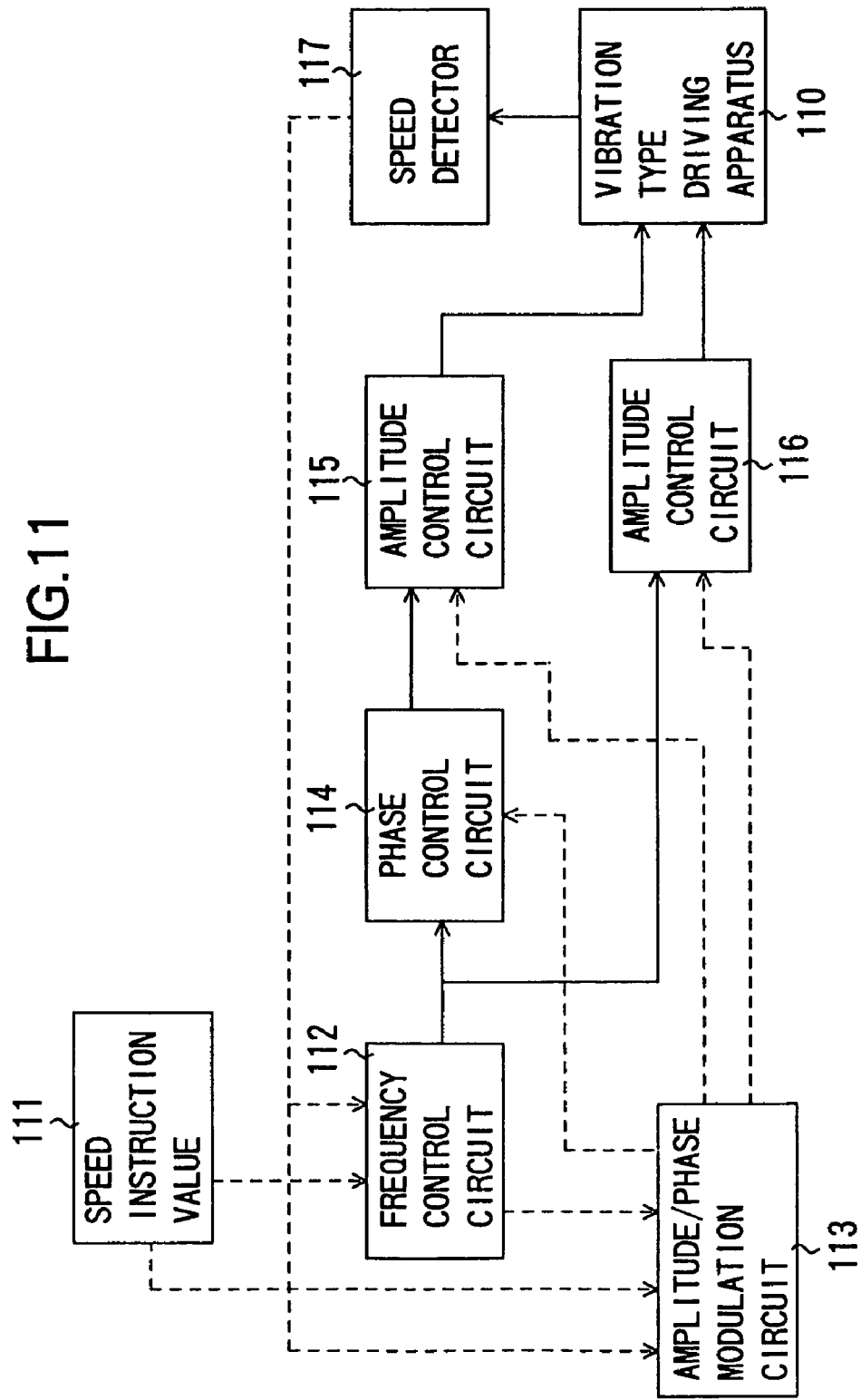
FIG. 11 is a block diagram showing the structure of a control apparatus which is Embodiment 4 of the present invention.

FIG. 11 shows the structure of a control apparatus for the vibration type driving apparatus which is Embodiment 4 of the present invention.

The control apparatus performs speed control of the vibration type driving apparatus (the vibration type driving apparatus shown in FIG. 12) 110, and specifically, uses speed information from a speed detector 117 such as an encoder provided for the vibration type driving apparatus 110 and a speed instruction value supplied from the outside (for example, a main control circuit of an actuated apparatus which uses the vibration type driving apparatus 110 as a driving source) to determine the frequency of a driving signal by a frequency control circuit 112 in accordance with a difference between them. The control apparatus similarly determines an amplitude modulation amount, a phase modulation amount, and periods of amplitude modulation and phase modulation by an amplitude/phase modulation circuit 113 in accordance with the speed difference.

As modulation parameters, an optimal modulation amount (modulation width) and an optimal modulation period corresponding to a speed are previously stored in a memory, not shown. The modulation parameters corresponding to the speed detected by the speed detector 117 are read from the memory and determined. For example, setting is made on the basis of speed ranges such that no modulation is performed in a high speed range, while modulation is performed with a larger modulation amplitude as the speed is lower in a low speed range.

The phase determined by the amplitude/phase modulation circuit 113 is used to provide a phase difference for one of output signals from the frequency control circuit 112 with respect to the other signal. The signal provided with the phase difference and the other signal are used as driving waveforms of the A phase and the B phase, respectively. The two amplitude values for the A and B phases determined by the amplitude/phase modulation circuit 113 are set to amplitude control circuits 115 and 116 independently provided for the A phase and the B phase. The respective amplitude control circuits 115 and 116 supply driving signals to the A phase and the B phase of the piezoelectric element of the vibration type driving apparatus 110 via an amplifying circuit, not shown.

In Embodiment 4, the amplitude and phase modulation amounts are determined in accordance with the driving speed of the vibration type driving apparatus 110. Thus, when the driving speed is high and the amplitude is large, the modulation amount can be reduced. On the other hand, the modulation can be increased at a very low speed at which performance of the vibration type driving apparatus 110 may be degraded. Consequently, appropriate modulation can be achieved in accordance with driving conditions.

While Embodiment 4 has been described only for the speed control of the vibration type driving apparatus, positioning control of the vibration type driving apparatus can be performed similarly such that speed and modulation parameters can be determined from a difference between the current value and a target value provided by a position detector provided for the vibration type driving apparatus 110. When driving is performed in a plurality of phases, the same number of the aforementioned modulation circuits as the driving phases may be provided.

As the amplitude control circuits 115 and 116 described above, a variable gain amplifier may be used, or a pulse width control circuit and an amplifying circuit may be used by using a pulse signal as the driving signal.

Embodiment 5

The control apparatus shown in FIG. 11 requires the amplitude/phase modulation circuit 113 which allows simultaneous calculations of the amplitude modulation and phase modulation of vibrations, and the load on the control apparatus is not light. Thus, in Embodiment 5, a circuit with a more simplified structure is used to provide a control apparatus which achieves the effects similar to those in the control apparatus shown in FIG. 11.

Figure 17:
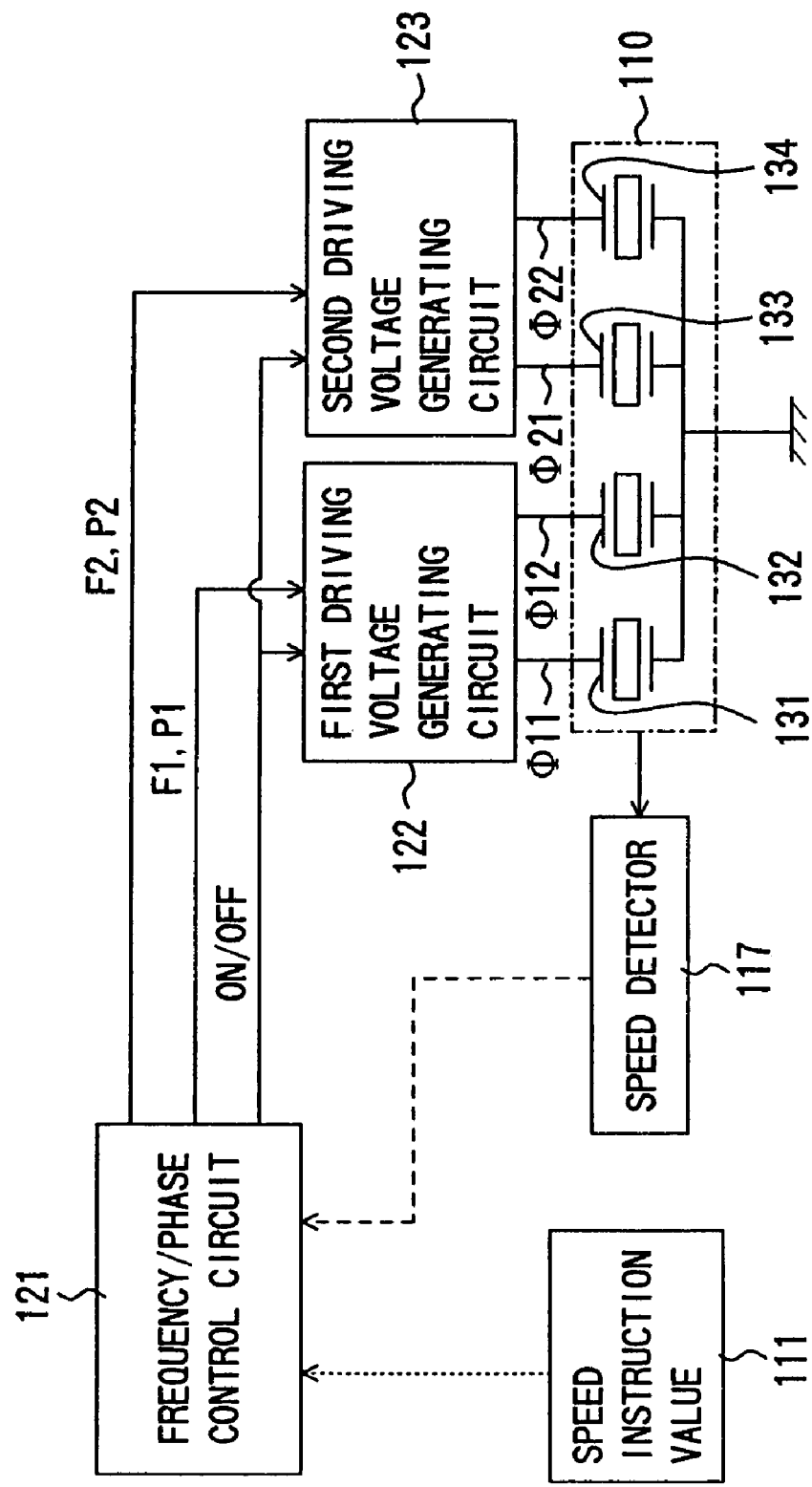
FIG. 17 is a block diagram showing the structure of a control apparatus which is Embodiment 5 of the present invention.

FIG. 17 shows the structure of a control apparatus for the vibration type driving apparatus which is Embodiment 5 of the present invention.

Figure 19:
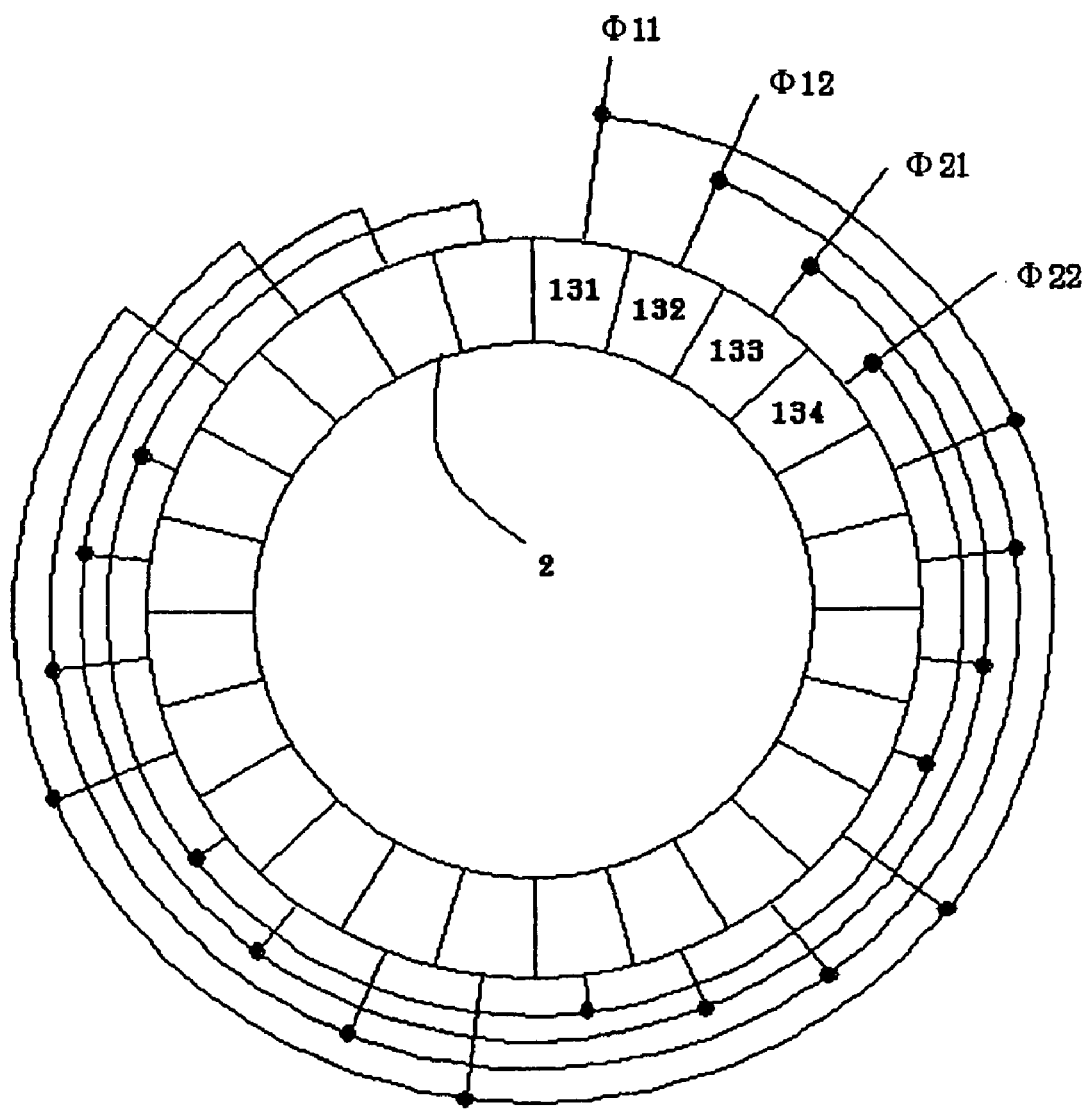
FIG. 19 shows an electrode pattern in a piezoelectric element and connections to electrodes in Embodiment 5.

The structure of the vibration type driving apparatus 110 in Embodiment 5 is equal to that shown in FIG. 12. FIG. 19 shows an electrode pattern provided for the piezoelectric element 2 in Embodiment 5 and is a connection diagram showing connections between each electrode and a first and a second driving voltage generating circuits 122 and 123, later described. Reference numerals 131, 132, 133, and 134 show electrodes corresponding to A(+), B(+), A(−), and B(−) of the pattern electrode of the piezoelectric element 2 provided for the vibration type driving apparatus 110, and the same driving signal is supplied for every four electrodes.

The control apparatus in Embodiment 5 performs speed control of the vibration type driving apparatus 110, and specifically, uses speed information from a speed detector 117 such as an encoder provided for the vibration type driving apparatus 110 and a speed instruction value supplied from the outside (for example, a main control circuit of an actuated apparatus which uses the vibration type driving apparatus 110 as a driving source) to determine frequencies and phases of driving signals by a frequency/phase control circuit 121 in accordance with a difference between them.

As control parameters, an optimal frequency and an optimal phase corresponding to a speed are previously stored in a memory, not shown. The control parameters corresponding to the speed detected by the speed detector 117 are read from the memory and determined.

The frequency instructions F1 and F2 and the phase instructions P1 and P2 determined by the frequency/phase control circuit 121 are input to the first driving voltage generating circuit 122 and the second driving voltage generating circuit 123, respectively. The frequency/phase control circuit 121 supplies an ON/OFF instruction for controlling driving (with an ON instruction) and stop (with an OFF instruction) of the first driving voltage generating circuit 122 and the second driving voltage generating circuit 123 to the first driving voltage generating circuit 122 and the second driving voltage generating circuit 123, respectively.

The first driving voltage generating circuit 122 supplies driving signals Φ11 and Φ12 in accordance with the frequency instruction F1 and the phase instruction P1 to the electrodes 131 and 132 of the piezoelectric element 2. The second driving voltage generating circuit 123 supplies driving signals Φ21 and Φ22 in accordance with the frequency instruction F2 and the phase instruction P2 to the electrodes 133 and 134 of the piezoelectric element 2.

Figure 18:
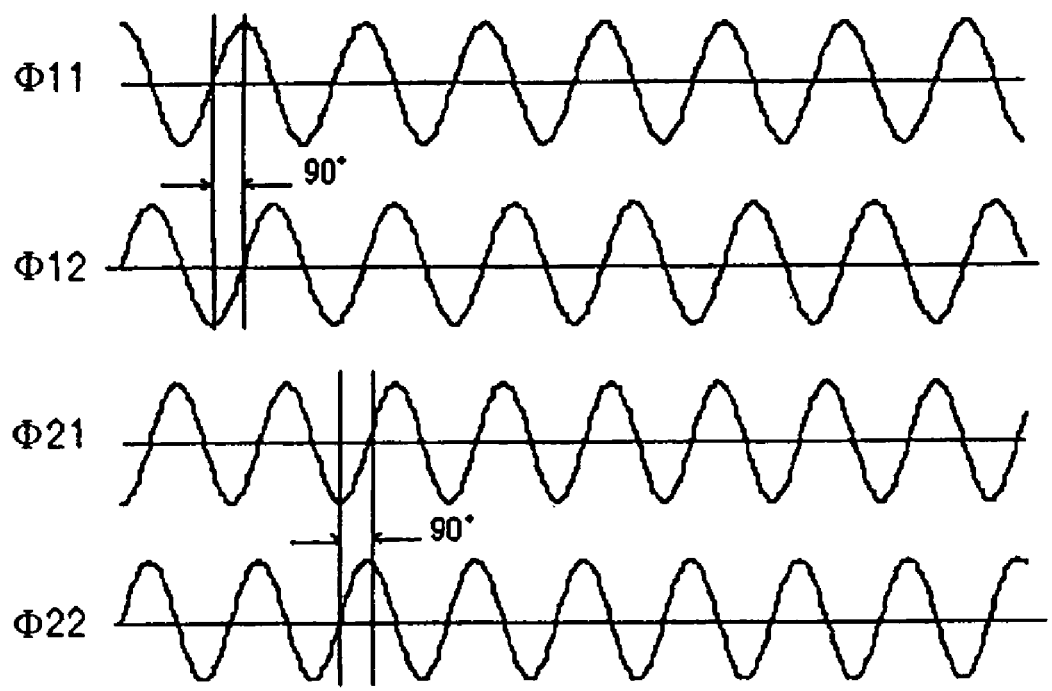
FIG. 18 shows driving signal waveforms in Embodiment 5.

FIG. 18 shows the driving waveforms of the driving signals Φ11, Φ12, Φ21, and Φ22. The signal Φ12 has a frequency equal to the signal Φ11 and has a time phase lagging the signal Φ11 by 90 degrees. The signal Φ22 has a frequency equal to the Φ21 and has a time phase leading the signal Φ21 by 90 degrees. The frequencies of the signals Φ21 and Φ22 are set to be higher than the frequencies of the signals Φ11 and Φ12 by several hundreds to several KHz. The shift of the time phase between the signals Φ21 and Φ22 is opposite in direction to the shift of the time phase between the signals Φ11 and Φ12, so that the traveling direction of a traveling vibration wave produced by the driving signals Φ11 and Φ12 is opposite to the traveling direction of a traveling vibration wave produced by the driving signals Φ21 and Φ22.

If the traveling vibration wave of six waves formed by the driving signals Φ11 and Φ12 is rotated clockwise on the vibrating body 1, a traveling wave of six waves formed by the driving signals Φ21 and Φ22, similarly to the traveling wave with Φ11, Φ12 is rotated counterclockwise on the vibrating body 1.

Figure 20:
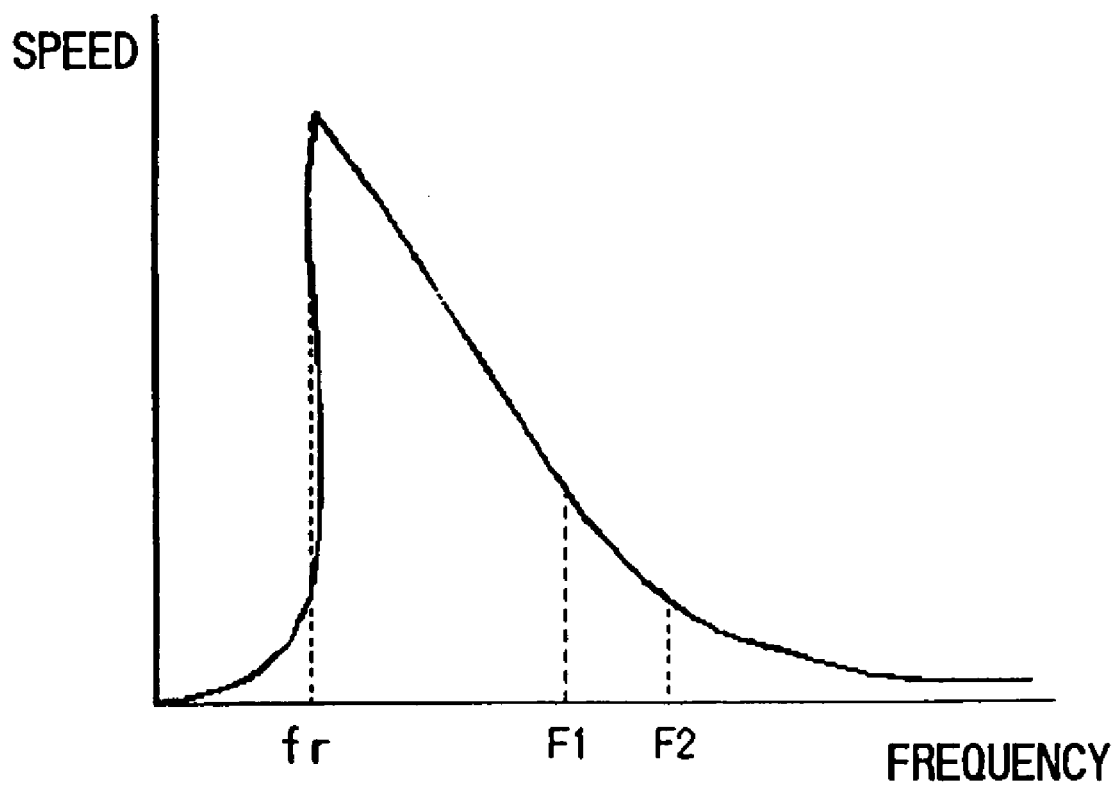
FIG. 20 shows a frequency-speed characteristic of the vibration type driving apparatus.

FIG. 20 shows the characteristic of the frequency of the driving signals and the rotation speed of the moving body 6 when the driving signals Φ11 and Φ12 have a time phase difference of 90 degrees and the characteristic of the frequency of the driving signals and the rotation speed of the moving body 6 when the driving signals Φ21 and Φ22 have a time phase difference of 90 degrees. The vertical axis represents the rotation speed of the moving body 6, while the horizontal axis represents the frequency of the driving signals Φ11, Φ12, Φ21, and Φ22. In Embodiment 5, the electrodes 131, 132, 133, and 134 are disposed at equal intervals, and the driving signals Φ11, Φ12, Φ21, and Φ22 have the amplitudes (voltages) set to be equal, so that the traveling vibration wave with the driving signals Φ11 and Φ12 and the traveling vibration wave with the driving signals Φ21 and Φ22 have substantially the same frequency characteristics.

The vibration type driving apparatus 110 is subjected to driving control in a higher frequency range than its resonance frequency fr as shown in FIG. 20, and has the characteristic that the rotation speed is higher as the frequency of the driving signal approaches the resonance frequency fr. When the frequency F1 of the driving voltages Φ11 and Φ12 is set to be lower than the frequency F2 of the driving signals Φ21 and Φ22, the amplitude of the traveling vibration wave formed on the vibrating body 1 formed by the driving signals Φ11 and Φ12 is larger. Thus, the rotation caused by the traveling vibration wave formed by the driving signals Φ11 and Φ12 is larger than the rotation caused by the traveling vibration wave formed by the driving signals Φ21 and Φ22, and the rotation direction of the moving body 6 is determined by the traveling vibration wave formed by the driving signals Φ11 and Φ12.

In Embodiment 5, since the traveling vibration wave formed by the driving signals Φ11 and Φ12 travels clockwise, the rotation direction of the moving body 6 is counterclockwise which is the opposite direction thereto. In the vibration type driving apparatus, the moving body travels in a direction opposite to the traveling direction of the traveling vibration wave, although detailed description is omitted since it is known. The traveling vibration waves in the difference directions can be combined to drive the vibration type driving apparatus 110 at a lower speed than the conventional apparatus without changing the amplitude of the driving voltage.

Since the frequency of the traveling vibration wave formed by the driving signals Φ11 ad Φ12 is different from the frequency of the traveling vibration wave formed by the driving signals Φ21 and Φ22, the maximum value of vibration displacement (the largest displacement) produced by combining the two traveling vibration waves fluctuates, and the position at which the largest displacement reaches the peak is sequentially moved. The traveling vibration wave refers to a vibration wave which rotates (travels) along the circumference of the ring-shaped vibrating body in the aforementioned example, and is a generic name for vibrations which form elliptical vibrations (circular vibrations) on part of the vibrating body resulting from the combination of a plurality of exciting signals in different phases. The combination of the two traveling vibration waves refers to combination (addition) of elliptical vibrations with different frequencies.

Embodiment 6

While the two traveling vibration waves are combined in Embodiment 5, three or more traveling vibration waves may be combined for excitation at another vibrating frequency or in another vibration mode. In this case, it is necessary to increase the number of electrodes of the piezoelectric element 2 supplied with the driving signals and the number of driving voltage generating circuits in accordance with the number of traveling vibration waves to be produced. In addition, while the two traveling vibration waves with the opposite directions are combined in Embodiment 5, in some driving conditions, specifically when driving at a higher speed is required, the vibration type driving apparatus 110 can be driven by sequentially shifting the time phases of the driving signals Φ11, Φ12, Φ21, and Φ22 by 90 degrees and matching the frequencies thereof to produce a single traveling vibration wave similarly to the conventional example.

Figure 21:
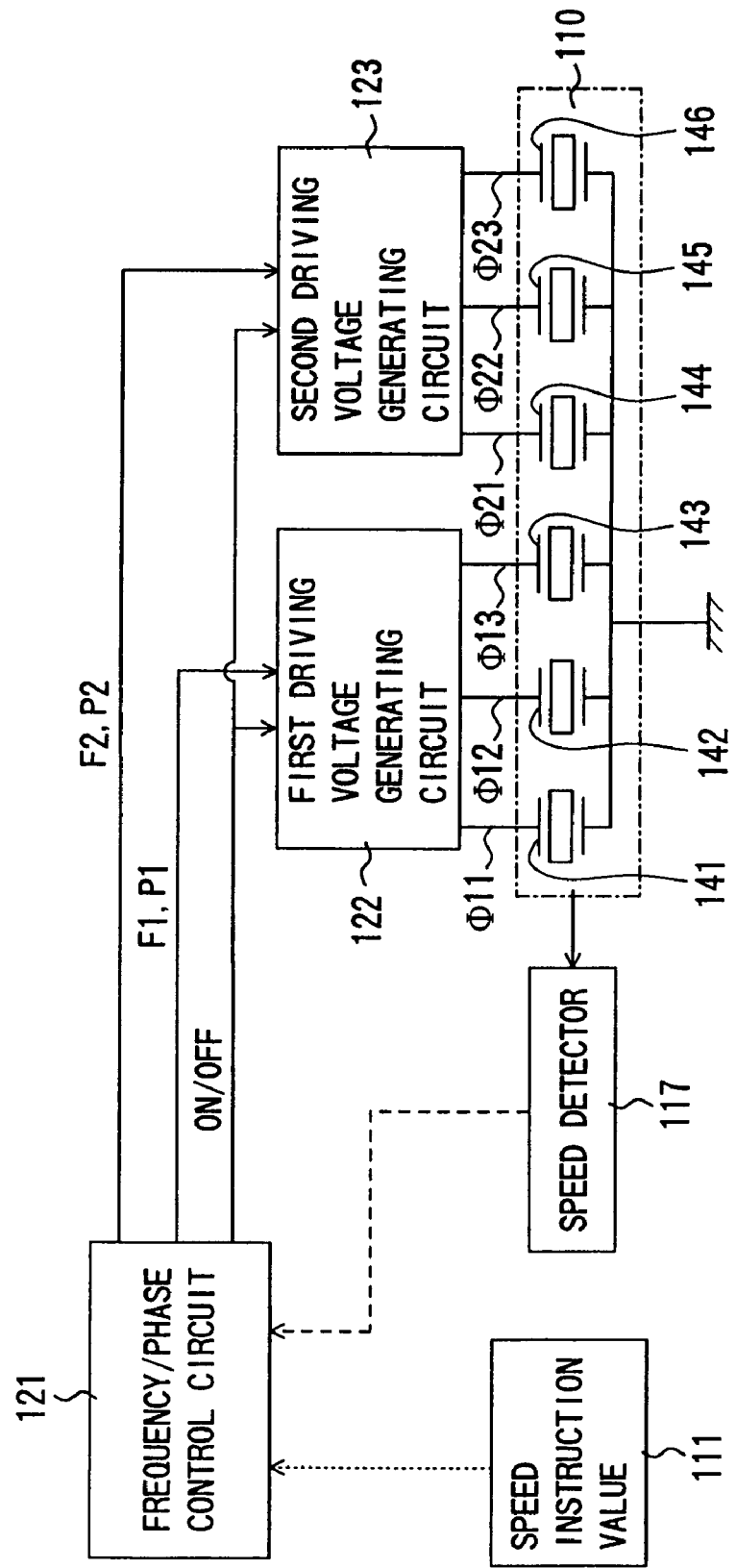
FIG. 21 is a block diagram showing the structure of a control apparatus which is Embodiment 6 of the present invention.

FIG. 21 shows the structure of a control apparatus for the vibration type driving apparatus using traveling waves when a single traveling vibration wave is produced by driving signals with three phases, which is Embodiment 6 of the present invention.

Figure 23:
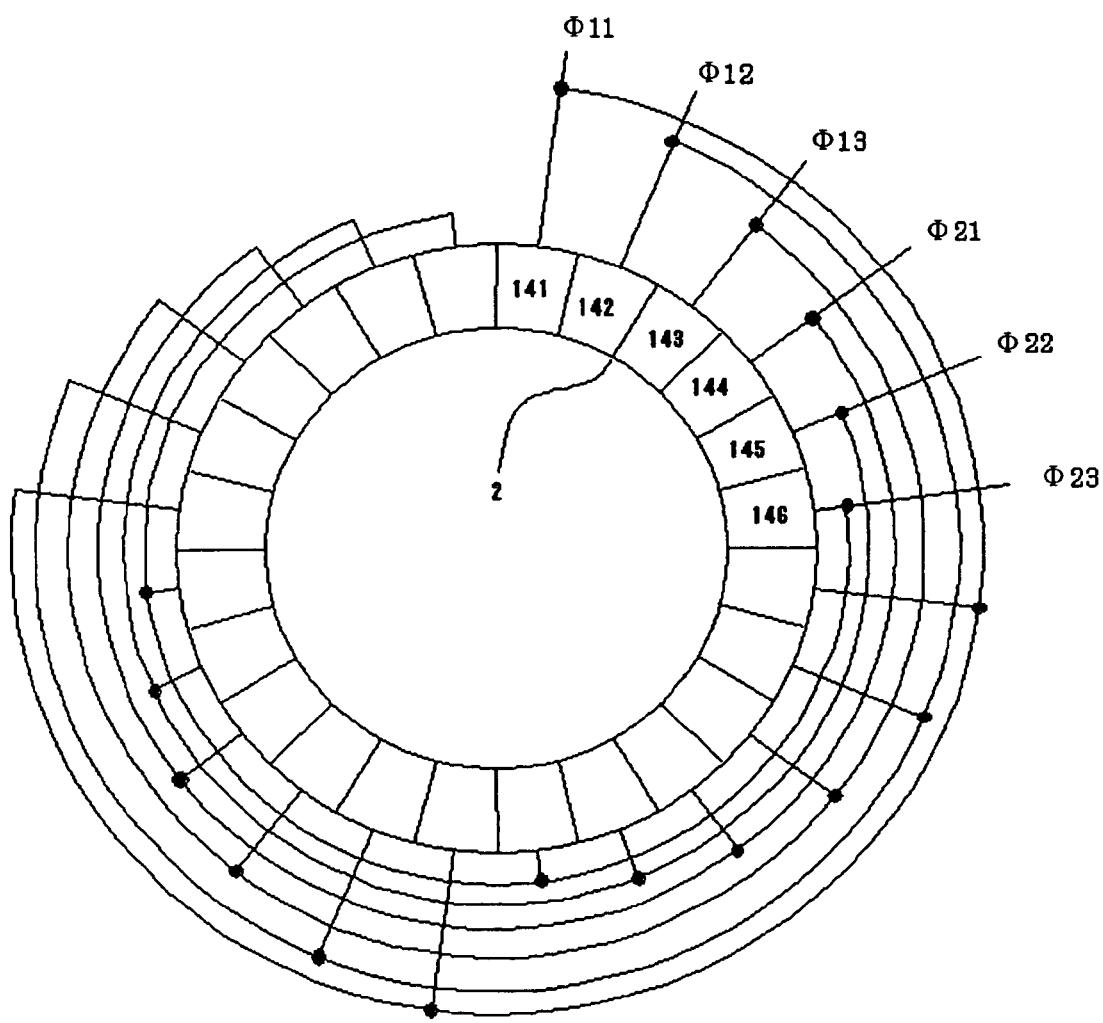
FIG. 23 shows an electrode pattern in a piezoelectric element and connections to electrodes in Embodiment 6.

FIG. 23 shows an electrode pattern provided for the piezoelectric element 2 and is a connection diagram showing connections between each electrode and a first and a second driving voltage generating circuits 122 and 123, later described. Electrodes 141, 142, 143, 144, 145, and 146 are repeatedly formed clockwise on the piezoelectric element 2 and the same driving signal is supplied for every six electrodes.

Frequency instructions F1 and F2 and phase instructions P1 and P2 determined by a frequency/phase control circuit 121 are input to the first driving voltage generating circuit 122 and the second driving voltage generating circuit 123, respectively. The frequency/phase control circuit 121 supplies an ON/OFF instruction for controlling driving and stop of the first driving voltage generating circuit 122 and the second driving voltage generating circuit 123 to the first driving voltage generating circuit 122 and the second driving voltage generating circuit 123, respectively.

The first driving voltage generating circuit 122 supplies driving signals Φ11, Φ12, and Φ13 in accordance with the frequency instruction F1 and the phase instruction P1 to the electrodes 141, 142, and 143 of the piezoelectric element 2, while the second driving voltage generating circuit 123 supplies driving signals Φ21, Φ22, and Φ23 in accordance with the frequency instruction F2 and the phase instruction P2 to the electrodes 144, 145, and 146 of the piezoelectric element 2.

Figure 22:
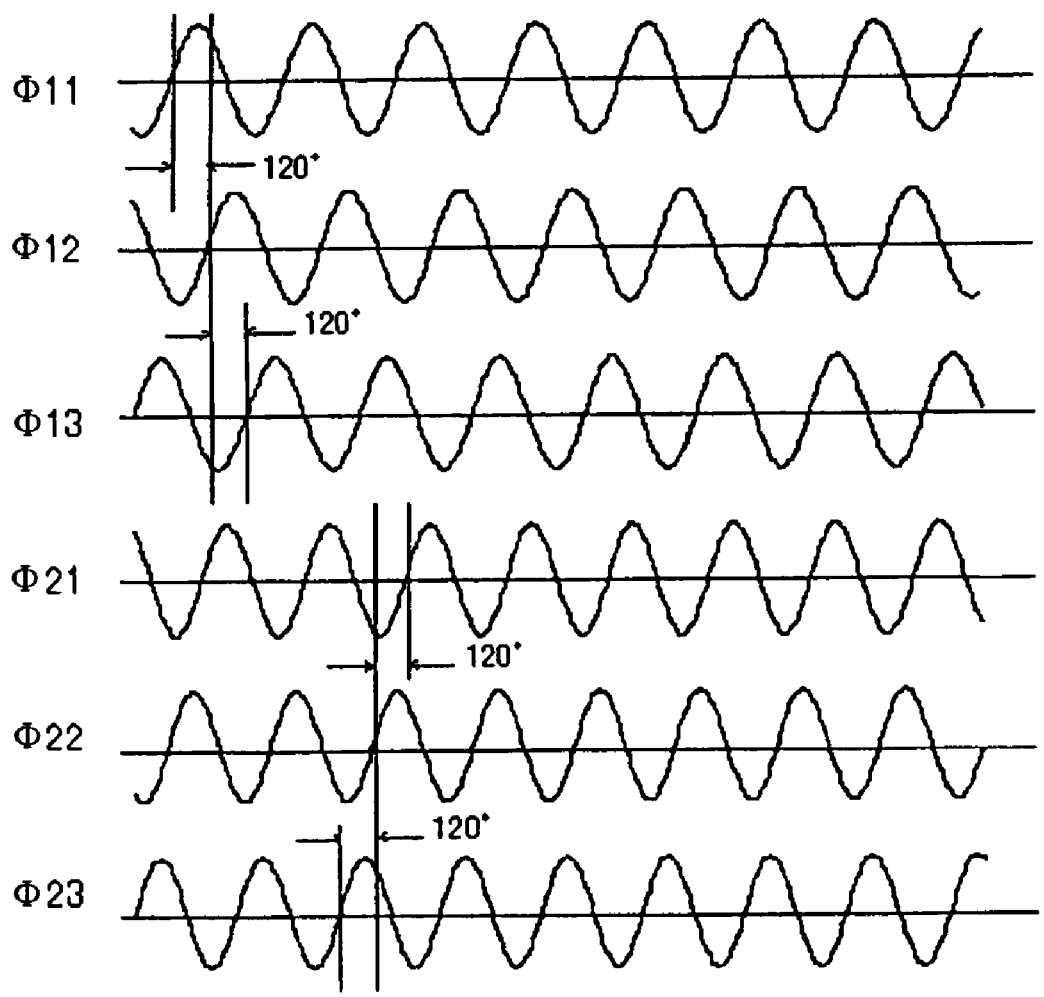
FIG. 22 shows driving signal waveforms in Embodiment 6.

As shown in FIG. 22, the signals Φ11, Φ12, and Φ13 have the equal frequencies, the signal Φ12 has a time phase lagging the signal Φ11 by 120 degrees, and the signal Φ13 has a time phase lagging the signal Φ12 by 120 degrees. The signals Φ21, Φ22, and Φ23 have the equal frequencies, the signal Φ22 has a time phase leading the signal Φ21 by 120 degrees, and the signal Φ23 has a time phase leading the signal Φ22 by 120 degrees. The signals Φ21, Φ22, and Φ23 have the frequencies set to be higher than the frequencies of the signals Φ11, Φ12, and Φ13 by several hundreds or several KHz. The driving signals Φ11, Φ12, Φ13, Φ21, Φ22, and Φ23 are supplied to form two traveling vibration waves of eight waves with different traveling directions on the vibrating body 1.

Similarly to Embodiment 5, the rotation of the traveling vibration wave formed by the driving signals Φ11, Φ12, and Φ13 is larger than the rotation of the traveling vibration wave formed by the driving signals Φ21, Φ22, and Φ23. The rotation direction of the moving body 6 is determined by the traveling vibration wave formed by the driving signals Φ11, Φ12, and Φ13.

Embodiment 7

Embodiment 5 and Embodiment 6 have shown the examples in which the electrodes are separately provided for the respective ones of the driving signals required for forming the plurality of traveling vibration waves. In the structure, each electrode has a smaller area as the number of the driving signals is increased, and a higher voltage needs to be supplied to each electrode to increase the amplitude of the traveling vibration wave.

To address this, a conceivable method is to supply a plurality of driving signals to a common electrode. For example, a differential amplifier or the like is used to generate a driving voltage having two or more frequency instructions and phase instructions for supply to a common electrode.

Figure 24:
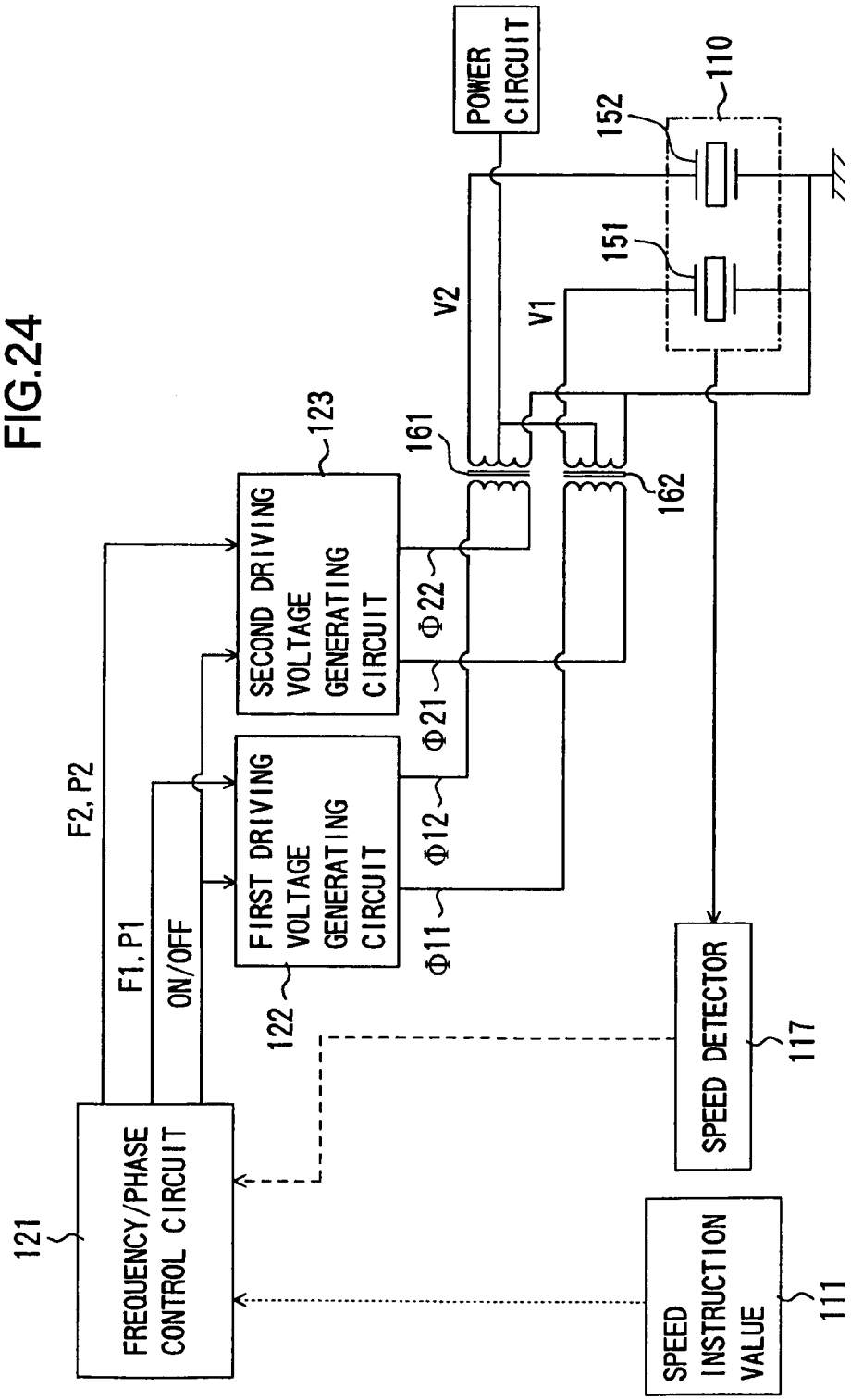
FIG. 24 is a block diagram showing the structure of a control apparatus which is Embodiment 7 of the present invention.

FIG. 24 shows the structure of a control apparatus for the vibration type driving apparatus which is Embodiment 7 of the present invention for realizing the aforementioned structure.

Electrodes 151 and 152 are repeatedly formed on the piezoelectric element 2 along its circumferential direction, and the same driving signal is supplied for every other electrode.

Frequency instructions F1 and F2 and phase instructions P1 and P2 determined by a frequency/phase control circuit 121 are input to a first driving voltage generating circuit 122 and a second driving voltage generating circuit 123, respectively. The frequency/phase control circuit 121 supplies an ON/OFF instruction for controlling driving and stop of the first driving voltage generating circuit 122 and the second driving voltage generating circuit 123 to the first driving voltage generating circuit 122 and the second driving voltage generating circuit 123, respectively.

The first driving voltage generating circuit 122 is connected to one ends on the primary sides of a transformer 161 and a transformer 162, while the second driving voltage generating circuit 123 is connected to other ends on the primary sides of the transformer 161 and the transformer 162.

The first driving voltage generating circuit 122 supplies driving signals Φ11 and Φ12 in accordance with the frequency instruction F1 and the phase instruction P1 to the one ends on the primary sides of the transformers 161 and 162, while the second driving voltage generating circuit 123 supplies driving signals Φ21 and Φ22 in accordance with the frequency instruction F2 and the phase instruction P2 to the other ends on the primary sides of the transformers 161 and 162.

The transformers 161 and 162 constitute a differential amplifier. The diving signals with difference frequencies and phases are input to the two terminals on each primary side of the transformer 161 and the transformer 162 to output a vibration wave formed by adding and amplifying the signals on each secondary side. The inductance on each secondary side of the transformers 161, 162 is adjusted such that the parallel resonance frequency calculated from the inductance and the capacitance in the piezoelectric elements corresponding to the electrodes 151 and 152 is at a value for allowing predetermined performance in a using driving frequency range.

Figure 25:
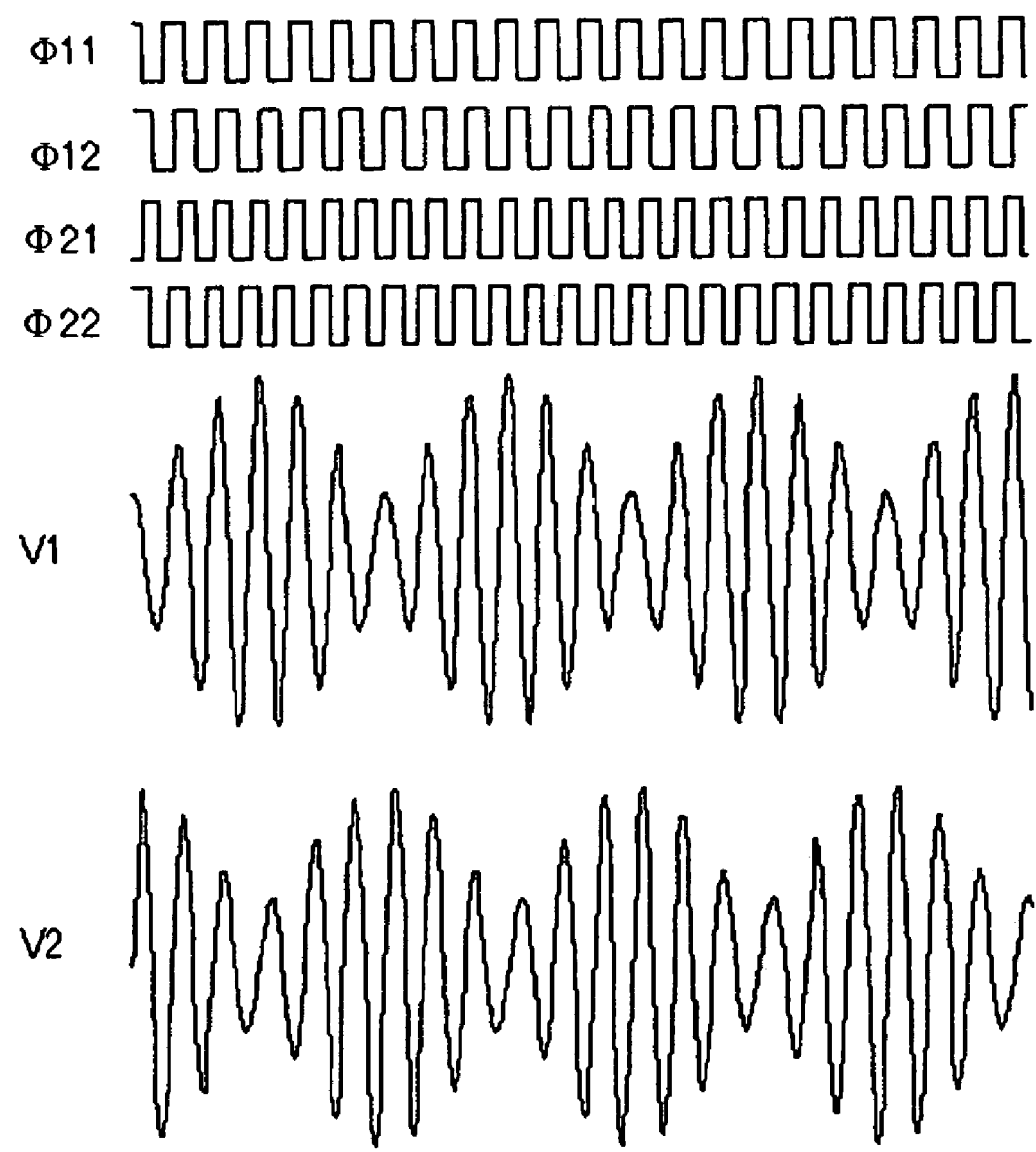
FIG. 25 shows driving signal waveforms and output signal waveforms on secondary sides of transformers in Embodiment 7.

FIG. 25 shows the driving waveforms of the driving signals Φ11, Φ12, Φ21, and Φ22, an output voltage V1 on the secondary side of the transformer 161, and an output voltage V2 on the secondary side of the transformer 162.

The driving signals Φ11, Φ12, Φ21, and Φ22 are pulse signals, the signal Φ12 has a frequency equal to the signal Φ11 and a time phase lagging the signal Φ11 by 90 degrees. The signal Φ22 has a frequency equal to the signal Φ21 and a time phase leading the signal Φ21 by 90 degrees. The signals Φ21 and Φ22 have the frequencies set to be higher than the frequencies of the signals Φ11 and Φ12 by several hundreds to several KHz.

When these signals are input to the primary sides of the transformers 161 and 162, the voltages V1 and V2 subjected to amplitude modulation are output on the secondary sides of the transformers 161 and 162. The output voltages V1 and V2 of the transformers 161 and 162 are supplied to the electrodes 151 and 152, respectively, to produce a traveling vibration wave on the surface of a vibrating body 1 such that the maximum value (the largest displacement) of vibration displacement of the vibration wave fluctuates and the position at which the largest displacement reaches the peak is sequentially moved, similarly to Embodiment 5. In this manner, the differential amplifier or the like is used to generate a driving voltage having two or more frequency instructions and phase instructions for supply to a common electrode, thereby allowing low-speed driving of the vibration wave driving apparatus 110 at a lower voltage than in the structure in Embodiment 5 or Embodiment 6.

Figure 26:
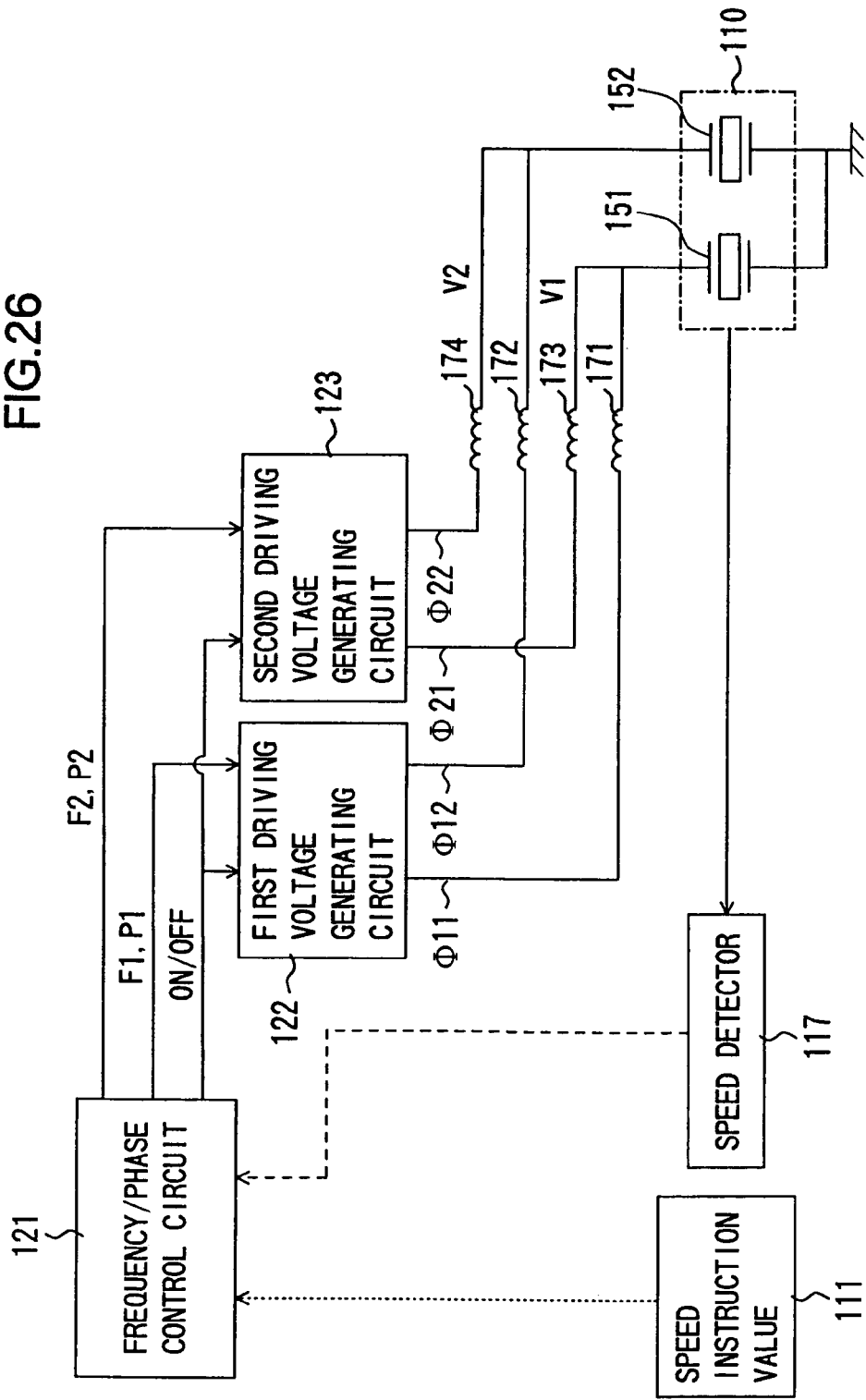
FIG. 26 is a block diagram showing the structure of a variation of the control apparatus shown in FIG. 24.

FIG. 26 shows a variation of the control apparatus in FIG. 24. The control apparatus uses inductor elements 171, 172, 173, and 174 instead of the transformers 161 and 162. The inductor elements 171, 172, 173, and 174 are set such that a predetermined value of the parallel resonance frequency calculated from their inductance and the capacitance of piezoelectric elements corresponding to the electrodes 151 and 152 is obtained. The inductor values of the inductor elements 171 and 172 connected to the driving signals Φ11 and Φ12 may be different from the inductor values of the inductor elements 173 and 174 connected to the driving signals Φ21 and Φ22.

In Embodiment 7, when the frequency/phase control circuit 121 outputs an OFF instruction, it is necessary to make one or both of outputs from the first driving voltage generating circuit 122 and the second driving voltage generating circuit 123 in a floating state or to make both of them at the same potential.

Figure 27:
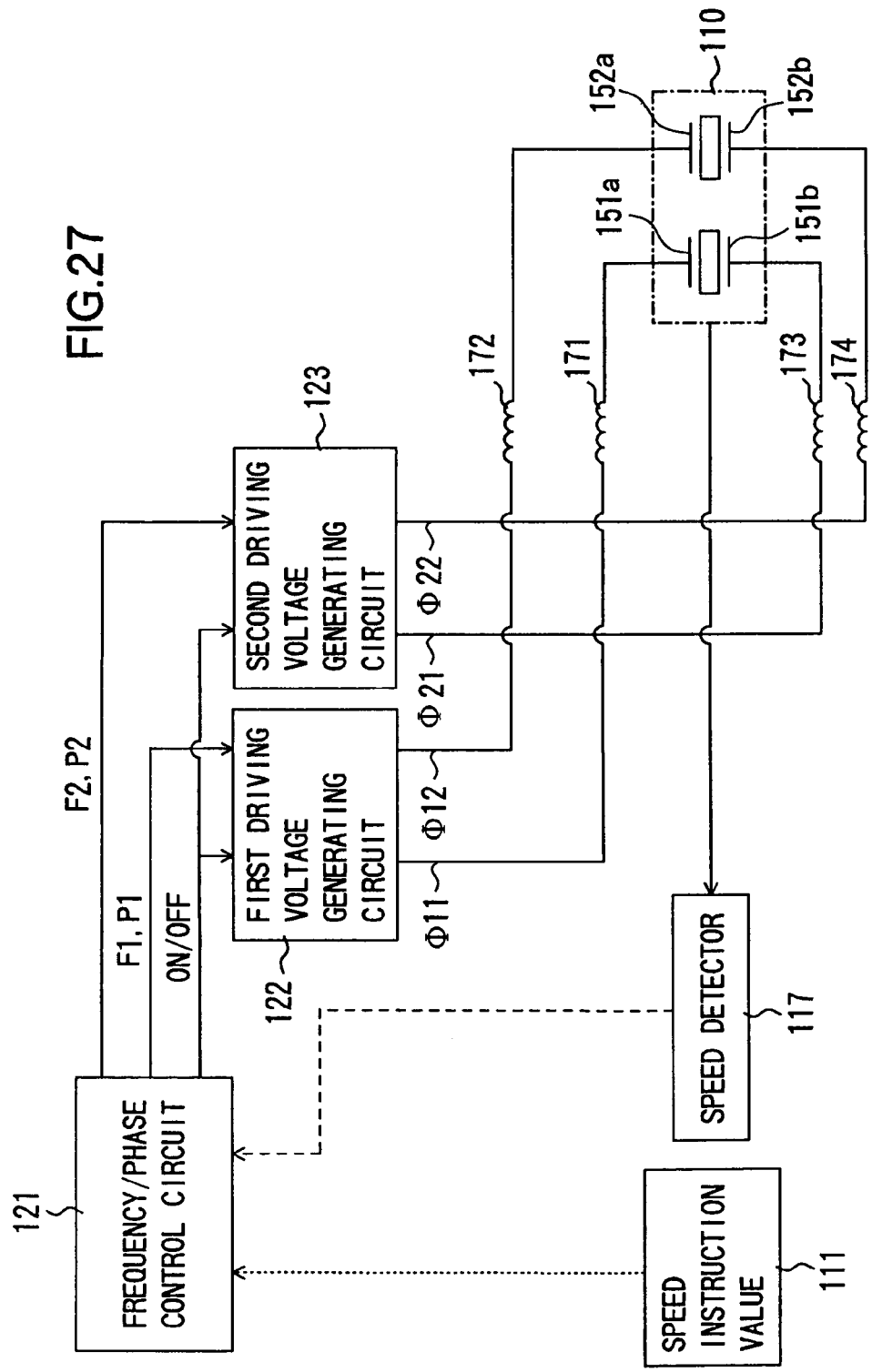
FIG. 27 is a block diagram showing the structure of another variation of the control apparatus shown in FIG. 24.

FIG. 27 shows the structure of a variation of the control apparatus shown in FIG. 26 in which driving signals at different frequencies are supplied to electrodes formed on both surfaces of the piezoelectric element 2. Inductor elements 171 and 173 are connected to the electrodes 151a and 151b formed on both surfaces of one piezoelectric element, respectively, and inductor elements 172 and 174 are connected to the electrodes 152a and 152b formed on both surfaces of the other piezoelectric element, respectively. A control method of the vibration type driving apparatus 110 is the same as in the control apparatus shown in FIG. 26. When the vibration type driving apparatus 110 is to be stopped quickly, it needs to be stopped at an output voltage at the time when a frequency/phase control circuit 121 supplies an OFF instruction in order to quickly suppress the vibrations of the vibrating body 1.

Embodiment 8

Next, description is made for a specific control method performed by the frequency/phase control circuit 121 with reference to a flow chart by using the control apparatus shown in FIG. 24 as an example.

Figure 45A:
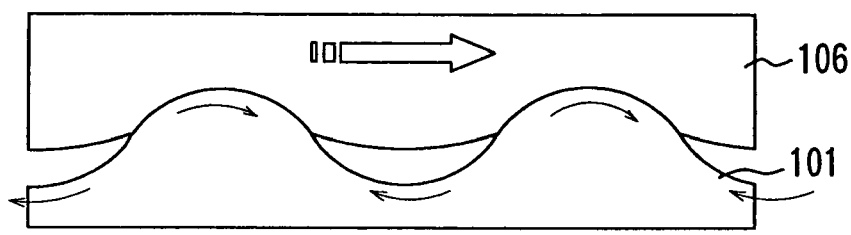
FIGS. 45A and 45B show a contact state and a driving state in a vibrating body and a moving body in the conventional vibration type driving apparatus using traveling waves.
Figure 45B:
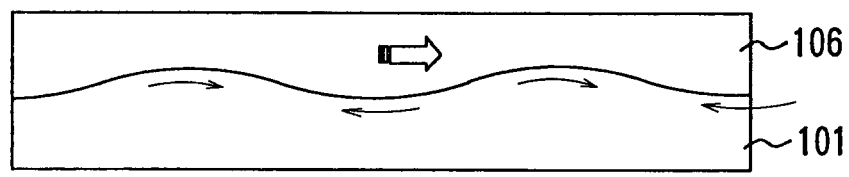

Two traveling vibration waves traveling in opposite directions simultaneously formed on the vibrating body 1 may reduce the driving efficiency as compared with the case where only one of the traveling vibration waves is formed on the vibrating body 1. However, when a single traveling vibration wave is used to realize low-speed driving as in the conventional example, as shown in FIG. 45B, the small vibration amplitude of the vibrating body 1 increases the contact area of the moving body 6 and the vibrating body 1 to increase the load on the vibrating body 1 due to sliding friction between the vibrating body 1 and the moving body 6, reducing the efficiency similarly.

It is thus contemplated that two traveling vibration waves are caused to travel in opposite directions when the vibration type driving apparatus 110 is driven at a low speed, while the two traveling vibration waves are combined into one when it is driven at a high speed. It is necessary to provide a certain means for combining the two traveling waves into one by using an actual speed, an instruction speed, a vibration amplitude of the vibrating body, a frequency of a driving signal or the like as a parameter, and setting a predetermined value of the parameter as a threshold above or below which or near which the two traveling waves are combined into one. For example, a possible approach is to switch the output from one of the driving voltage generating circuits to the same waveform as the output from the other when the threshold is crossed.

Figure 28:
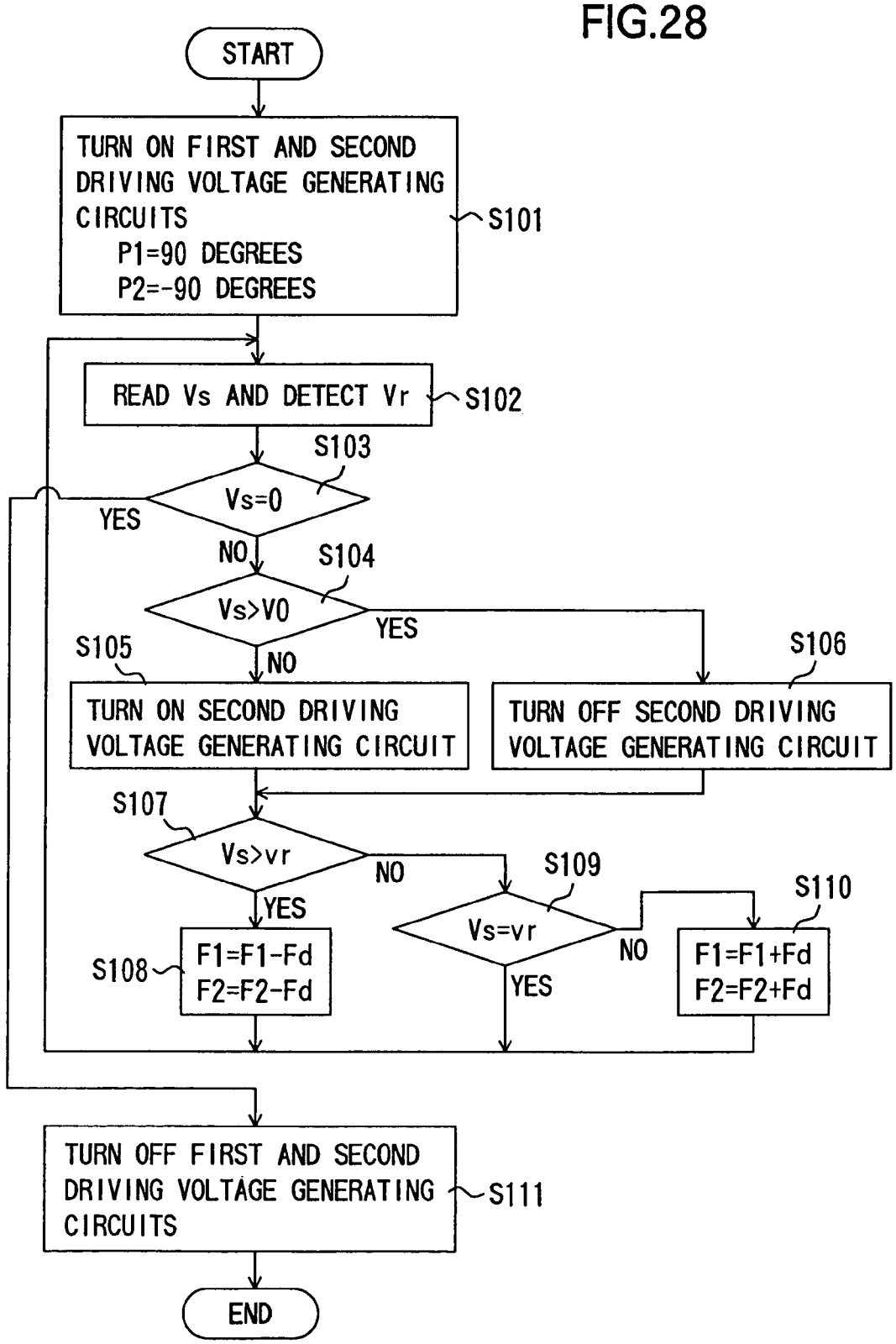
FIG. 28 is a control flow chart which is Embodiment 8 of the present invention.

FIG. 28 shows a flow chart of the control apparatus for the vibration type driving apparatus which is Embodiment 8 of the present invention.

After start of driving of the vibration type driving apparatus 110, an ON instruction is output to drive the first driving voltage generating circuit 122 and the second driving voltage generating circuit 123, and a phase instruction P1 and a phase instruction P2 are set to 90 degrees and −90 degrees, respectively, at step S101. The phase instruction P1 sets the time phase shift of the signal Φ12 with respect to the signal Φ11, and the phase instruction P2 sets the time phase shift of the signal Φ22 with respect to the signal Φ21. In this case, the driving signal Φ12 lags the signal Φ11 by 90 degrees in the time phase, while the driving signal Φ22 leads the signal Φ21 by 90 degrees.

Next, at step S102, a speed instruction value Vs supplied from the outside is read, and the current speed information Vr of the moving body 6 is detected.

Then, it is determined whether or not the speed instruction value Vs is equal to zero at step S103. If it is not equal to zero, the flow proceeds to step S104, or to step S111 if it is equal to zero.

At step S104, the speed instruction value Vs is compared with a predetermined speed V0. If the speed instruction value Vs is equal to or lower than the predetermined speed V0, the flow proceeds to step S105. If the speed instruction value Vs is higher than the predetermined speed V0, the flow proceeds to step S106.

At step S105, an ON instruction is output to drive the second driving voltage generating circuit 123, and then the flow proceeds to step S107. At step 105, since the speed instruction value Vs is equal to or lower than the predetermined speed V0, the first driving voltage generating circuit 122 and the second driving voltage generating circuit 123 are driven to produce two traveling vibration waves traveling in difference directions to perform low-speed driving. If the second driving voltage generating circuit 123 has already been driven, step S107 is skipped.

At step S106, an OFF instruction is output to short-circuit the outputs from the second driving voltage generating circuit 123 to the ground, and then the flow proceeds to step S107. The short circuit of the outputs from the second driving voltage generating circuit 123 to the ground causes voltages formed only with the output voltages from the first driving voltage generating circuit 122 to be supplied to electrodes 151 and 152. At step S106, since the speed instruction value Vs is larger than the predetermined speed V0, only the first driving voltage generating circuit 122 is driven to produce a single traveling vibration wave to perform high-speed driving. If the outputs from the second driving voltage generating circuit 123 have already been short-circuited to the ground, step S106 is skipped.

At step S107, the speed instruction value Vs is compared with the current speed information Vr. If Vs is larger than Vr, the flow proceeds to step S108. If Vs is equal to or lower than Vr, the flow proceeds to step S109.

At step S108, the frequency instructions F1 and F2 are reduced by a predetermined frequency Fd to increase the moving speed of the moving body 6, and then the flow proceeds to step S102.

At step S109, if the speed instruction value Vs is equal to the speed information Vr, the frequency instructions F1 and F2 are maintained, and then the flow proceeds to step S102. If they are not equal, the flow proceeds to step S110.

At step S110, the frequency instructions F1 and F2 are increased by the predetermined frequency Fd to reduce the moving speed of the moving body 6, and then the flow proceeds to step S102.

Step S102 to step S108, or to step S109, or to step S110 are repeatedly performed until the speed instruction value Vs becomes equal to zero. When the speed instruction value Vs becomes equal to zero, the flow proceeds to step S111 from step S103.

At step S111, an OFF instruction is output to the first driving voltage generating circuit 122 and the second driving voltage generating circuit 123, and the setting of the frequency instructions F1 and F2 and the phase instructions P1 and P2 is canceled.

While the second driving voltage generating circuit 123 is switched between ON and OFF in accordance with the value of the speed instruction value Vs from step S104 to step S106 in Embodiment 8, the second driving voltage generating circuit 123 may be switched between ON and OFF in accordance with the value of the current speed information Vr instead of the speed instruction value Vs. Alternatively, the second driving voltage generating circuit 123 may be switched between ON and OFF in accordance with the values of the frequency instructions F1 and F2 set in accordance with the comparison result of the speed instruction value Vs and the current speed information Vr.

Embodiment 9

In Embodiment 8, the outputs from the second driving voltage generating circuit 123 are short-circuited to the ground in order to make the amplitude of one of the two traveling vibration waves zero. In some cases, however, it is preferable that the driving signals Φ11 and Φ21 are set in the same phase and the driving signals Φ12 and Φ22 are set in the same phase without changing the relationship between the driving signals Φ11 and Φ12 to combine two traveling vibration waves traveling in the same direction, or that the driving signals Φ11 and Φ21 are set in opposite phase and the driving signals Φ12 and Φ22 are set in opposite phase without changing the relationship between the driving signals Φ11 and Φ12 to produce a single traveling vibration wave.

When the outputs from the second driving voltage generating circuit 123 are short-circuited to the ground in order to make the amplitude of one of the two traveling vibration waves zero, the amplitude of the traveling vibration wave which tends to drive the moving body 6 in the opposite direction is suddenly changed, so that a shock may be given to the moving body 6. It is thus necessary to perform control for gradually reducing the outputs from the second driving voltage generating circuit 123. A simple method thereof is to gradually reduce the amplitudes of the output voltages of the second driving voltage generating circuit 123 before short-circuit to the ground. Alternatively, a setting means, not shown, is used to set small signal amplitudes of the output voltages from the second driving voltage generating circuit 123 in a higher speed range than a predetermined speed by using the amplitudes as a function of the output from the speed detector 117, the speed instruction value, the frequency of the driving signal or the like.

Figure 29A:
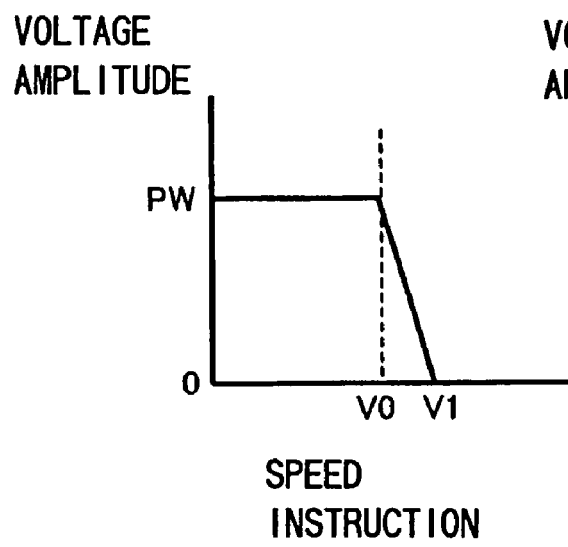
FIG. 29A shows the characteristic of a speed instruction and a voltage amplitude of one of driving voltage generating circuits in Embodiment 9.
Figure 29B:
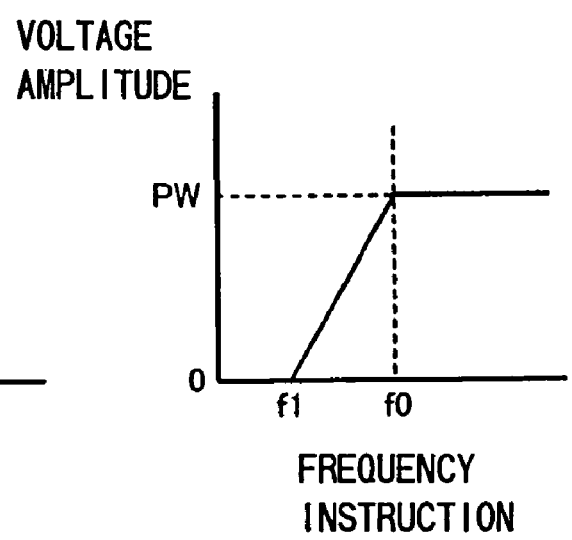
FIG. 29B shows the characteristic of a frequency instruction and the voltage amplitude of the one of the driving voltage generating circuits in Embodiment 9.

FIG. 29A shows the relationship between a speed instruction and the amplitude of an output voltage, and FIG. 29B shows the relationship between a frequency instruction and the amplitude of the output voltage. FIG. 29A shows an example in which the amplitude PW of the output voltage of the second driving voltage generating circuit 123 changes with the speed instruction. FIG. 29B shows the relationship between the amplitude PW of the output voltages of the second driving voltage generating circuit 123 and the frequency instruction F2 of the driving signal.

Figure 30:
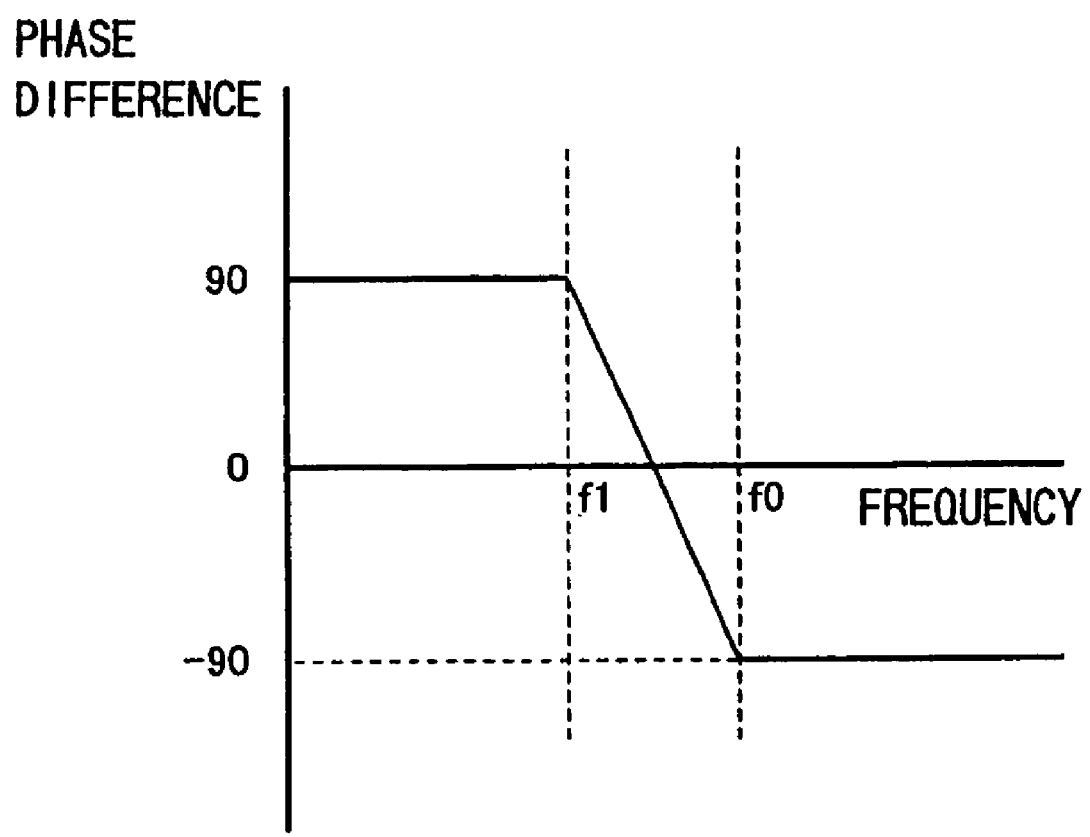
FIG. 30 shows the characteristic of a frequency instruction and a phase instruction of one of the driving voltage generating circuits in Embodiment 9.
Figure 31:
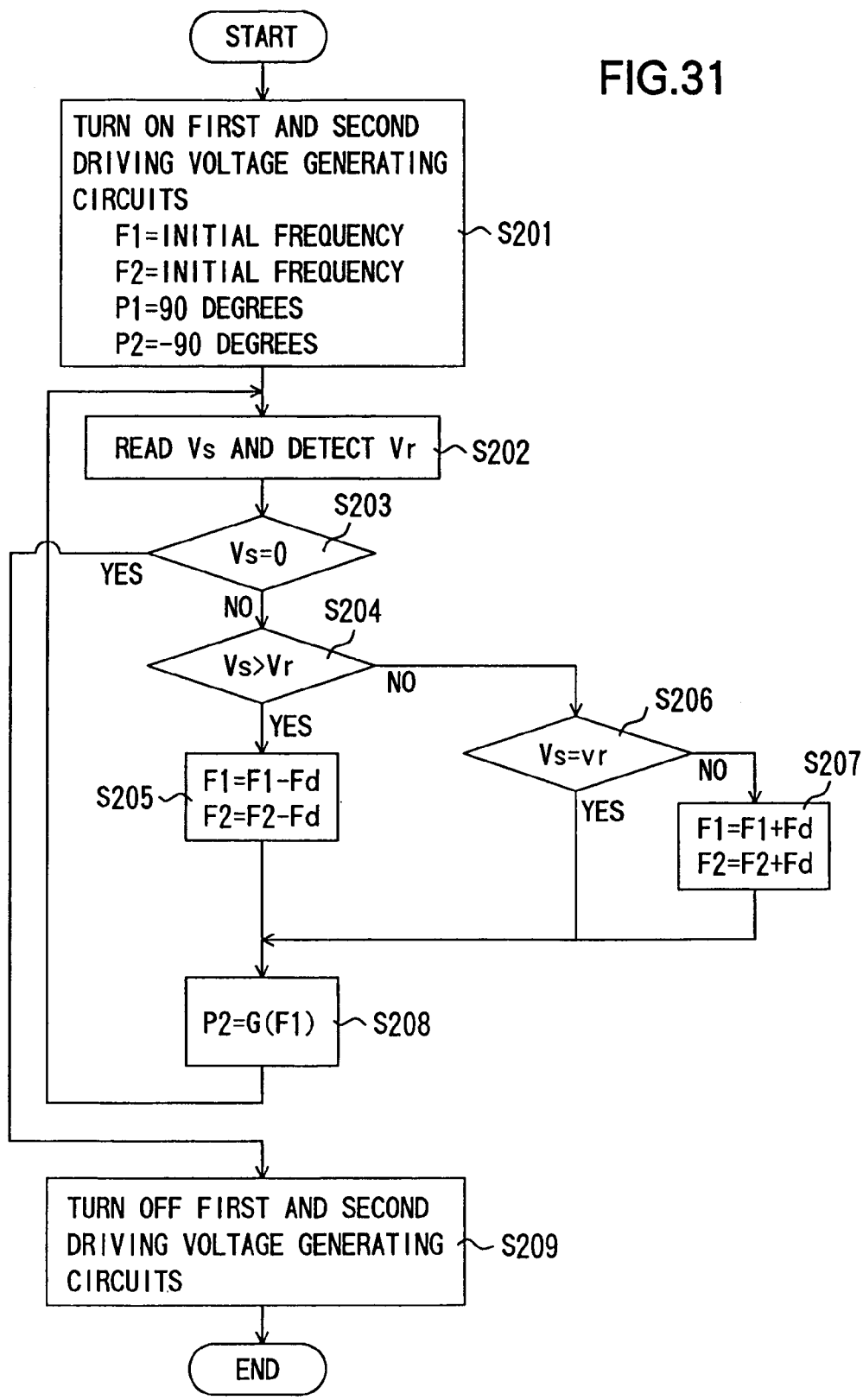
FIG. 31 is a control flow chart which is Embodiment 9 of the present invention.

FIG. 30 shows the relationship between the frequency instruction and a phase instruction. In FIG. 30, when the value of the frequency instruction F1 determined by the frequency/phase control circuit 121 is equal to or higher than f0 at which the moving body 6 is driven at a predetermined speed V0 or lower, the phase instruction P2 is set to −90 degrees. When the value of the frequency instruction F1 determined by the frequency/phase control circuit 121 is equal to or lower than f1 at which the moving body 6 is driven at a predetermined speed V1 or higher, the phase instruction P2 is set to 90 degrees. During the change of the value of the frequency instruction F1 from f0 to f1, the phase instruction P2 is changed from −90 degrees to 90 degrees in accordance with the change of the frequency instruction. FIG. 31 shows a flow chart of control of the vibration type driving apparatus by using the characteristics shown in FIG. 30.

After start of driving of the vibration type driving apparatus 110, an ON instruction is output to drive the first driving voltage generating circuit 122 and the second driving voltage generating circuit 123, and a phase instruction P1 and a phase instruction P2 are set to 90 degrees and −90 degrees, respectively, at step S201. The phase instruction P1 sets the time phase shift of the signal Φ12 with respect to the signal Φ11, and the phase instruction P2 sets the time phase shift of the signal Φ22 with respect to the signal Φ21. In this case, the driving signal Φ12 lags the signal Φ11 by 90 degrees in the time phase, while the driving signal Φ22 leads the signal Φ21 by 90 degrees. Frequency instructions F1 and F2 are set to separate initial frequencies previously stored in a memory or the like.

Next, at step S202, a speed instruction value Vs supplied from the outside is read, and the current speed information Vr of the moving body 6 is detected.

Then, it is determined whether or not the speed instruction value Vs is equal to zero at step S203. If it is not equal to zero, the flow proceeds to step S204, or to step S209 if it is equal to zero.

At step S204, the speed instruction value Vs is compared with the current speed information Vr. If Vs is larger than Vr, the flow proceeds to step S205. If Vs is equal to or lower than Vr, the flow proceeds to step S206.

At step S205, the frequency instructions F1 and F2 are reduced by a predetermined frequency Fd to increase the moving speed of the moving body 6 before the flow proceeds to step S208.

At step S206, if the speed instruction value Vs is equal to the current speed information Vr, the frequency instructions F1 and F2 are maintained, and then the flow proceeds to step S208. If they are not equal, the flow proceeds to step S207.

At step S207, the frequency instructions F1 and F2 are increased by the predetermined frequency Fd to reduce the moving speed of the moving body 6, and then the flow proceeds to step S208.

At step S208, the phase instruction P2 corresponding to the frequency instruction F1 is calculated by using a function G, and the frequency instructions F1, F2 and the phase instructions P1, and P2 are output, and then the flow proceeds to step S202. The function G includes values shown in FIG. 30 and may be realized by an expression or a data table.

Step S202 to step S208 are repeated until the speed instruction value Vs becomes equal to zero. When the speed instruction value Vs becomes equal to zero, the flow proceeds to step S209 from step S203.

At step S209, an OFF instruction is output to the first driving voltage generating circuit 122 and the second driving voltage generating circuit 123, and the setting of the frequency instructions F1 and F2 and the phase instructions P1 and P2 is canceled.

According to the control method, when the speed instruction is higher than the predetermined speed, the phase difference between the output signals of the first driving voltage generating circuit 122 and the second driving voltage generating circuit 123 is in the same direction to suppress a reduction in efficiency. When the speed instruction is lower than the predetermined speed, the phase difference between the output signals of the first driving voltage generating circuit 122 and the phase difference of the output signals of the second driving voltage generating circuit 123 are in the opposite directions to allow stable driving even at a low speed. While the differential amplifier circuit or the like is used to add the driving waveforms in Embodiment 9, it is also possible that waveform data is digitally added and converted by a D/A converting circuit into analog voltage which is amplified and then supplied to the piezoelectric element. In addition, a known class D amplifier may be used as the amplifying circuit. However, it is contemplated that the class D amplifier has a switching period which is at least approximately one-tenth of the period of the highest frequency of the plurality of traveling vibration waves.

Embodiment 10

Figure 32:
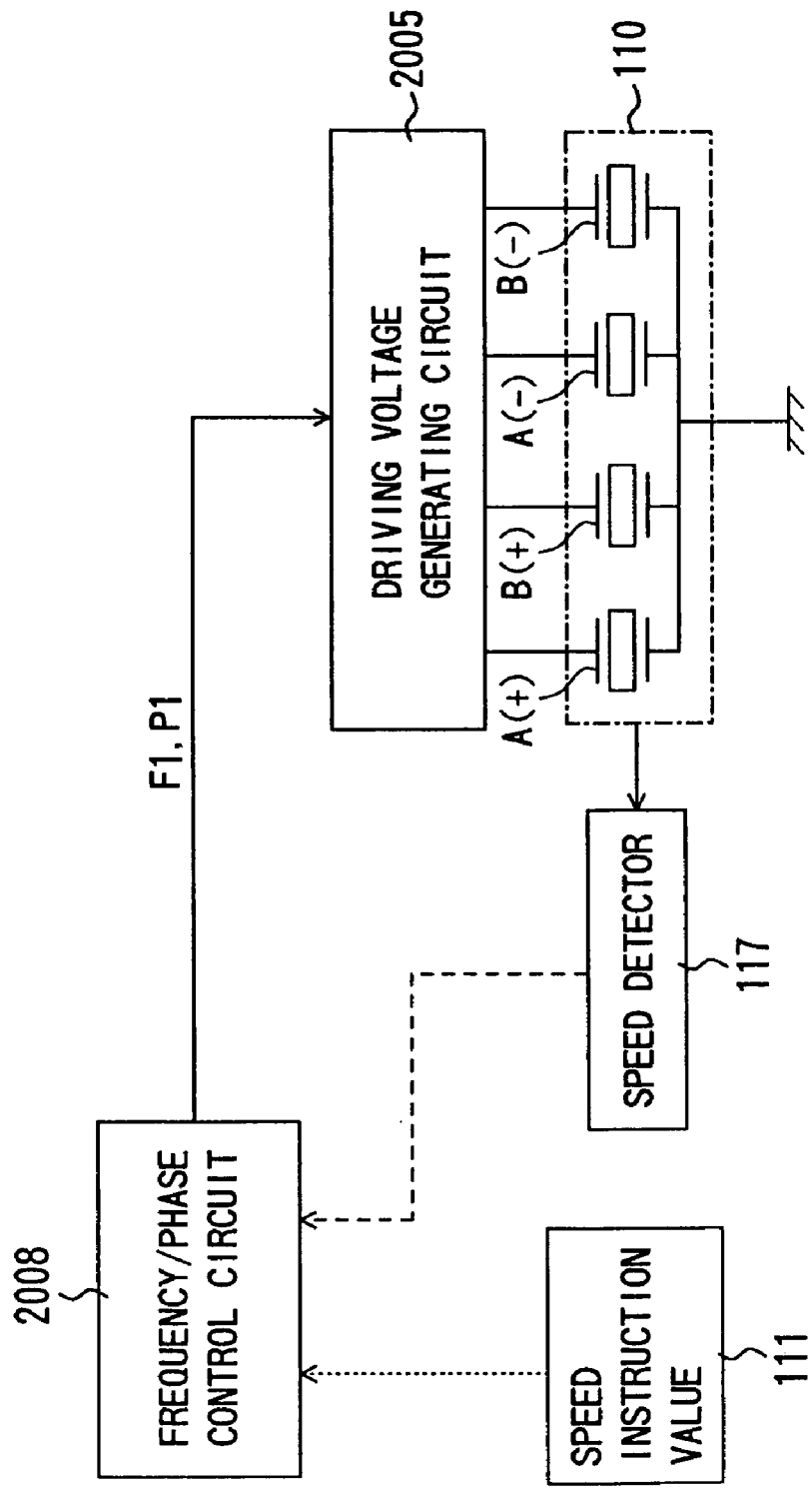
FIG. 32 is a block diagram showing the structure of a control apparatus which is Embodiment 10 of the present invention.

FIG. 32 shows a control apparatus for the vibration type driving apparatus which is Embodiment 10 of the present invention.

The structure of the vibration type driving apparatus in Embodiment 10 is the same as that shown in FIG. 12. The piezoelectric element 2 provided for the vibration type driving apparatus 110 has an electrode pattern formed thereon which includes electrodes disposed in the order of A(+), B(+), A(−), and B(−) in the circumferential direction. A driving voltage generating circuit 2005 supplies driving signals to these electrodes in accordance with a frequency instruction F1 and a phase instruction P1 from the frequency/phase control circuit 2008.

Figure 33:
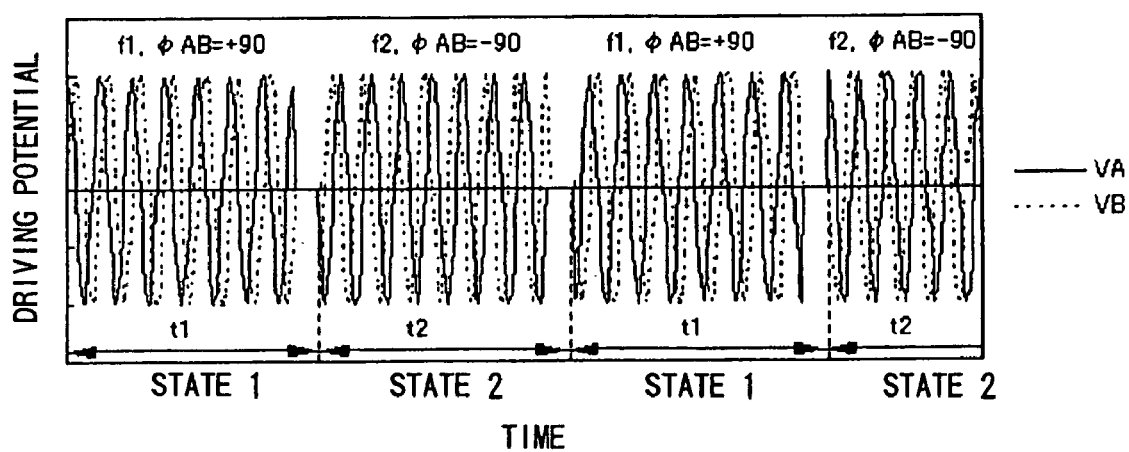
FIG. 33 shows driving signal waveforms in Embodiment 10.

FIG. 33 shows waveforms of driving signals of the A phase and the B phase in Embodiment 10. In FIG. 33, solid lines represent the waveform of the driving signal of the A phase, while dotted lines represent the waveform of the driving signal of the B phase. In the waveforms, a state 1 and a state 2 are repeated alternately. The state 1 continues for a time period t1 in which the time phase of the A phase driving signal leads the B phase driving signal by 90 degrees and the frequencies of both of them are set to f1. The state 2 continues for a time period t2 in which the time phase of the A phase driving signal lags the B phase driving signal by 90 degrees and the frequencies of both of them are set to f2. The frequencies f1 and f2 are higher than the resonance frequency fr of the vibrating body and f2 is equal to or larger than f1.

The state 1 and state 2 are repeated continually, and the continually output driving signals in the state 1 have the same phase, and this applies to the state 2. In the state 1, the driving signal at the frequency f1 producing a traveling vibration wave for rotating the moving body 6 counterclockwise is supplied to the piezoelectric element 2, while in the state 2, the driving signal at the frequency f2 producing a traveling vibration wave for rotating the moving body 6 clockwise is supplied to the piezoelectric element 2.

Figure 34A:
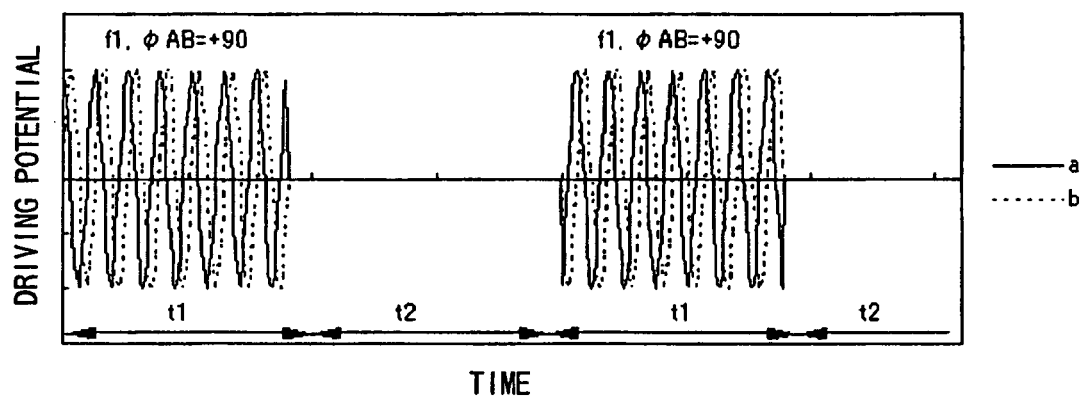
FIG. 34A shows driving signal waveforms only in a state 1 in Embodiment 10.
Figure 34B:
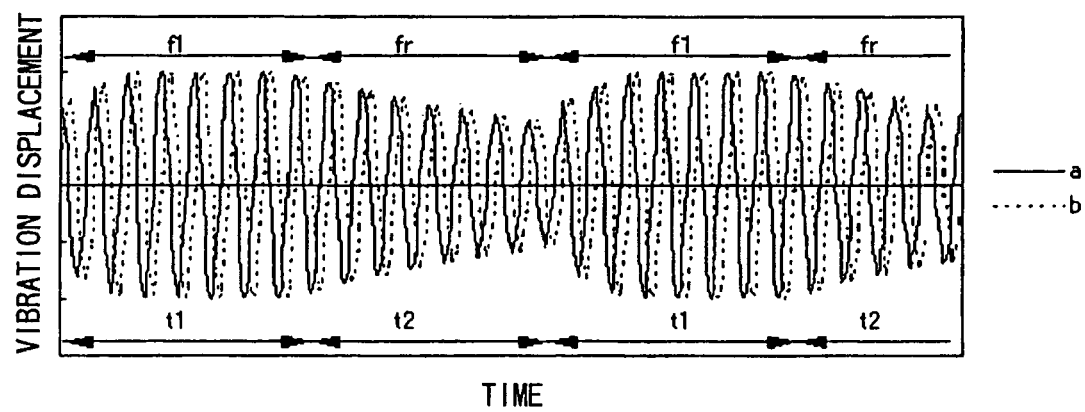
FIG. 34B shows response amplitudes only in the state 1 in Embodiment 10.

FIG. 34A shows the waveforms of the driving signals only in the state 1, while FIG. 34B shows vibration displacement of the vibrating body caused thereby. The duration t1 of the state 1 and the duration t2 of the state 2 are set to values such that an attenuated vibration of the vibration wave produced by excitation in one of the time periods does not disappear in the other. With the setting, as shown in FIG. 34B, the vibration is forced at the frequency f1 during the time period t1, and the forced vibration produced in the time period t1 is attenuated at the resonance frequency fr in the time period t2, and the vibration is forced at the frequency f1 before the attenuated vibration disappears.

Figure 35A:
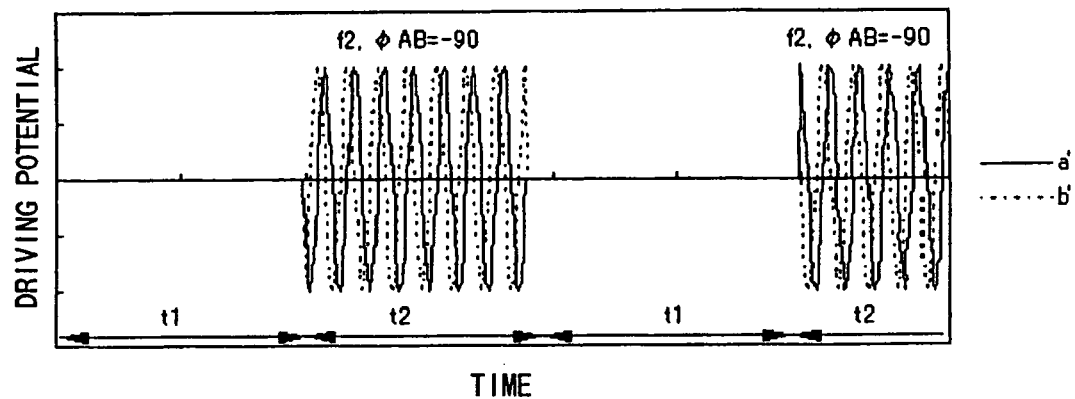
FIG. 35A shows driving signal waveforms only in a state 2 in Embodiment 10.
Figure 35B:
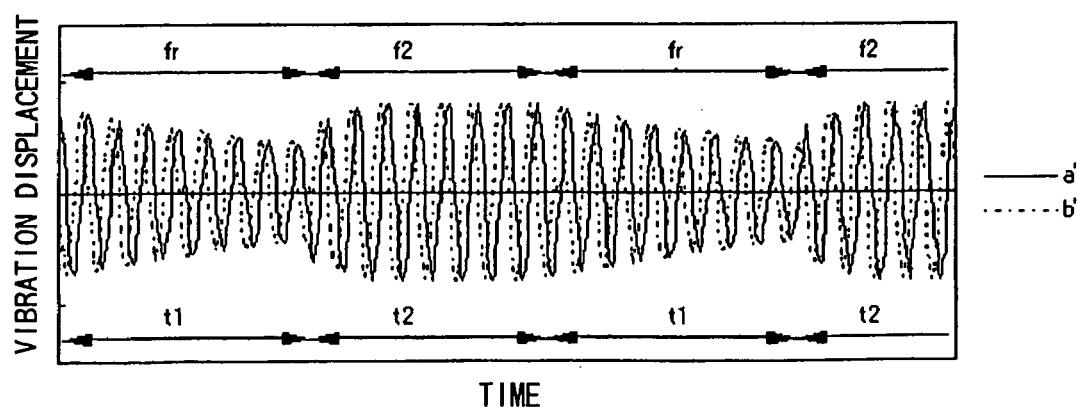

FIG. 35A shows the waveforms of the driving signals only in the state 2, while FIG. 35B shows vibration displacement of the vibrating body caused thereby. Similarly to the state 1, as shown in FIG. 35B, the vibration is forced at the frequency f2 during the time period t2, and the forced vibration produced in the time period t2 is attenuated at the resonance frequency fr in the time period t1, and the attenuated vibration is forced at the frequency f2 before the attenuated vibration disappears.

Figure 37:
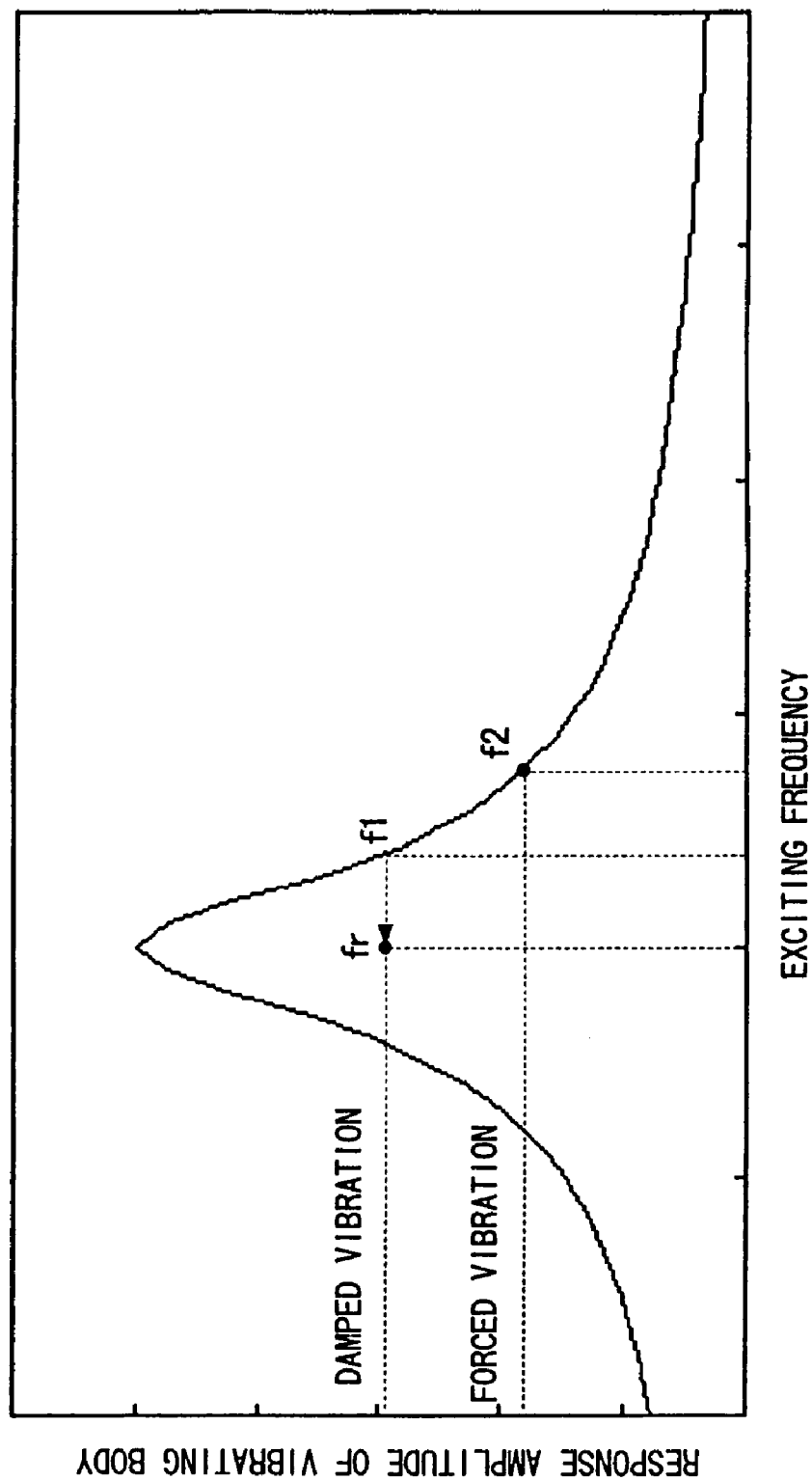
FIG. 37 shows a response amplitude of forced vibration and attenuated vibration in the state 2 in Embodiment 10.

FIGS. 36 and 37 show response amplitudes of the vibrating body when the driving signals are switched to the state 1 and the state 2 alternately. In FIGS. 36 and 37, black circles represent the response amplitudes in the state 1 and the state 2.

FIG. 36 shows the response amplitude of the vibrating body in the time period t1 (the state 1) which is provided by superposing the forced vibration with the driving signals of the A phase and the B phase at the frequency f1 on the attenuated vibration at the frequency fr which has been attenuated from the forced vibration with the driving signals of the A phase and the B phase at the frequency f2.

FIG. 37 shows the response amplitude of the vibrating body in the time period t2 (the state 2) which is provided by superposing the forced vibration with the driving signals of the A phase and the B phase at the frequency f2 on the attenuated vibration at the frequency fr which has been attenuated from the forced vibration with the driving signals of the A phase and the B phase at the frequency f1.

In Embodiment 10, the respective frequencies are set to the relationship of fr<f1<f2 for the resonance frequency fr of the vibrating body. Thus, as shown in FIGS. 36 and 37, the response amplitude of the forced vibration at the frequency f1 is larger than the response amplitude of the attenuated vibration after the forced vibration at the frequency f2 in the state 1, while the response amplitude of the attenuated vibration after the forced vibration at the frequency f1 is larger than the response amplitude of the forced vibration at the frequency f2 in the state 2. Consequently, the moving body 6 is rotated counterclockwise in both of the state 1 and the state 2.

Figure 38:
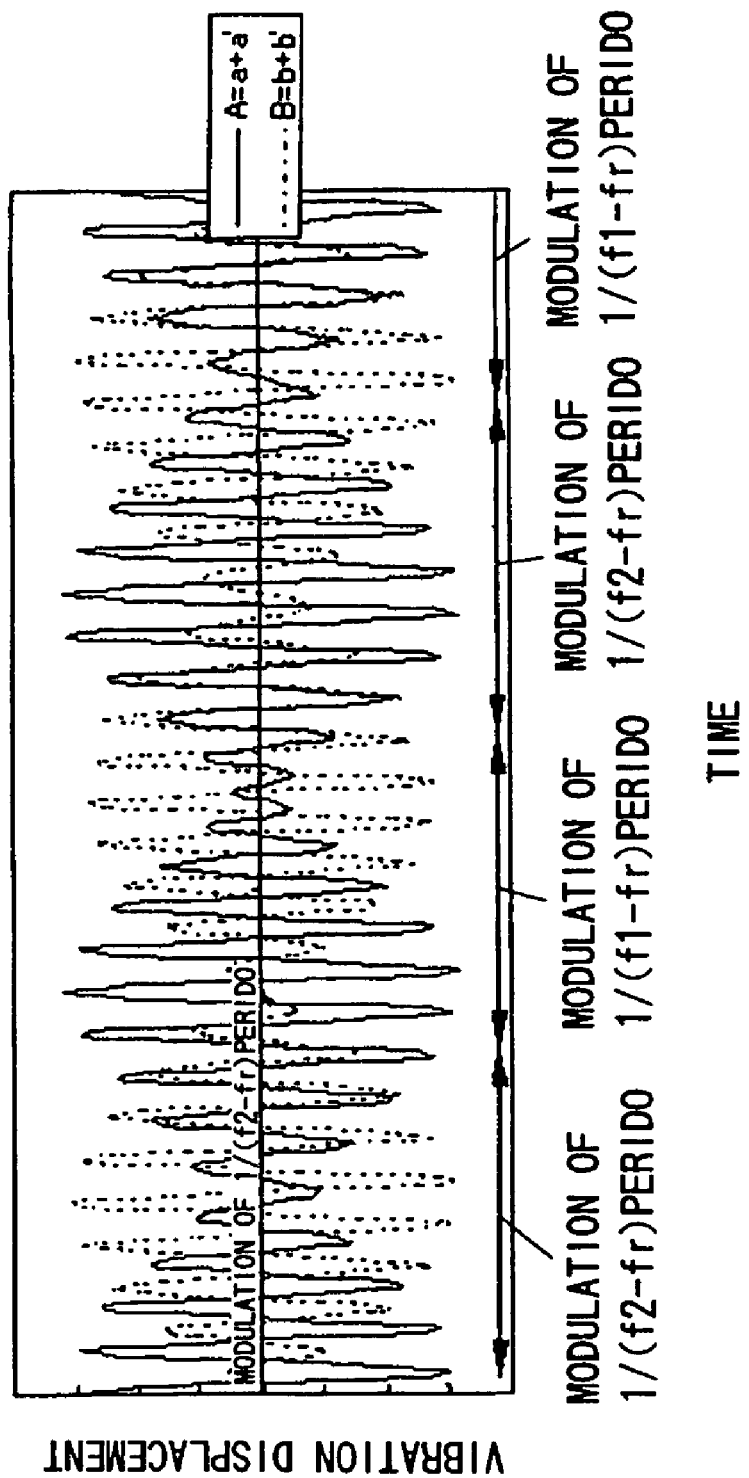
FIG. 38 shows the response amplitude in Embodiment 10.

FIG. 38 shows vibration displacement of the vibrating body when the state 1 and the state 2 are repeated alternately. The response amplitudes produced by applying the A phase driving signal and the B phase driving signal are modulated waveforms provided by performing amplitude modulation and phase modulation in the periods of 1/(f2−fr) and 1/(f1−fr) as shown in FIG. 38.

Figure 39:
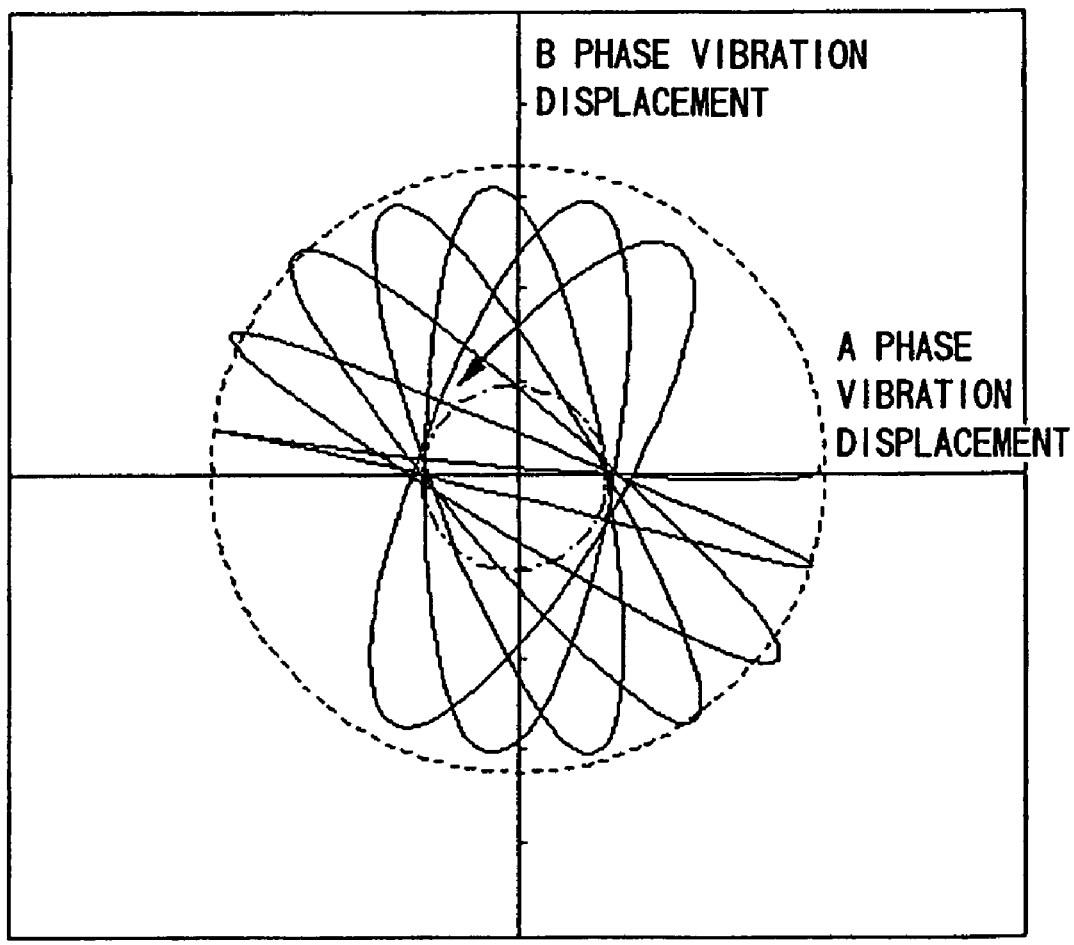
FIG. 39 shows vibration trajectories of a vibrating body in a vibration type driving apparatus controlled by the control apparatus which is Embodiment 10 of the present invention.

FIG. 39 shows vibration trajectories of the vibration waves provided as the modulation waves shown in FIG. 38. The vibration displacement of the A phase and the vibration displacement of the B phase are shown on the horizontal axis and the vertical axis, respectively, on an A-B plane. According to Embodiment 10, the vibration trajectories similar to those in FIG. 1 can be obtained.

Embodiment 11

Figure 40:
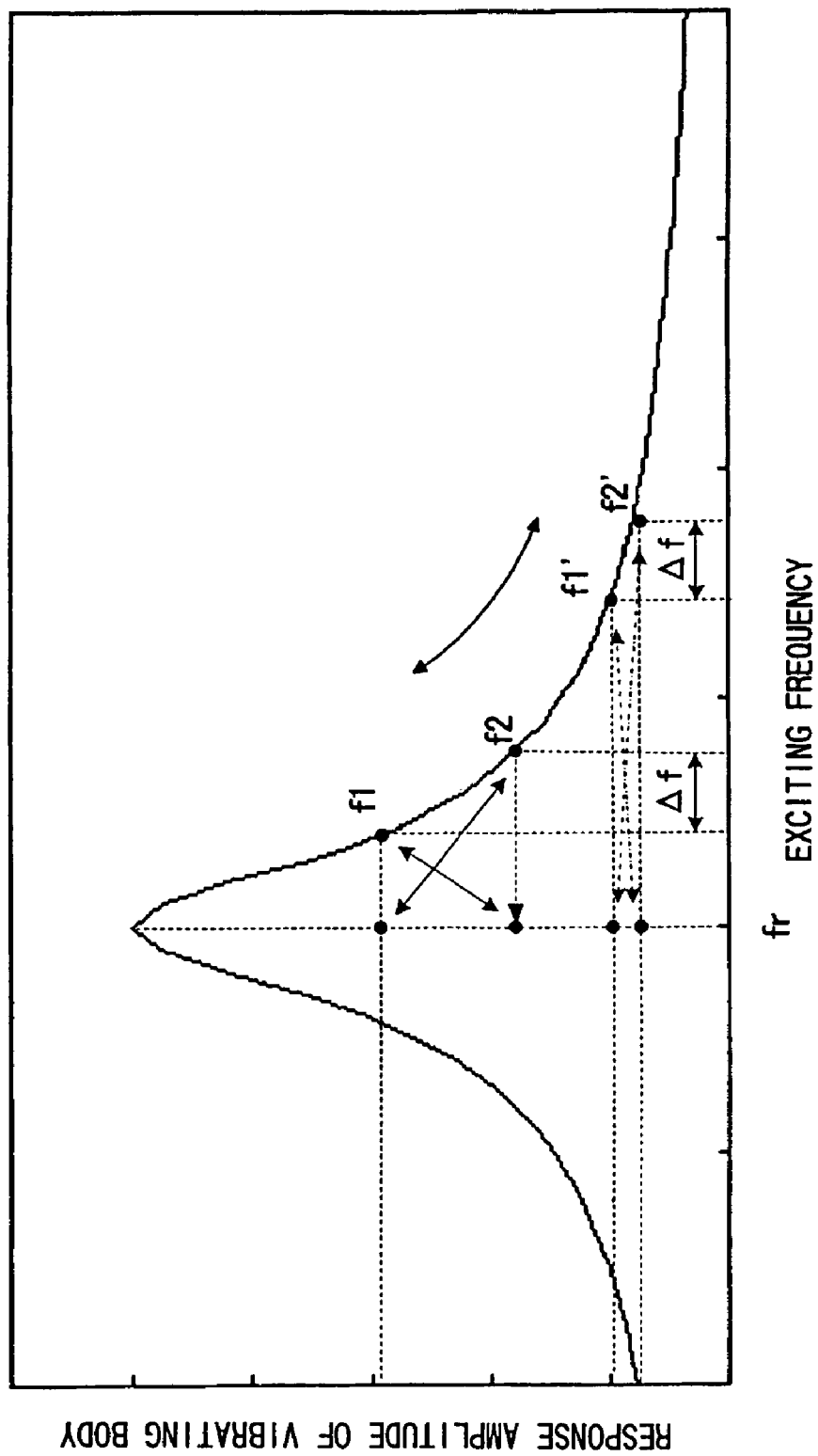
FIG. 40 shows a response amplitude of forced vibration and attenuated vibration in the state 1 in Embodiment 11.

FIG. 40 shows the relationship between frequencies of driving signals and a response amplitude of the vibrating body in a control apparatus for the vibration type driving apparatus which is Embodiment 11 of the present invention.

In Embodiment 11, the frequencies of the driving signals are increased or reduced to change the driving speed of the moving body while a difference Δf is maintained between the frequencies of the driving signals in the state 1 and the state 2 alternately excited.

In FIG. 40, f1, f2 and f1', f2' represent the frequencies of the driving signals in a low-speed driving range and a high-speed driving range, respectively. As the frequency is higher than the resonance frequency, the response amplitude of the vibrating body is smaller, and the difference between the response amplitude of the vibrating body in the state 1 and the response amplitude of the vibrating body in the state 2 is smaller.

As the difference between the response amplitude levels of two combined vibrations is smaller, the amplitude of the minor axis of an elliptical trajectory formed by the response amplitude of the driving signals of the A phase and the B phase is smaller. It is thus possible to reduce the driving speed at the contact surface without significantly reducing the amplitude at the contact portion. The driving method of Embodiment 11 is effective in low-speed driving in which the vibrating body is in contact with the moving body over the entire surface. It is preferable to use a single traveling vibration wave for driving at a normal driving speed and make switching to the driving shown in Embodiment 11 at low-speed driving.

Embodiment 12

Figure 41:
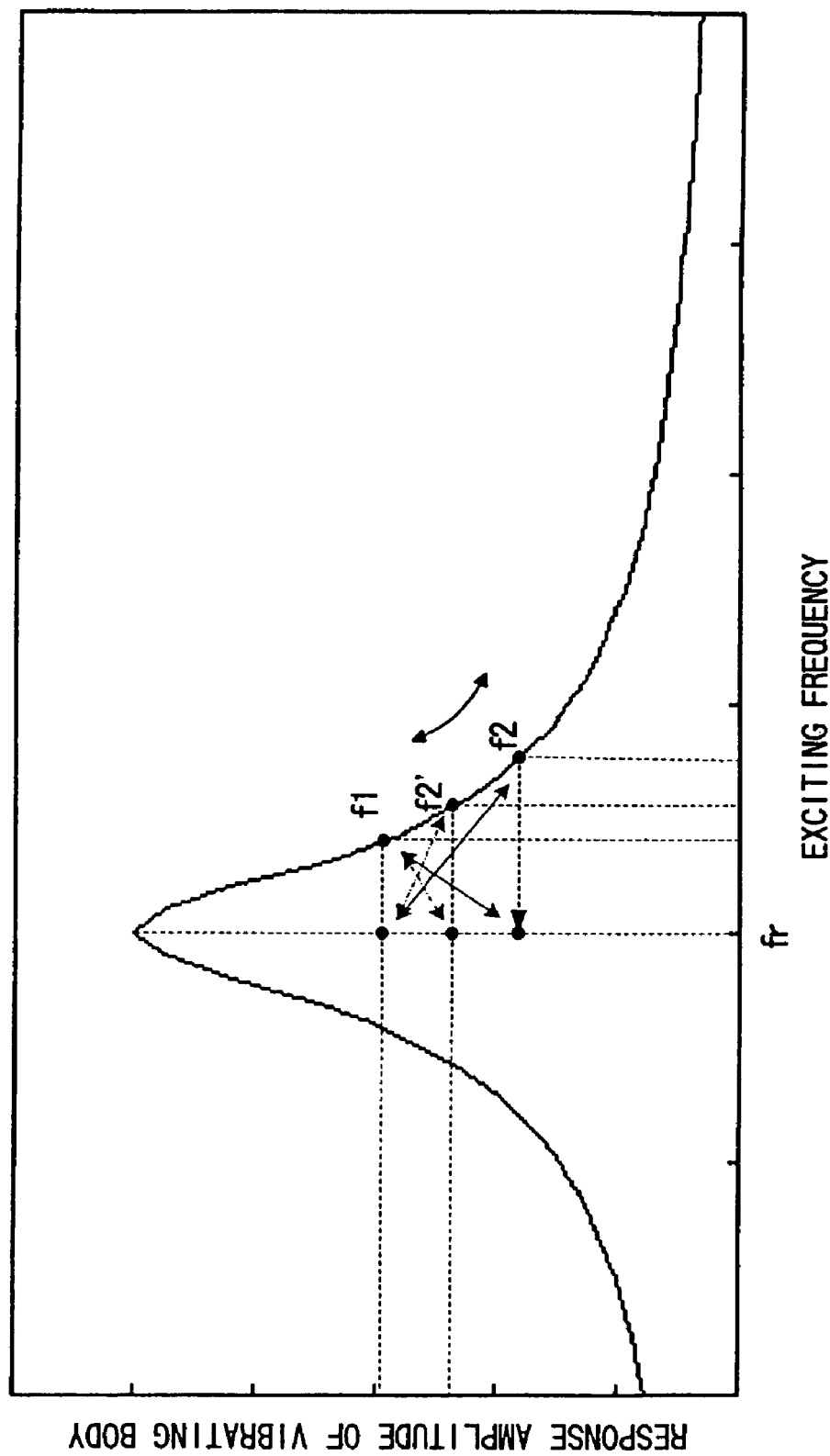
FIG. 41 shows a response amplitude of forced vibration and attenuated vibration in the state 1 in Embodiment 12.

FIG. 41 shows the relationship between frequencies of driving signals and a response amplitude of the vibrating body in a control apparatus for the vibration type driving apparatus which is Embodiment 12 of the present invention.

In Embodiment 12, a frequency f1 of the driving signals of the A phase and the B phase in a state 1 is fixed, while a frequency f2 of the driving signals of the A phase and the B phase in a state 2 is variable to change the driving speed.

A frequency f2' lower than f2 is set for the driving signals of the A phase and the B phase in the state 2 to increase the response amplitude of the forced vibration and the attenuated vibration in the state 2, thereby allowing the feed speed of the moving body 6 to be reduced. It is also possible that f2 can be matched with f1 to provide a linear trajectory on an A-B plane and reduce the feed speed to zero, or that f2 can be set to a value smaller than f1 to perform reverse operation.

Embodiment 13

Figure 42:
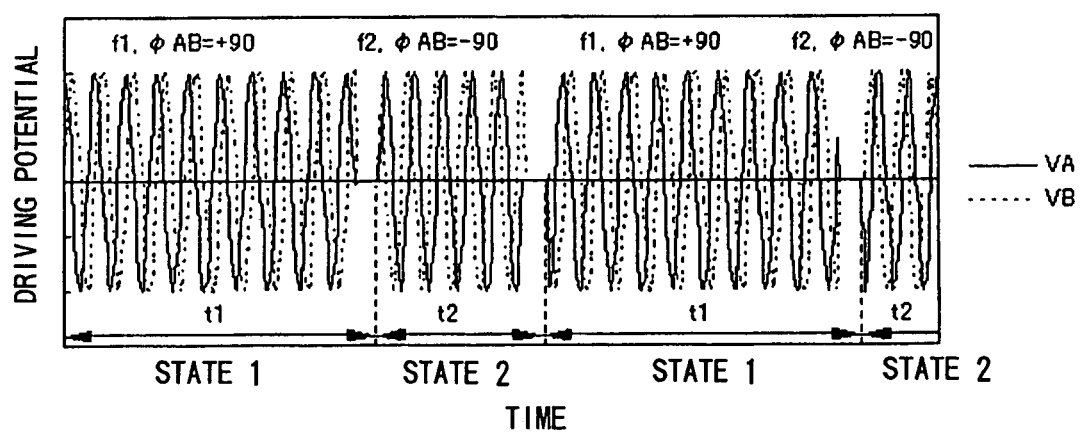
FIG. 42 shows driving signal waveforms in Embodiment 13.

FIG. 42 shows waveforms of driving signals of the A phase and the B phase in Embodiment 13.

In Embodiment 13, a frequency/time control circuit is provided instead of the frequency/phase control circuit to change the ratio between a duration t1 of a state 1 and a duration t2 of a state 2, which can provide a variable speed.

The duration t1 of the state 1 can be set to be longer than the duration t2 of the state 2 to sufficiently increase vibration energy of the forced vibration at a frequency f1. In addition, since the time period t2 is relatively shorter than the time period t1, the attenuated vibration in the state 2 after the forced vibration at the frequency f1 is switched to the next forced vibration before the attenuating amount does not become large. As a result, the forced vibration amplitude in the state 1 and the attenuated vibration amplitude in the state 1 can be larger to increase the minor axis of an elliptical trajectory formed on the contact surface of the vibrating body in contact with the moving body to provide a higher driving speed.

In this manner, the duration t1 of the state 1 and the duration t2 of the state 2 can be changed in accordance with the driving speed of the vibration type driving apparatus 110 to change the driving speed. Low-speed driving can be continuously changed to driving with a single traveling vibration wave by gradually reducing the time period t2 to zero. Therefore, the speed can be changed in a wide range from a low speed at which the vibrating body is in contact with the moving body over the entire surface to a normal speed at which the vibrating body is partially in contact with the moving body. In addition, reverse operation can be achieved by setting the time period t2 larger than the time period t1 and setting the frequency f2 larger than the frequency f1.

Embodiment 14

Figure 43A:
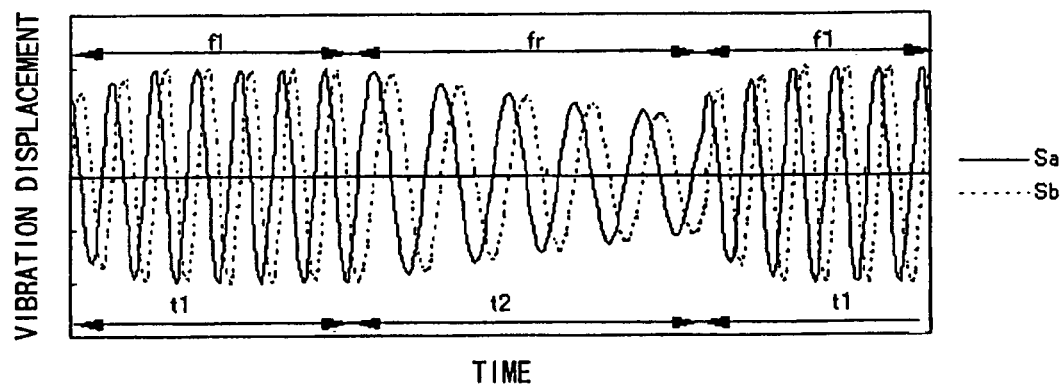
FIG. 43A shows output waveforms of a monitor circuit in Embodiment 14.
Figure 43B:
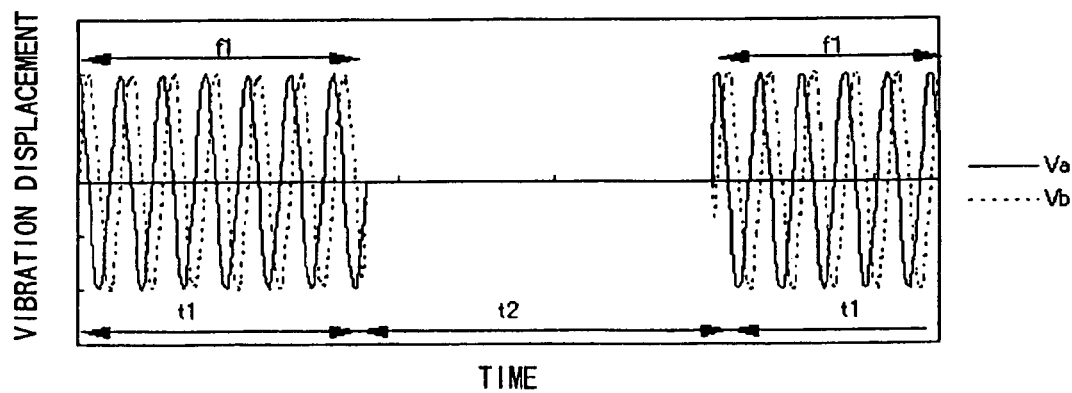
FIG. 43B shows driving signal waveforms in Embodiment 14.
Figure 44:
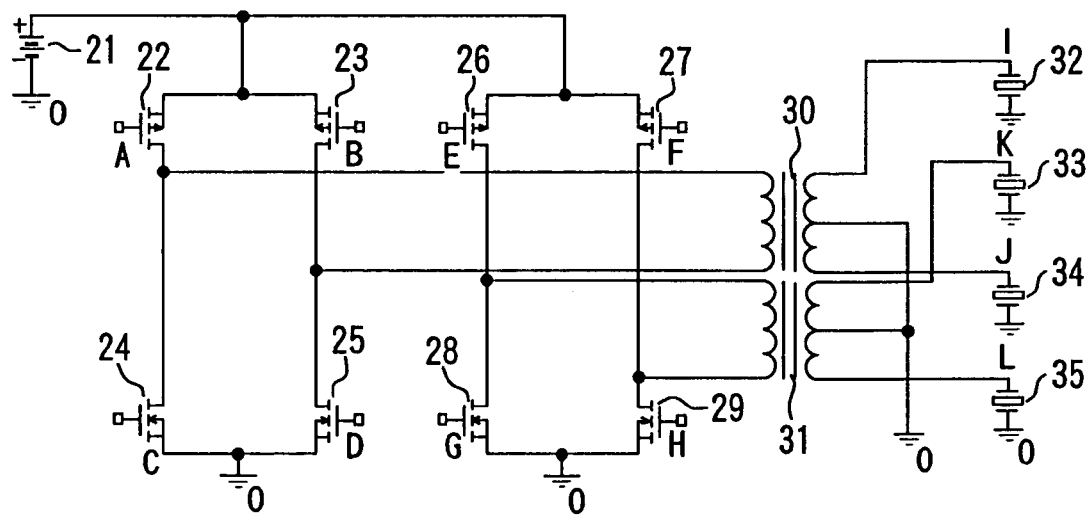
FIG. 44 shows the structure of a driving circuit of a conventional vibration type driving apparatus.

FIG. 43A shows output waveforms of a monitor circuit in Embodiment 14, while FIG. 43B shows driving signal waveforms in Embodiment 14.

Since the vibrating body and the moving body are in free vibration in a time period t2 in which the attenuated vibration is generated after the forced vibration in a state 1 is stopped, the phases in the time period 2 are different from those in the next state 1. With respect to the response phases of the forced vibration in the state 1, the phases of the attenuated vibration and the vibration in the next state 1 are out of phase, so that efficient excitation is not achieved. To address this, in Embodiment 14, a monitor circuit is provided for monitoring vibration displacement or distortion of the vibrating body to change an excitation phase for exciting the attenuated vibration in a predetermined phase at the time of start of providing the driving signals. Sa and Sb in FIG. 43 show signals provided by the monitor circuit. By matching the phases of the driving signals such that the phases of vibration displacement at the time of the forced vibration or predetermined phases are obtained when the next state 1 is started. This efficiently exerts an excitation force when the forced vibration is started.

It should be noted that the structures of the control apparatuses described in the plurality of embodiments described above are only illustrative, and any structure may be used as long as the driving signals are controlled such that the peak of the largest displacement of the traveling wave formed on the vibrating body 1 is sequentially moved.

While the plurality of embodiments described above have been described for the case where the driving signals are controlled through hardware, similar control can be performed through a computer program. The present invention is applicable to a storage medium which has the program stored therein and is readable by an information processing apparatus.

In addition, while the respective embodiments have been described for the control of the ring shape vibration type driving apparatus, the present invention is applicable to any of vibration type driving apparatuses of a type in which a plurality of vibrations with the same shape (or of the same kind) and with different time phases are excited on a vibrating body and the vibrations are combined to excite traveling vibrations.

While preferred embodiments have been described, it is to be understood that modification and variation of the present invention may be made without departing from scope of the following claims.

What is claimed is:

1. A control apparatus for a vibration type driving apparatus which comprises a vibrating body including an elastic body and an electro-mechanical energy conversion element, and a contact body in contact with the vibrating body, the vibrating body and the contact body are relatively moved by applying a plurality of driving signals to the electro-mechanical energy conversion element to excite a plurality of vibrations with the same shape and different positional phases on the vibrating body and combining the plurality of vibrations into a traveling vibration, the control apparatus comprising:
a driving unit which controls the driving signals such that the traveling vibration includes a traveling wave component whose amplitude is constant and a standing wave component whose positional phase changes.

2. The control apparatus according to claim 1, wherein the driving unit periodically changes amplitudes and phases of the plurality of driving signals with different time phases.

3. The control apparatus according to claim 1, wherein the driving unit periodically changes amplitudes of the plurality of driving signals with different time phases such that a position of the standing wave component is changed.

4. The control apparatus according to claim 1, wherein the driving unit increases and reduces the standing wave component in accordance with a change in frequencies of the driving signals.

5. The control apparatus according to claim 1, the driving unit has a speed detector which detects a speed of the vibration type driving apparatus, and increases and reduces the standing wave component in accordance with the detection result of the speed detector.

6. The control apparatus according to claim 2, wherein the driving unit comprises:
a speed detector which detects a driving speed of the vibration type driving apparatus;
a frequency controller which determines a frequency of a driving signal from a difference between a speed signal provided by the speed detector and a provided speed instruction value;
a modulator which determines a phase modulation amount and an amplitude modulation amount in accordance with a predetermined parameter corresponding to a driving speed of the vibration type driving apparatus;
a phase controller which generates a signal whose driving signal is phase-modulated in accordance with the phase modulation amount determined by the modulator; and
an amplitude controller which independently performs amplitude modulation on each of the driving signals in accordance with the amplitude modulation amount determined by the modulator.

7. The control apparatus according to claim 3, wherein the driving unit comprises:
a speed detector which detects a driving speed of the vibration type driving apparatus;
a frequency controller which determines a driving frequency from a difference between a speed signal provided by the speed detector and a provided speed instruction value;
a modulator which determines an amplitude modulation amount in accordance with a predetermined parameter corresponding to a driving speed of the vibration type driving apparatus; and
an amplitude controller which independently performs amplitude modulation on each of the driving signals in accordance with the amplitude modulation amount determined by the modulator.

8. The control apparatus according to claim 1, wherein the driving unit comprises:
a speed detector which detects a driving speed of the vibration type driving apparatus;
a frequency controller which determines a driving frequency from a difference between a speed signal provided by the speed detector and a provided speed instruction value to output a pulse signal;

a modulator which determines a phase modulation amount and a pulse width modulation amount in accordance with a predetermined parameter corresponding to a rotation speed of the vibration type driving apparatus;

a phase controller which phase-modulates the pulse signal in accordance with the phase modulation amount determined by the modulator; and a pulse width controller which independently performs pulse width modulation on each pulse signal in accordance with the pulse width modulation amount determined by the modulator, and the plurality of driving signals are generated by a signal generator formed of a switching element which outputs a power supply voltage in accordance with the pulse signal subjected to the phase modulation and pulse width modulation and a voltage booster which increases the power supply voltage.

9. The control apparatus according to claim 3, wherein the driving unit comprises:

a speed detector which detects a driving speed of the vibration type driving apparatus;

a frequency controller which determines a driving frequency from a difference between a speed signal provided by the speed detector and a provided speed instruction value to output a pulse signal;

a modulator which determines a pulse width modulation amount in accordance with a predetermined parameter corresponding to a rotation speed of the vibration type driving apparatus; and a pulse width controller which performs pulse width modulation on the pulse signal in accordance with the pulse width modulation amount determined by the modulator, and the plurality of driving signals are generated by a signal generator formed of a switching element which outputs a power supply voltage in accordance with the pulse signal subjected to the pulse width modulation and a voltage booster which increases the power supply voltage.

10. A control apparatus for a vibration type driving apparatus which comprises a vibrating body including an elastic body and an electro-mechanical energy conversion element, and a contact body in contact with the vibrating body, the vibrating body and the contact body are relatively moved by applying a plurality of driving signals to the electro-mechanical energy conversion element to excite a traveling vibration on the vibrating body, the control apparatus comprising:

a driving unit which simultaneously excites a plurality of traveling vibrations with different frequencies.

11. The control apparatus according to claim 10, wherein the plurality of traveling vibrations includes traveling vibrations with different traveling directions.

12. The control apparatus according to claim 10, wherein the driving unit varies the number of simultaneously excited traveling vibrations in accordance with a provided speed instruction value.

13. The control apparatus according to claim 10, wherein the driving unit varies the number of traveling vibrations with the same traveling directions in accordance with a provided speed instruction value.

14. The control apparatus according to claim 10, wherein the driving unit varies the number of simultaneously excited traveling vibrations in accordance with the driving speed of the vibration type driving apparatus.

15. The control apparatus according to claim 10, wherein the driving unit varies the number of traveling vibrations with the same traveling directions in accordance with the driving speed of the vibration type driving apparatus.

16. The control apparatus according to claim 10, wherein the driving unit comprises:

a speed detector which detects a driving speed of the vibration type driving apparatus;

a frequency controller which determines a driving frequency of each of the plurality of traveling vibrations from a difference between a speed signal provided by the speed detector and a provided speed instruction value; and a signal generator which generates the driving signals for exciting the plurality of traveling vibrations in accordance with the driving frequencies determined by the frequency controller.

17. The control apparatus according to claim 10, wherein the driving unit comprises:

a speed detector which detects a driving speed of the vibration type driving apparatus;

a frequency controller which determines a driving frequency of each of the plurality of traveling vibrations from a difference between a speed signal provided by the speed detector and a provided speed instruction value;

a phase controller which determines a time phase difference between a plurality of standing waves forming each of the plurality of traveling vibrations from the speed instruction value; and a signal generator which generates the driving signals for exciting the plurality of traveling vibrations in accordance with the driving frequencies determined by the frequency controller and the time phase difference determined by the phase controller.

18. The control apparatus according to claim 10, wherein the driving unit comprises:

a speed detector which detects a driving speed of the vibration type driving apparatus;

a frequency controller which determines a driving frequency of each of the plurality of traveling vibrations from a difference between a speed signal provided by the speed detector and a provided speed instruction value;

a phase controller which determines a time phase difference between a plurality of standing waves forming each of the plurality of traveling vibrations from the driving speed; and a signal generator which generates the driving signals for exciting the plurality of traveling vibrations in accordance with the driving frequencies determined by the frequency controller and the time phase difference determined by the phase controller.

19. A control apparatus for a vibration type driving apparatus which comprises a vibrating body including an elastic body and an electro-mechanical energy conversion element, and a contact body in contact with the vibrating body, the vibrating body and the contact body are relatively moved by applying a plurality of driving signals to the electro-mechanical energy conversion element to excite a traveling vibration on the vibrating body, the control apparatus comprising:

a driving unit which generates a first driving signal exciting a first traveling vibration and a second driving signal exciting a second traveling vibration whose frequency differs from that of the first traveling vibration, each of the first and second driving signal forming a group of intermittent driving signals, and which alternately applies the first driving signal and the second driving signal to the electro-mechanical energy conversion element, furthermore, while an attenuated vibration of one of the first and second traveling vibration occurs, superposes the other traveling vibration thereon.

20. The control apparatus according to claim 19, wherein, in the group of the first driving signals, time phases of the first driving signals are the same, and, in the group of the second driving signals, time phases of the second driving signals are the same.

21. The control apparatus according to claim 19, wherein the driving unit makes a phase of the traveling vibration at the start of the application of the driving signals coincide with a phase of the attenuated vibration of the traveling vibration excited by each of the driving signals before generating the intermittent driving signals.

22. The control apparatus according to claim 19, wherein the driving unit causes the traveling direction of the attenuated vibration of the first traveling vibration to be different from the traveling direction of the second traveling vibration.

23. The control apparatus according to claim 19, wherein the driving unit comprises:
a speed detector which detects a driving speed of the vibration type driving apparatus;
a frequency controller which determines a driving frequency of each of the first and second traveling vibrations from a speed signal provided by the speed detector; and
a signal generator which generates the driving signals for exciting the first and second traveling vibrations in accordance with the driving frequencies determined by the frequency controller.

24. The control apparatus according to claim 19, wherein the driving unit comprises:
a speed detector which detects a driving speed of the vibration type driving apparatus;
a frequency controller which determines a driving frequency of each of the first and second traveling vibrations from a speed signal provided by the speed detector;
a time controller which determines a duration for which each of the first and second traveling vibrations is forced, in accordance with the speed signal provided by the speed detector; and
a signal generator which generates the driving signals for exciting the first and second traveling vibrations in accordance with the driving frequencies determined by the frequency controller and the durations determined by the time controller.

25. An actuating apparatus comprising:
the control apparatus according to claim 1;
a vibration type driving apparatus controlled by the control apparatus; and
a driving mechanism driven by the vibration type driving apparatus.

26. A method of controlling a vibration type driving apparatus which comprises a vibrating body including an elastic body and an electro-mechanical energy conversion element, and a contact body in contact with the vibrating body, the vibrating body and the contact body are relatively moved by applying a plurality of driving signals to the electro-mechanical energy conversion element to excite a plurality of vibrations with the same shape and different positional phases on the vibrating body and combining the plurality of vibrations into a traveling vibration, comprising the step of:
controlling the driving signals such that the traveling vibration includes a traveling wave component whose amplitude is constant and a standing wave component whose positional phase changes.

27. The control method according to claim 26, wherein amplitudes and phases of the plurality of driving signals are periodically changed with different time phases in the step.

28. The control method according to claim 26, wherein amplitudes of the plurality of driving signals are periodically changed with different time phases in the step.

29. A method of controlling a vibration type driving apparatus which comprises a vibrating body including an elastic body and an electro-mechanical energy conversion element, and a contact body in contact with the vibrating body, the vibrating body and the contact body are relatively moved by applying a plurality of driving signals to the electro-mechanical energy conversion element to excite a traveling vibration on the vibrating body, comprising the step of:
simultaneously exciting a plurality of traveling vibrations with different frequencies.

30. The control method according to claim 29, wherein the plurality of traveling vibrations include traveling vibrations with different traveling directions in the step.

31. A method of controlling a vibration type driving apparatus which comprises a vibrating body including an elastic body and an electro-mechanical energy conversion element, and a contact body in contact with the vibrating body, the vibrating body and the contact body are relatively moved by applying a plurality of driving signals to the electro-mechanical energy conversion element to excite a traveling vibration on the vibrating body, comprising the step of:
generating a first driving signal exciting a first traveling vibration and a second driving signal exciting a second traveling vibration whose frequency differs from that of the first traveling vibration, each of the first and second driving signals forming a group of intermittent driving signals, and alternately applying the first driving signal and the second driving signal to the electro-mechanical energy conversion element, furthermore, while an attenuated vibration of one of the first and second traveling vibration occurs, superposing the other traveling vibration thereon.

32. The control method according to claim 31, wherein, in the group of the first driving signals, time phases of the first driving signals are the same, and, in the group of the second driving signals, time phases of the second driving signals are the same.

33. The control apparatus according to claim 31, wherein, further comprising the step of making a phase of the traveling vibration at the start of the application of the driving signals coincide with a phase of the attenuated vibration of the traveling vibration excited by each of the driving signals before generating the intermittent driving signals.

34. The control apparatus according to claim 31, wherein the traveling direction of the attenuated vibration of the traveling vibration is caused to be different from the first traveling direction of the second traveling vibration in the step.

35. A storage medium, readable by an information processing apparatus, storing a program including program codes capable of realizing the control method according to claim 26, the program being executable by the information processing apparatus.

36. A storage medium, readable by an information processing apparatus, storing a program including program codes capable of realizing the control method according to claim 29, the program being executable by the information processing apparatus.

37. A storage medium, readable by an information processing apparatus, storing a program including program codes capable of realizing the control method according to claim 31, the program being executable by the information processing apparatus.

* * * * *

UNITED STATES PATENT AND TRADEMARK OFFICE
CERTIFICATE OF CORRECTION

PATENT NO.      : 7,129,618 B2
APPLICATION NO. : 10/809540
DATED           : October 31, 2006
INVENTOR(S)     : Fujimoto It is certified that error appears in the above-identified patent and that said Letters Patent is hereby corrected as shown below:

ON THE TITLE PAGE, AT ITEM (57), Abstract:
Line 11, "controls" should read --control--.

IN THE DRAWINGS:
Sheet No. 34 of 41, Figure 38, "PERIDO" (all occurrences) should read --PERIOD--.

COLUMN 3:
Line 5, "means," should read --means--.

COLUMN 4:
Line 50, "signal" should read --signals--.
Line 54, "vibration" should read --vibrations--.

COLUMN 5:
Line 20, "yet" should read --yet another--.
Line 44, "signal" should read --signals--.

COLUMN 10:
Line 57, "contact" should read --contact with--.

COLUMN 14:
Line 67, "difference" should read --different--.

COLUMN 15:
Line 5, "ad" should read --and--.
Line 48, "circuits" should read --circuit--.

COLUMN 16:
Line 63, "ends" should read --end--, and "sides of" should read --side of each of--.
Line 65, "other ends" should read --the other end--.
Line 66, "sides of" should read --side of each of--.

COLUMN 17:
Line 4, "ends" should read --end--, and "sides of" should read --side of each of--.
Line 8, "ends" should read --end--, and "sides of" should read --side of each of--.
Line 11, "diving" should read --driving--.

UNITED STATES PATENT AND TRADEMARK OFFICE
CERTIFICATE OF CORRECTION

PATENT NO. : 7,129,618 B2
APPLICATION NO. : 10/809540
DATED : October 31, 2006
INVENTOR(S) : Fujimoto It is certified that error appears in the above-identified patent and that said Letters Patent is hereby corrected as shown below:

COLUMN 19:
Line 23, "difference" should read --different--.

COLUMN 28:
Line 67, "signal" should read --signals--.

COLUMN 29:
Line 6, "vibration" should read --vibrations--.

COLUMN 30:
Line 46, "vibration" should read --vibrations--.
Line 54, "wherein," should be deleted.

Signed and Sealed this

Eighth Day of July, 2008

JON W. DUDAS
*Director of the United States Patent and Trademark Office*